United States Patent [19]
Grube et al.

[11] Patent Number: 5,533,008
[45] Date of Patent: Jul. 2, 1996

[54] METHOD AND APPARATUS FOR PROVIDING A COMMUNICATION SYSTEM INFRASTRUCTURE

[75] Inventors: Gary W. Grube, Barrington, Ill.; Timothy W. Markison, Austin, Tex.; Matthew A. Pendleton, Cedar Park, Tex.; Mathew A. Rybicki, Austin, Tex.

[73] Assignee: Motorola, Inc., Schaumburg, Ill.

[21] Appl. No.: 381,602

[22] Filed: Jan. 26, 1995

[51] Int. Cl.⁶ .................................................. H04N 7/14
[52] U.S. Cl. .............................. 370/17; 370/79; 370/85.1; 370/95.3; 455/5.1; 455/49.1; 348/12; 348/13
[58] Field of Search .......................... 370/58.2, 79, 85.1, 370/85.2, 85.7, 95.1, 95.3, 24, 29, 30, 17; 379/58, 59, 60, 63; 455/33.1, 33.2, 34.1, 49.1, 53.1, 54.1, 54.2, 5.1; 348/6, 10, 12, 13, 16, 17

[56] References Cited

U.S. PATENT DOCUMENTS

| | | | |
|---|---|---|---|
| 5,034,993 | 7/1991 | Sasuta et al. | 379/63 X |
| 5,161,154 | 11/1992 | Diaz et al. | 370/95.1 |
| 5,247,347 | 9/1993 | Litteral et al. | 455/4.2 X |
| 5,400,322 | 3/1995 | Hunt et al. | 370/19 |

OTHER PUBLICATIONS

J. M. Cioffi; "DMT Information Bus for Multidrop Interface on Existing Wiring;" Amati Communications Corporation; pp. 1–6 (Jun. 6, 1994).

T. Starr, et al.; The TIE 1.4 Working Group; "Asymmetric Digital Subscriber Line (ADSL) Metallic Interface;" pp. 1–170 (Unpublished).

Primary Examiner—Douglas W. Olms
Assistant Examiner—Russell W. Blum
Attorney, Agent, or Firm—Timothy W. Markison; Daniel C. Crilly

[57] ABSTRACT

In a communication system utilizing DMT technology to couple a primary site (102) to a plurality of secondary sites (104–108), infrastructure control channels are established in the following manner. Having obtained a plurality of site bit loading tables, the primary site (102) generates a control channel bit loading table from the plurality of site bit loading tables. From the control channel bit loading table, the primary site selects at least one carrier channel to function as the control channel. The selection is based on bandwidth requirements for the control channel.

43 Claims, 49 Drawing Sheets

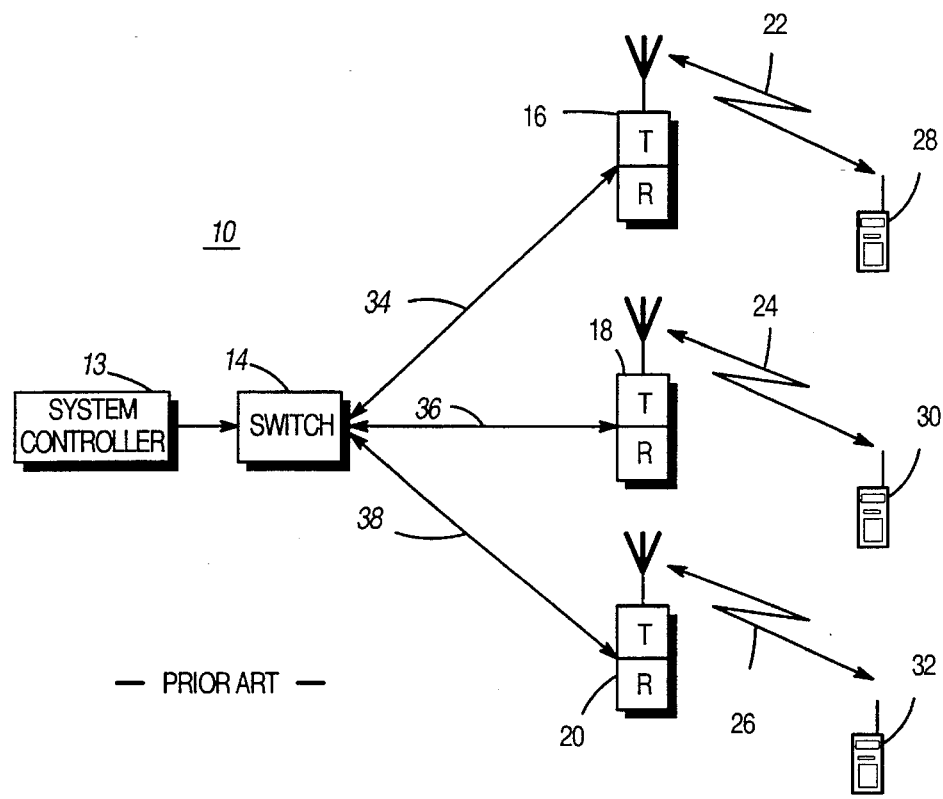
FIG.1 — PRIOR ART —
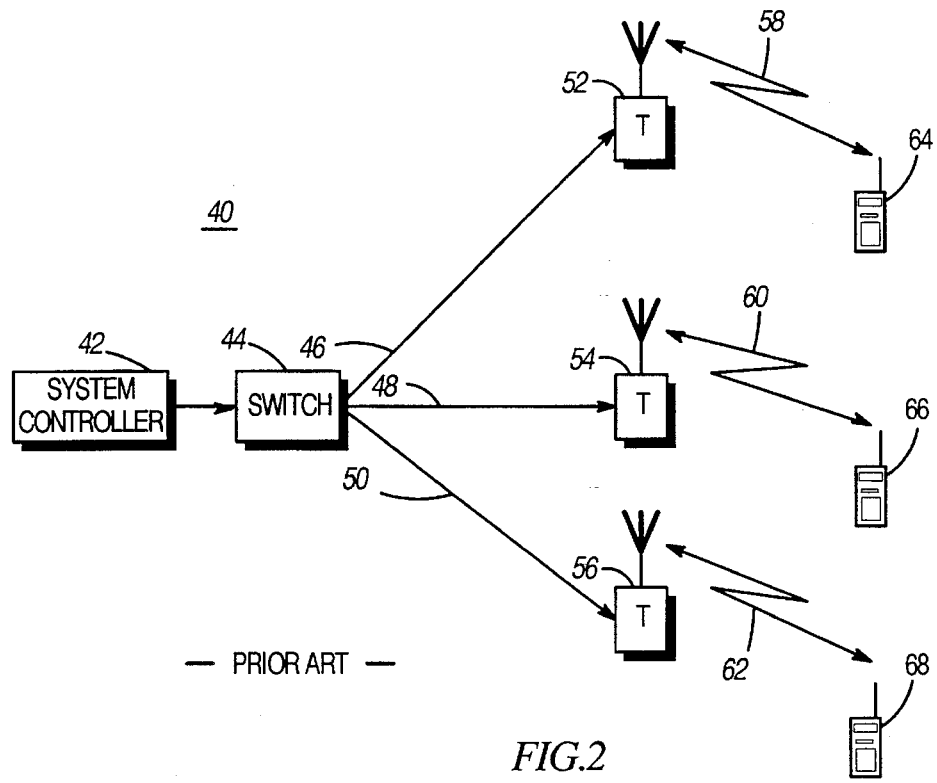
FIG.2 — PRIOR ART —

| SET "A" | |
|---|---|
| CHANNEL | BITS |
| 0 | 11 |
| 1 | 12 |
| 2 | 12 |
| 3 | 12 |
| 4 | 10 |
| 5 | 9 |
| 6 | 9 |
| 7 | 8 |
| 8 | 9 |
| 9 | 7 |

434

← IN C/C "A" 438

| SET "B" | |
|---|---|
| CHANNEL | BITS |
| 0 | 12 |
| 1 | 12 |
| 2 | 10 |
| 3 | 9 |
| 4 | 12 |
| 5 | 12 |
| 6 | 10 |
| 7 | 9 |
| 8 | 8 |
| 9 | 8 |

436

← IN C/C "B" 440

| 3 | 2 | 1 | 0 |
|---|---|---|---|
| NA | NA | IN C/C SET A SITE 1 | IN C/C SET B SITE 4 |

442

| 3 | 2 | 1 | 0 |
|---|---|---|---|
| NA | NA | IN C/C SET A SITE 2 | IN C/C SET B SITE 5 |

444

| 3 | 2 | 1 | 0 |
|---|---|---|---|
| NA | NA | IN C/C SET A SITE 3 | IN C/C SET B SITE 4 |

446

| 3 | 2 | 1 | 0 |
|---|---|---|---|
| NA | NA | IN C/C SET A SITE 1 | IN C/C SET B SITE 5 |

| SITE 1 | |
|---|---|
| CHANNEL | BITS |
| 0 | 10 |
| 1 | 11 |
| 2 | 12 |
| 3 | 11 |
| 4 | 10 |
| 5 | 11 |
| 6 | 11 |
| 7 | 9 |
| 8 | 8 |
| 9 | 5 |

1098

| SITE 2 | |
|---|---|
| CHANNEL | BITS |
| 0 | 11 |
| 1 | 11 |
| 2 | 13 |
| 3 | 12 |
| 4 | 10 |
| 5 | 10 |
| 6 | 11 |
| 7 | 6 |
| 8 | 10 |
| 9 | 7 |

1100

| SITE 3 | |
|---|---|
| CHANNEL | BITS |
| 0 | 12 |
| 1 | 12 |
| 2 | 11 |
| 3 | 11 |
| 4 | 10 |
| 5 | 10 |
| 6 | 11 |
| 7 | 10 |
| 8 | 8 |
| 9 | 9 |

1102

| SITE 4 | |
|---|---|
| CHANNEL | BITS |
| 0 | 11 |
| 1 | 12 |
| 2 | 11 |
| 3 | 11 |
| 4 | 12 |
| 5 | 10 |
| 6 | 9 |
| 7 | 9 |
| 8 | 9 |
| 9 | 7 |

1104

| SITE 5 | |
|---|---|
| CHANNEL | BITS |
| 0 | 15 |
| 1 | 15 |
| 2 | 15 |
| 3 | 14 |
| 4 | 10 |
| 5 | 14 |
| 6 | 14 |
| 7 | 8 |
| 8 | 10 |
| 9 | 11 |

1106

| SITE 6 | |
|---|---|
| CHANNEL | BITS |
| 0 | 15 |
| 1 | 14 |
| 2 | 15 |
| 3 | 13 |
| 4 | 13 |
| 5 | 8 |
| 6 | 14 |
| 7 | 13 |
| 8 | 12 |
| 9 | 11 |

| CHANNEL | BITS | ALLOCATION | ADDRESS PTR |
|---|---|---|---|
| 1 | 11 | C/C-A | 0 |
| 2 | 11 | C/C-B | 11 |
| 0 | 10 | 3A | 30 |
| 4 | 10 | 3B | 40 |
| 5 | 8 | 3C | 50 |
| 7 | 6 | 1 | 22 |
| 8 | 4 | 3D | 58 |
| 3 | 0 | - | - |
| 9 | 0 | - | - |
| 6 | 0 | - | - |

1158

| | |
|---|---|
| 0 | OUT C/C A |
| 11 | OUT C/C B |
| 22 | DATA 1 |
| 30 | DATA 3A |
| 40 | DATA 3B |
| 50 | DATA 3C |
| 58 | DATA 3D |
| 62 | |

*FIG.58*

NEW LCD FOR CALL 1 — 1180

| CHANNEL | BITS |
|---|---|
| 0 | 13 |
| 1 | 14 |
| 2 | 14 |
| 3 | 13 |
| 4 | 10 |
| 5 | 11 |
| 6 | 9 |
| 7 | 7 |
| 8 | 11 |
| 9 | 9 |

← CALL 1

ORDERED BIT TABLE — 1182

| CHANNEL | BITS |
|---|---|
| 0 | 13 |
| 3 | 13 |
| 5 | 11 |
| 8 | 11 |
| 4 | 10 |
| 6 | 9 |
| 9 | 9 |
| 7 | 7 |

CHANNEL ALLOCATION TABLE

| CHANNEL | BITS | ALLOCATION | ADDRESS PTR | BITS RED. |
|---|---|---|---|---|
| 1 | 11 | C/C-A | 0 | 1 |
| 2 | 11 | C/C-B | 11 | 1 |
| 0 | 10 | 3A | 30 | 1 |
| 4 | 10 | 3B | 40 | 0 |
| 5 | 8 | 3C | 50 | 2 |
| 6 | 8 | 1 | 22 | 1 |
| 8 | 4 | 3D | 58 | 4 |
| 3 | 0 | - | - | - |
| 7 | 0 | - | - | - |
| 9 | 0 | - | - | - |

1184

← 1186 NEW ASSIGNMENT

*FIG.61*

SITE 1 (1160)

| CHANNEL | BITS |
|---|---|
| 0 | 12 |
| 1 | 12 |
| 2 | 13 |
| 3 | 11 |
| 4 | 11 |
| 5 | 10 |
| 6 | 10 |
| 7 | 9 |
| 8 | 8 |
| 9 | 7 |

SITE 2 (1162)

| CHANNEL | BITS |
|---|---|
| 0 | 13 |
| 1 | 13 |
| 2 | 12 |
| 3 | 11 |
| 4 | 11 |
| 5 | 10 |
| 6 | 10 |
| 7 | 9 |
| 8 | 10 |
| 9 | 9 |

SITE 3 (1164)

| CHANNEL | BITS |
|---|---|
| 0 | 11 |
| 1 | 12 |
| 2 | 13 |
| 3 | 13 |
| 4 | 10 |
| 5 | 12 |
| 6 | 9 |
| 7 | 11 |
| 8 | 11 |
| 9 | 7 |

SITE 4 (1166)

| CHANNEL | BITS |
|---|---|
| 0 | 13 |
| 1 | 14 |
| 2 | 14 |
| 3 | 13 |
| 4 | 12 |
| 5 | 12 |
| 6 | 11 |
| 7 | 11 |
| 8 | 10 |
| 9 | 11 |

SITE 5 (1168)

| CHANNEL | BITS |
|---|---|
| 0 | 13 |
| 1 | 14 |
| 2 | 14 |
| 3 | 13 |
| 4 | 10 |
| 5 | 11 |
| 6 | 9 |
| 7 | 7 |
| 8 | 11 |
| 9 | 10 |

SITE 6 (1170)

| CHANNEL | BITS |
|---|---|
| 0 | 15 |
| 1 | 15 |
| 2 | 14 |
| 3 | 14 |
| 4 | 11 |
| 5 | 11 |
| 6 | 12 |
| 7 | 12 |
| 8 | 10 |
| 9 | 9 |

*FIG.59*

METHOD AND APPARATUS FOR PROVIDING A COMMUNICATION SYSTEM INFRASTRUCTURE

FIELD OF THE INVENTION

This invention relates generally to communication systems and more particularly to a communication system infrastructure.

BACKGROUND OF THE INVENTION

The term "communication system" covers a variety of networks, devices, and systems that provide communication between a plurality of nodes. One such communication system is a two-way wireless communication system as shown in FIG. 1. The two-way wireless communication system 10 includes a system controller 12, a switch 14, a plurality of base stations 16–20, a plurality of communication resources 22–26, and a plurality of communication units 28–32. The plurality of base stations 16–20 are coupled to the switch 14 via wireline links 34–38. These wireline links 34–38 are typically T1 links which have a bandwidth of approximately 1.5 megahertz and a capacity of 1.5 Mbps (mega-bits per second).

In operation, a communication unit transmits an inbound signaling word (ISW) via a wireless communication resource 22–26, which has been designated as a control channel. One of the base stations 16–20 receives the ISW and transmits it via the T1 link 34–38 to the switch 14. The switch provides the information to the system controller 12 which determines the validity of the request. For a valid request, the system controller grants the requested service, which may be a two-way wireless communication, a group call, a private call, or a telephone interface. Note that the communication units 28–32 may be any type of two-way wireless communication device, such as a mobile radio, a portable radio, a cellular telephone, or a cellular/mobile/portable radio telephone.

Having granted the request, the system controller 12 allocates a wireless communication resource 22–26 to the requesting communication unit. This information is sent out via the switch 14, one of the T1 links 34–38, and a base station 16–20. With the allocation of a wireless communication resource, the requesting communication unit may perform its wireless, or RF (Radio Frequency), communication.

While the two-way wireless communication system 10 of FIG. 1 provides a variety of services to a communication unit, or subscriber unit, the infrastructure requires high bandwidth wireline transmission links between the switch 14 and the base stations 16–20. As shown, these high bandwidth transmission links are typically T1 links which provides transmission capabilites of 1.5 Mbps. Alternatively, the links could be microwave links that provide an equivalent bandwidth as the T1 links.

Regardless of the type of link used, it must have a large bandwidth to convey large amounts of information between a base station and the switch. Because of the large amounts of information being conveyed, low frequency transmission lines, such as twisted pair copper telephone lines, cannot be used for these interconnections. Typically, a twisted pair copper wire telephone line has a bandwidth of 4 kilohertz. In two-way wireless communication systems, the intercoupling between the switch and base stations requires at least a 20 kilohertz bandwidth for a single data transfer. If multiple data transfers are occurring simultaneously, which is the typical case, the bandwidth requirements increase accordingly. Thus, based on these bandwidth requirements, the twisted pair copper telephone line does not provide adequate bandwidth.

Another type of communication system is illustrated in FIG. 2 as a one-way wireless communication system 40. The one-way wireless system 40, which may be a paging system, includes a system controller 42, a switch 44, wireline links 46–50, a plurality of transmitters 52–56, a plurality of communication resources 58–62, and a plurality of communication units 64–68 or pagers. In operation, the system controller receives a request to transmit a page to at least one of the plurality of communication units 64–68. Upon receiving this request, the system controller 42 generates a paging message which is transmitted to the switch 44 and subsequently routed via one of the wireline links 46–50 to the appropriate transmitter. Upon receiving the paging message, the transmitter transmits the message to the paging unit via one of the RF communication resources.

As with the two wire two-way wireless communication system 10 of FIG. 1, the one way wireless system 40 requires a high bandwidth wireline link between the switch and the transmitters. Thus, a twisted pair copper telephone line, which has a bandwidth of approximately 4 kilohertz, will not provide the needed transmission capacity of the one-way wireless communication system 40.

The two-way wireless system 10 and the one-way wireless system 40 each provide the communication unit with unique features. These unique features center around the fact that these wireless systems can transmit one communication to a plurality of receiving units. In other words, such wireless systems support one-to-many communications and/or many-to-one communications.

To enhance the transmit capabilities of a twisted pair copper telephone line, several techniques have been developed. For example Integrated Services Digital Network (ISDN) extends the bandwidth of a twisted pair copper telephone line from 4 kilohertz up to 200 kilohertz, which provides a transmission capability of 160 Kbps. Motorola part numbers MC145474, and MC145472 provide ISDN services. While these devices increase the bandwidth of a twisted pair telephone line, they are intended for one-to-one telephone communications. For example, the ISDN chips may be used for video telephone conferencing, facsimile transmissions, and pair gain transmissions, where pair gain transmission is a multiplexing technique of several telephone calls on a single line.

Another technique which increases the transmission capabilities of a twisted pair copper telephone line is Asymmetrical Digital Subscriber Loop, or Link, (ADSL). An ADSL device increases the bandwidth of the twisted pair telephone line up to 1.1 megahertz, which provides transmission capabilites up to 9 Mbps. Similar to the ISDN technique, the ADSL technique is used for one-to-one communications and provides additional bandwidth over the ISDN devices.

FIG. 3 illustrates a typical ADSL two wire system. The ADSL two wire system 70 includes a video server 72, which may be a camera, an asynchronous transfer mode (ATM) switch 74, an ADSL transceiver 76, a splitter 78, a plain old telephone service (POTS) switch 80, a twisted pair copper wire telephone line 82, a second splitter 84, a telephone 86, a second ADSL transceiver 88, and a television monitor 90. In general, the first and second ADSL transceivers 76 and 88 communicate to establish a spectral response of the telephone line 82. Having exchanged this information, a transmission can begin. In operation the video camera 72 will receive an image for teleconferencing and convert that image into digital information. The camera 72 routes the digital information to the ATM switch 74, which, in turn, routes the digital information to the ADSL transceiver 76. The ADSL transceiver converts the digital information into a Discrete Multi-Tone (DMT) symbol and conveys the DMT symbol to the other ADSL transceiver via the splitters 78, 84 and the telephone line 82. Upon receiving the DMT symbol, the second ADSL transceiver 88 recaptures the digital information and routes the digital information to the TV monitor 90.

In addition to transmitting high bandwidth digital information, the ADSL two wire system 70 can also support regular telephone communications or POTS. This is done via the splitters 78 and 84 which route low frequency or POTS signals to the telephone 86 or the POTS switch 80 while routing the higher frequency signals to the ADSL transceivers.

FIG. 4 illustrates a frequency spectrum of carrier channels used in an ADSL system. The low frequency range, 0–4 kilohertz, is reserved for plain old telephone system (POTS) transmissions. The high frequency range, from 25 kilohertz to 1.1 megahertz, is used for ADSL transmissions. With this defined separation, the splitters 78, 84 of FIG. 3 can easily separate the low frequency signals from the high frequency signals.

The high frequency range of FIG. 4 is divided into 256 carrier channels separated by approximately 4 kilohertz. The first 32 carrier channels in the range from 20 kilohertz to 138 kilohertz are full duplex channels while the 224 channels in the frequency range from 138 kilohertz to 1.1 megahertz are half duplex channels. For the 32 carrier channels in the full duplex range, echo cancellation must be incorporated in the splitters to ensure proper reception and transmission of the signals.

Each carrier channel can support up to 15 bits of QAM information. The actual amount of bits a carrier channel supports varies, however, due to the spectral response of the telephone line. For example, one carrier channel may be able to accommodate 15 bits while another may be only able to accommodate 4 bits. Due to ADSL requirements the minimum amount of bits a carrier channel can support, referred to as bit loading, is 2 bits and still carry data.

To determine the spectral response of the telephone line, the ADSL transceivers use an algorithm as shown in FIG. 5. As shown, a first ADSL transceivers will transmit a wide band test signal to a second ADSL transceiver. Upon receipt, the second ADSL transceiver evaluates the received signal to determine the spectral response of the telephone line. Having the spectral response, the second ADSL generates a bit loading table and sends the bit loading table to the first ADSL transceiver. The bit loading table includes, for each carrier channel, a number of bits that the carrier channel can support.

FIG. 6 illustrates the transmit portion of the ADSL transceiver. As shown, the ADSL transmitter includes a multiplexer which receives a plurality of inputs via TI links, ADSL control, an ISDN connection, and an HO link. Based on the ADSL control, the multiplexer provides one of the inputs to a constellation encoder via a fast path or an interleave path. The fast path includes a scramble cyclic redundancy check (CRC) block which is coupled to a forward error correction (FEC) block. The interleave path includes a scramble CRC, a forward error correction block, and an interleave block. The path selected depends on the level of burst error correction needed. If less error correction is needed, the fast path is selected, otherwise the interleave path is selected.

The constellation encoder encodes the received signals based on the bit loading table and an encoding sequence to produce an encoded data stream. The encoded data stream is then provided to the Discrete Multi-Tone (DMT) modulator which produces a DMT symbol from the encoded data stream. The DMT symbol is then transmitted to the receiver of the other ADSL transceiver via the telephone line.

FIG. 7 illustrates the receiver portion of the ADSL transceiver. As shown, the ADSL receiver includes a DMT demodulator which demodulates the DMT symbol to produce a demodulated signal. The demodulated signal is then provided to the constellation decoder which decodes the signal based on the bit loading information and a decoding sequence to recapture the transmitted data stream. The recaptured data stream is then provided to the demultiplexer via a fast path or deinterleave path. The de-multiplexer then provides recaptured data to the appropriate output line.

While the ADSL system increases the bandwidth of a telephone line, up to 1.1 megahertz, it is designed for one-to-one communications and not one-to-many or many-to-one communications. Therefore, a need exists for a one-to-many and/or many-to-one communication system infrastructure that utilizes existing telephone lines while providing the highly reliable service subscribers of wireless communication systems expect.

BRIEF DESCRIPTION OF THE DRAWINGS

FIG. 1 illustrates a prior art two-way communication system;

FIG. 2 illustrates a prior art one-way wireless communication system;

FIG. 21 illustrates an alternative exemplary allocation and utilization of an inbound control channel in accordance with the present invention;

FIGS. 53–61 illustrate an example of carrier channel allocation in accordance with the present invention.

DETAILED DESCRIPTION OF THE DRAWINGS

Figure 3:
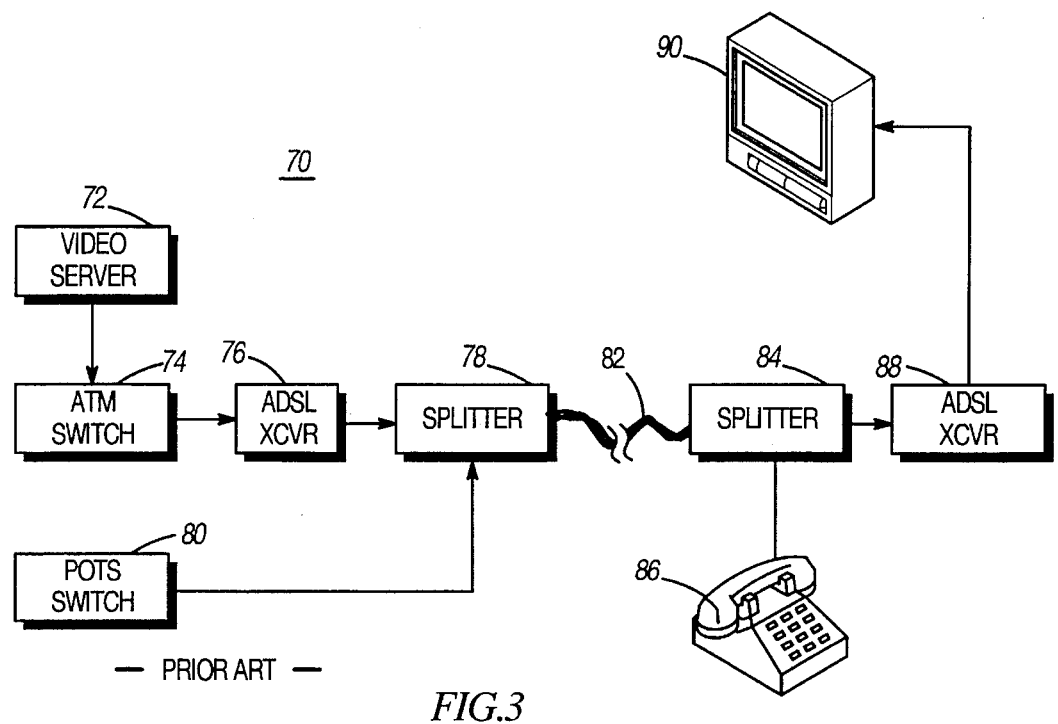
FIG. 3 illustrates a prior art ADSL two wire communication system.
Figure 4:
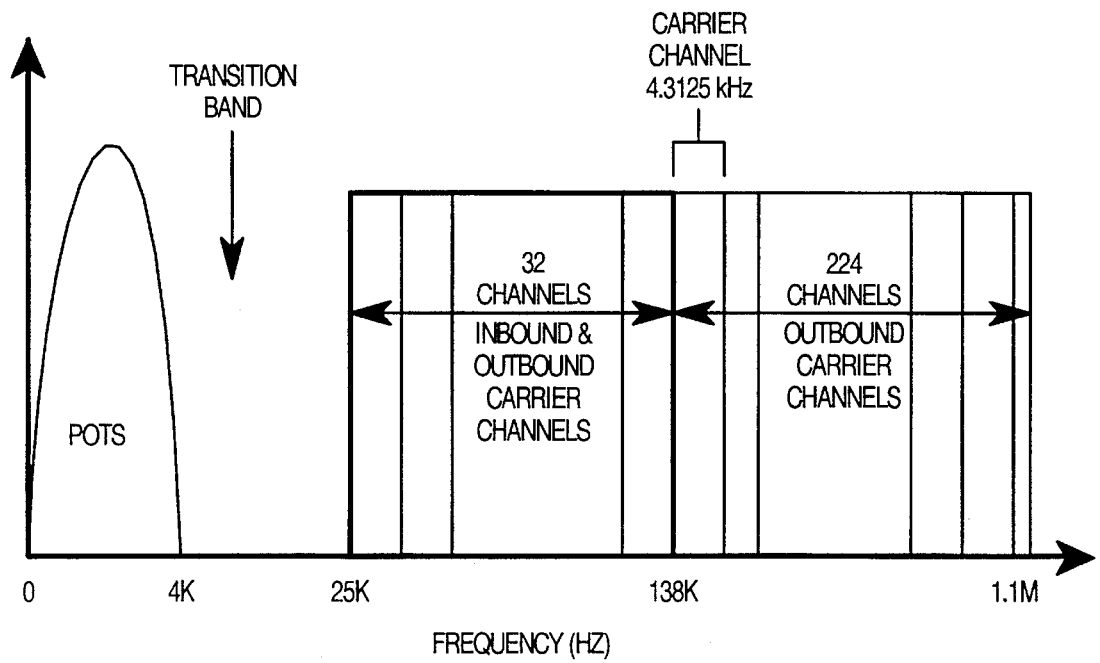
FIG. 4 illustrates a prior art representation of an ADSL frequency spectrum allocation.
Figure 5:
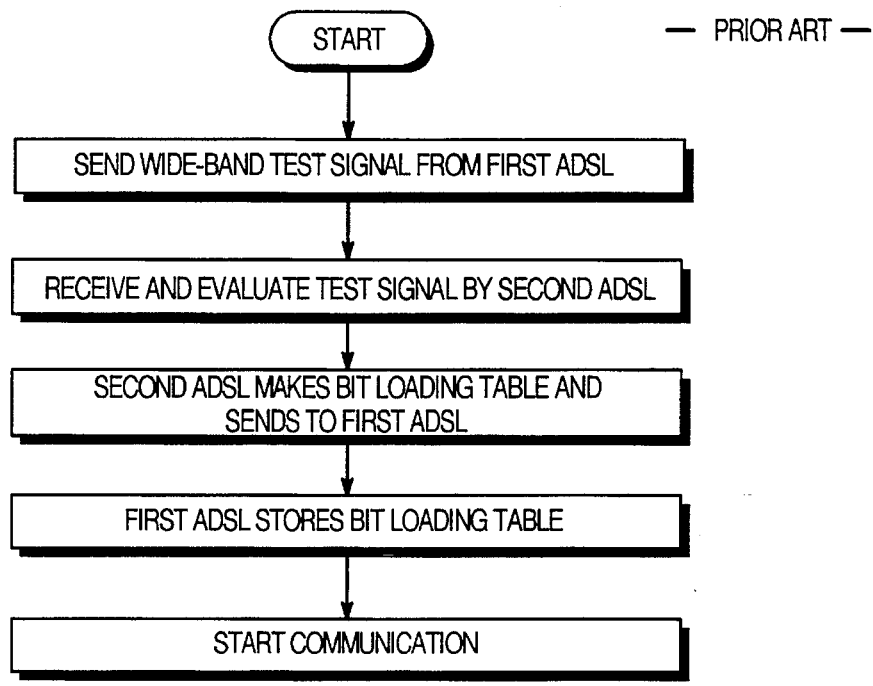
FIG. 5 illustrates a prior art flow diagram for determination of bit loading information of a telephone line.
Figure 6:
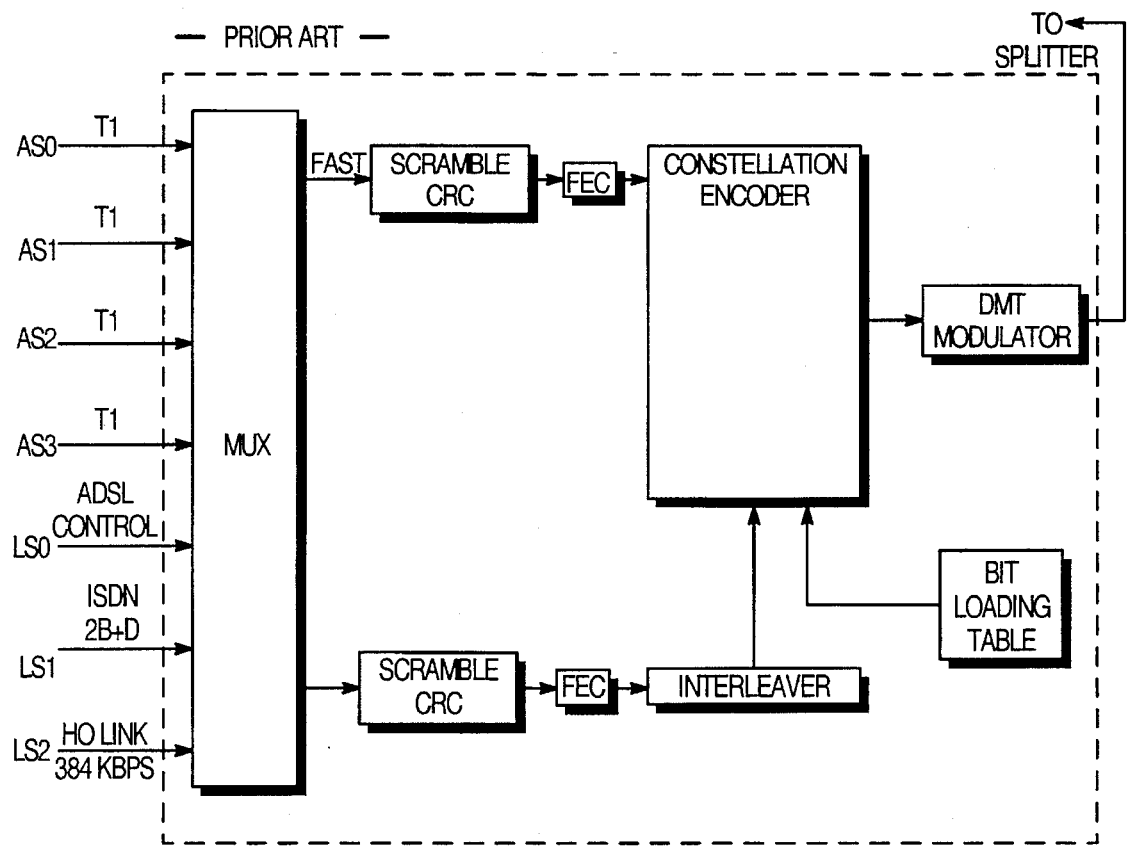
FIG. 6 illustrates a prior art schematic block of ADSL transmitter.
Figure 7:
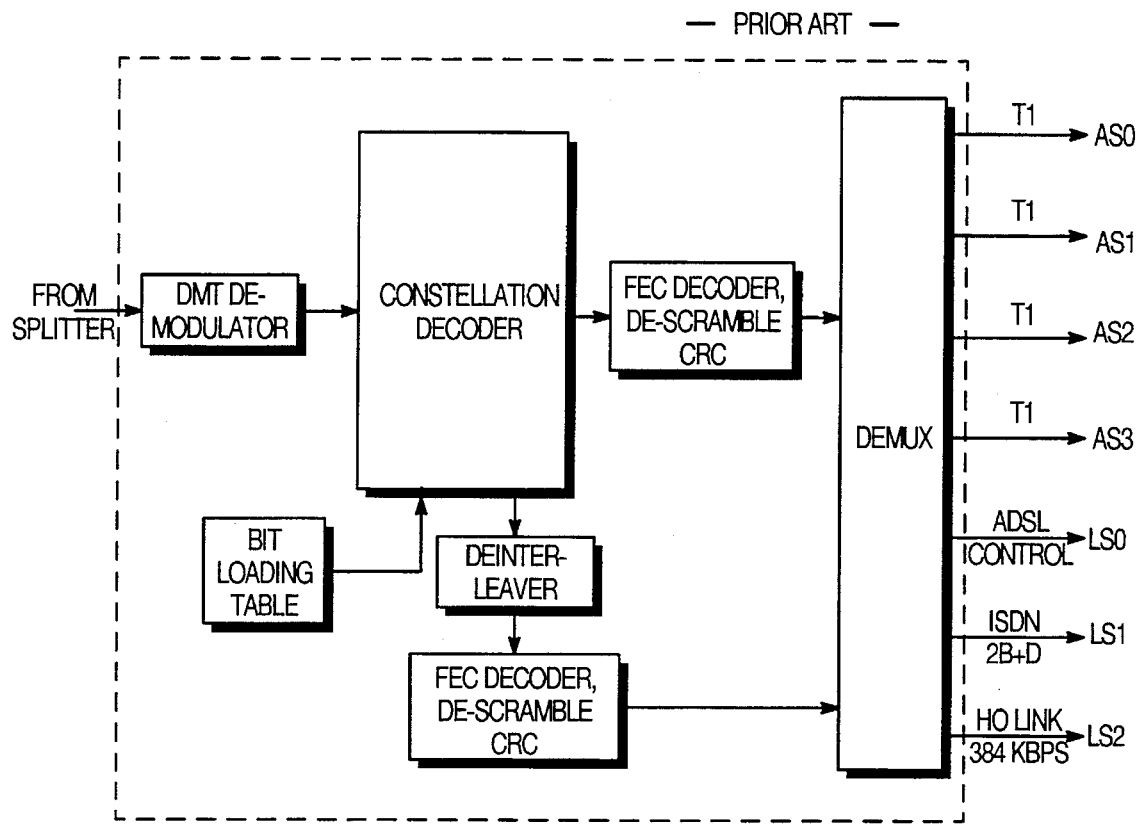
FIG. 7 illustrates a prior art schematic block diagram of ADSL receiver.

Generally, the present invention provides a method and apparatus for establishing a communication system infrastructure utilizing low pass transmission path, i.e. twisted pair telephone line. This may be accomplished by providing a primary site which includes a controller, a data multiplexing switch, a DMT transmitter and a DMT receiver. The primary site is coupled to a plurality of secondary sites via low pass transmission paths. Each of the secondary sites includes a secondary DMT receiver, a secondary DMT transmitter, a secondary DMT data multiplexing switch, a site controller and at least one subscriber interface.

The primary site communicates with the plurality of secondary sites via inbound and outbound low pass transmission paths. This is done via the respective DMT receivers and DMT transmitters, wherein the DMT transmitter transmits information over a plurality of carrier channels to a targeted DMT receiver. The information transmitted may be control information, i.e., the co-ordination information used by the primary site and the secondary sites to establish data transfers, or user information, i.e., the information intended for a subscriber of the communication system. To convey this information, the DMT transmitter formats the user information and then converts it into DMT symbols, which is the actual information transmitted over the low pass transmission path. The DMT receiver receives the DMT symbols, and deformats then to recapture the original information.

Before any information can be transmitted, an inbound control channel and an outbound control channel must be established over the low pass transmission paths. The inbound and outbound control channels established on the low pass transmission path are different than the control channels established in an RF communication system. The control channels of the RF communication system are used to convey communication system operational information to the subscribers of the system. For example, a request for a call, RF communication resource allocation, request deny, status inquiries and responses are all forms of communication system operational information that are transmitted over the RF control channels. The control channels established on the low pass transmission paths are used to convey system infrastructure information between the primary site and the secondary sites and to route the communication system operational information to the sites such that the operational information may be subsequently transmitted to the subscribers.

The outbound control channel for the system infrastructure is generally established when the primary site transmits a training signal to each of the plurality of secondary sites. Upon receiving the training signal, each of the secondary sites performs a spectral response analysis of the outbound low pass transmission path based on the training signal and then creates bit loading information. In a sequential order, the primary site requests and stores the bit loading information from each of the secondary sites, wherein the bit loading information is stored in a site bit loading table.

Having stored the bit loading information for all of the secondary site, the primary sites generates a lowest common denominator (LCD) bit loading table as a compilation of all of the site bit loading tables. From the LCD bit loading table and bandwidth requirements for the outbound control channel, the primary site selects at least one outbound carrier channel of the plurality of carrier channels to function as the outbound control channel.

The inbound control channel is established in a similar way as the outbound control channel except the primary site requests the training signal from the secondary sites. Upon receiving the request, each of the secondary sites responds in a sequential order. When the primary site receives the training signal from a secondary site, the primary site performs a spectral response on the inbound low pass transmission path based on the training signal. From the spectral response, the primary site generates a bit loading table for the site. Once a bit loading table for all of the secondary sites has been generated, the primary site generates an inbound control channel LCD bit loading table. From this table the primary site selects, based on bandwidth requirements, inbound carrier channels to function as the inbound control channel.

Once the control channels are established, the system may provide call services, where a call service includes the transmission of user information. When the primary site receives the call request, it determines the target sites involved in the requested call. Having identified the target sites, the primary site retrieves the site bit loading table for each target site and generates a lowest common denominator (LCD) call bit loading table for this particular call. From the call bit loading table and bandwidth requirements for this particular call, the primary site allocates carrier channels to provide the infrastructure for this particular call. In other words, the primary site is selecting which outbound carrier channels will convey the user information from the primary site to the targeted secondary sites and the inbound carrier channels that will convey the user data from the targeted secondary sites to the primary site.

Figure 8:
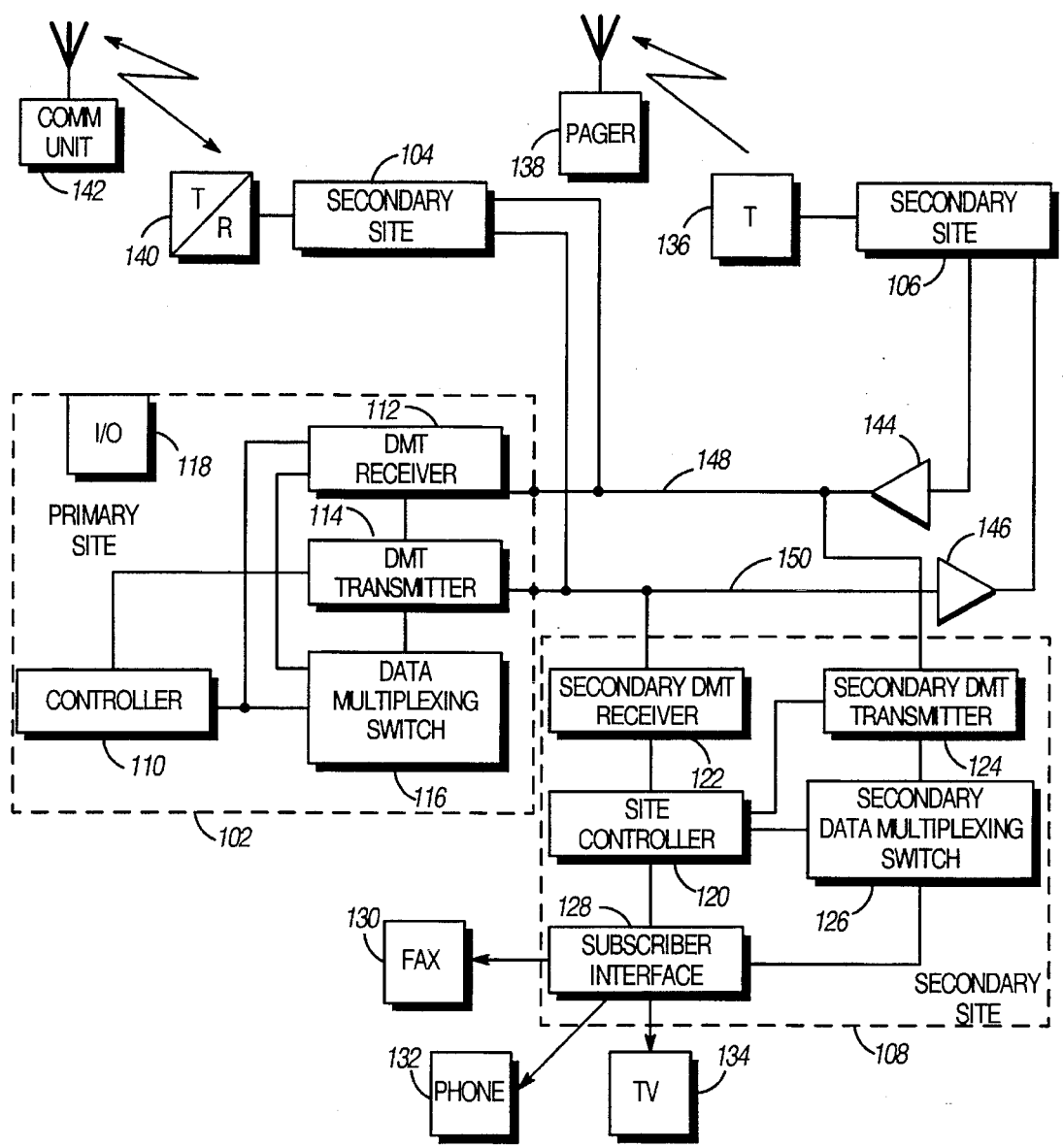
FIG. 8 illustrates a communication system in accordance with the present invention.

FIG. 8 illustrates a communications system 100 having a four wire infrastructure. The communication system 100 includes a primary site 102, a plurality of secondary sites 104–108 interoperably coupled to the primary site via at least one inbound low pass transmission path 148 and at least one outbound low pass transmission path 150. The primary site 102 includes a controller 110, a DMT (Discrete Multi Tone) receiver 112, a DMT transmitter 114, a data multiplexing switch 116, and an input/output port 118. Note that, if the secondary sites are separated by more than a given geographic distance (12 Kft to 18 Kft) from the primary site, repeaters 144, 146 may be required.

Each of the secondary sites 104–108 include a secondary site controller 120, a secondary DMT receiver 122, a secondary DMT transmitter 124, a secondary data multiplexing switch 126 and at least one subscriber interface 128. The subscriber interface may be coupled to a radio frequency (RF) transceiver 140, an RF transmitter 136, a facsimile device 130, a telephone 132, or a television monitor 134. A detailed discussion of the secondary site will be provided below with reference to FIG. 11.

The general operation of communication system 100 begins by establishing an inbound control channel on the inbound low pass transmission path 148 and an outbound control channel on the outbound low pass transmission path 150. Establishing the inbound and outbound control channels will be discussed in greater detail with reference to FIGS. 16–22.

Once the infrastructure control channels (i.e., the inbound and outbound control channels) are established, user information may be transmitted to a subscriber. This is accomplished when the primary site receives a call request that identifies a targeted subscriber. The targeted subscriber may be a communication unit 142, a pager unit 138, a facsimile unit 130, a telephone 132, a television 134, or any other type of device that can receive digital information. Upon receipt of the call request, the primary site 102 determines the location of the target subscriber units. Having determined the targets' locations, the primary site allocates carrier channels of the inbound and outbound low pass transmission paths 148, 150 depending on the type of call requested and the bandwidth requirements for the call. For example, for a one way data transmission, the primary site only needs to allocate carrier channels on the outbound low pass transmission path 150, while, for a two way data transmission, the primary site would need to allocate carrier channels in both the inbound and outbound low pass transmission paths 148, 150.

To allocate the carrier channels, the primary site generates an inbound call bit loading table from the inbound site bit loading tables of the target sites and an outbound call bit loading table from the outbound site bit loading tables of the target sites. From the call bit loading tables and the bandwidth requirements of the call, the primary site selects the carrier channels to support the call. Once the carrier channels have been selected, identity of the carrier channels are sent to the targeted secondary sites via the outbound carrier channels supporting the outbound control channel. Note that establishing carrier channels to support a particular call provides a temporarily designated communication path between the primary sites and the targeted secondary sites for this call. Thus, the infrastructure links of the present communication system are trunked to support a variety of calls which is in contrast to the dedicated links of prior art communication systems.

In addition to allocating carrier channels of the low pass transmission paths 148,150, the primary site may need to allocate transmission resources within the secondary sites to provide a communication path between the subscriber and the secondary site. For example, in a two-way wireless communication system, the primary site will allocate an RF communication resource in each secondary site supporting a two-way wireless communication. The control information identifying which RF communication resources have been allocated will be transmitted to the secondary sites via the outbound carrier channels functioning as the outbound control channel.

Once the secondary sites have received and stored the carrier channel allocation information, and any RF communication resource allocation information, the primary site 102 may transmit user information to the targeted secondary sites via the allocated carrier channels. Upon receiving the user information, the secondary sites can route the data to the targeted subscriber via the allocated RF communication resource. Additionally, the primary site, for a two-way communication, may receive user information via the allocated inbound carrier channels. Upon receipt of this information, the primary site may retransmit this information to the targeted secondary sites via the allocated outbound carrier channels.

Figure 9:
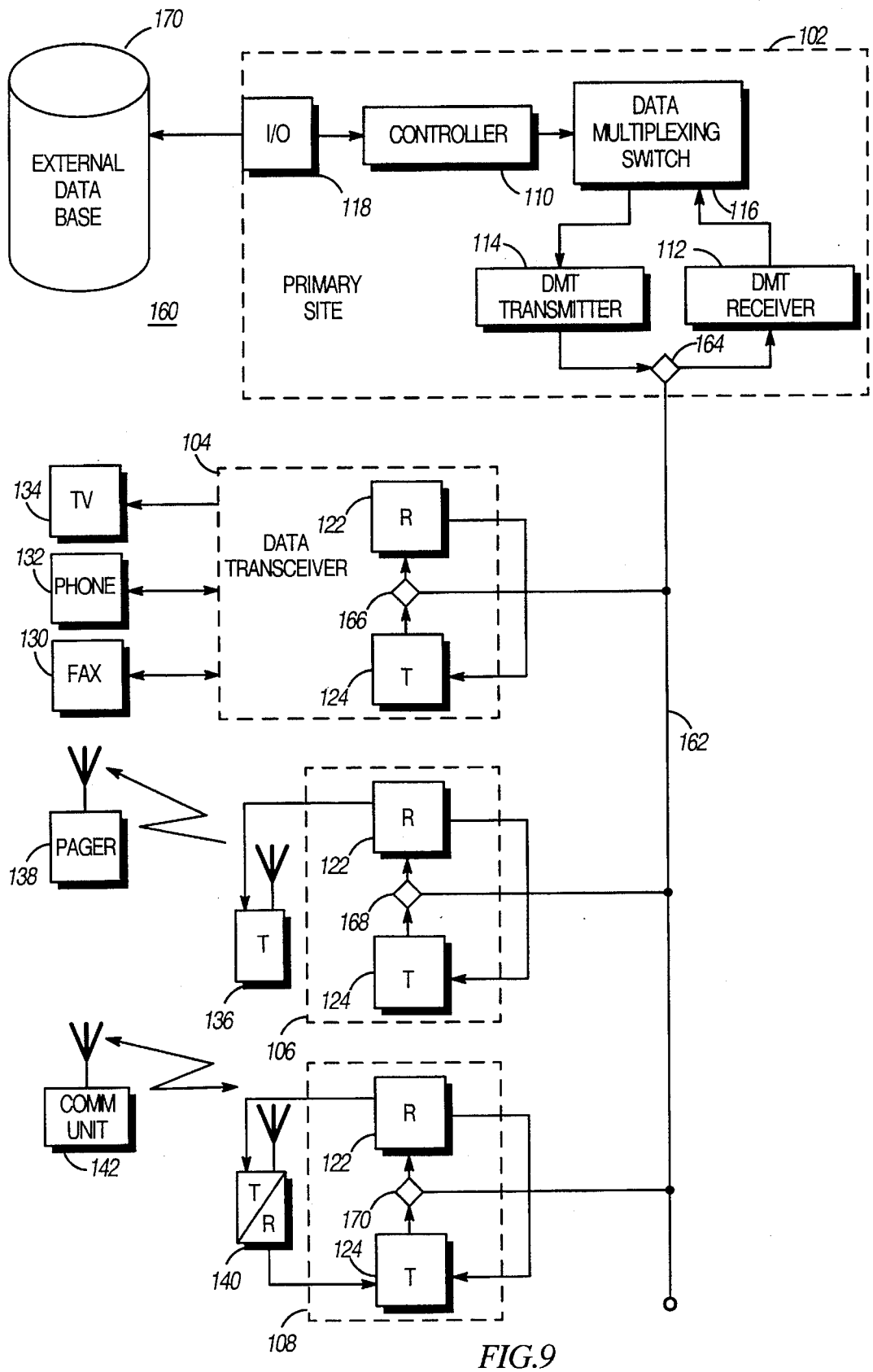
FIG. 9 illustrates a two-wire communication system in accordance with the present invention.

FIG. 9 illustrates a communication system 160 having a two-wire infrastructure. As shown, the primary site 102 is operably coupled to a plurality of secondary sites 104–108 via a twisted pair low pass transmission path 162. The low pass transmission path is a twisted pair copper wire, which may be a telephone line. The basic interconnections of communication system 160 are very similar to the interconnections of communication system 100. A difference arises in that communication system 160 includes only one low pass transmission path, while communication system 100 includes at least inbound and outbound low pass transmission paths. Because of this difference, the primary site 102 and each secondary site include a two-wire to four-wire conversion hybrid 164–170 to split inbound and outbound transmissions. In addition, the conversion hybrid provides echo cancellation such that data being transmitted via the DMT. transmitter is removed from the data being received by the DMT receiver. The two-wire to four-wire conversion hybrids 164–170 may comprise a transformer having a primary winding and at least one secondary winding and echo cancellation circuitry.

Figure 10:
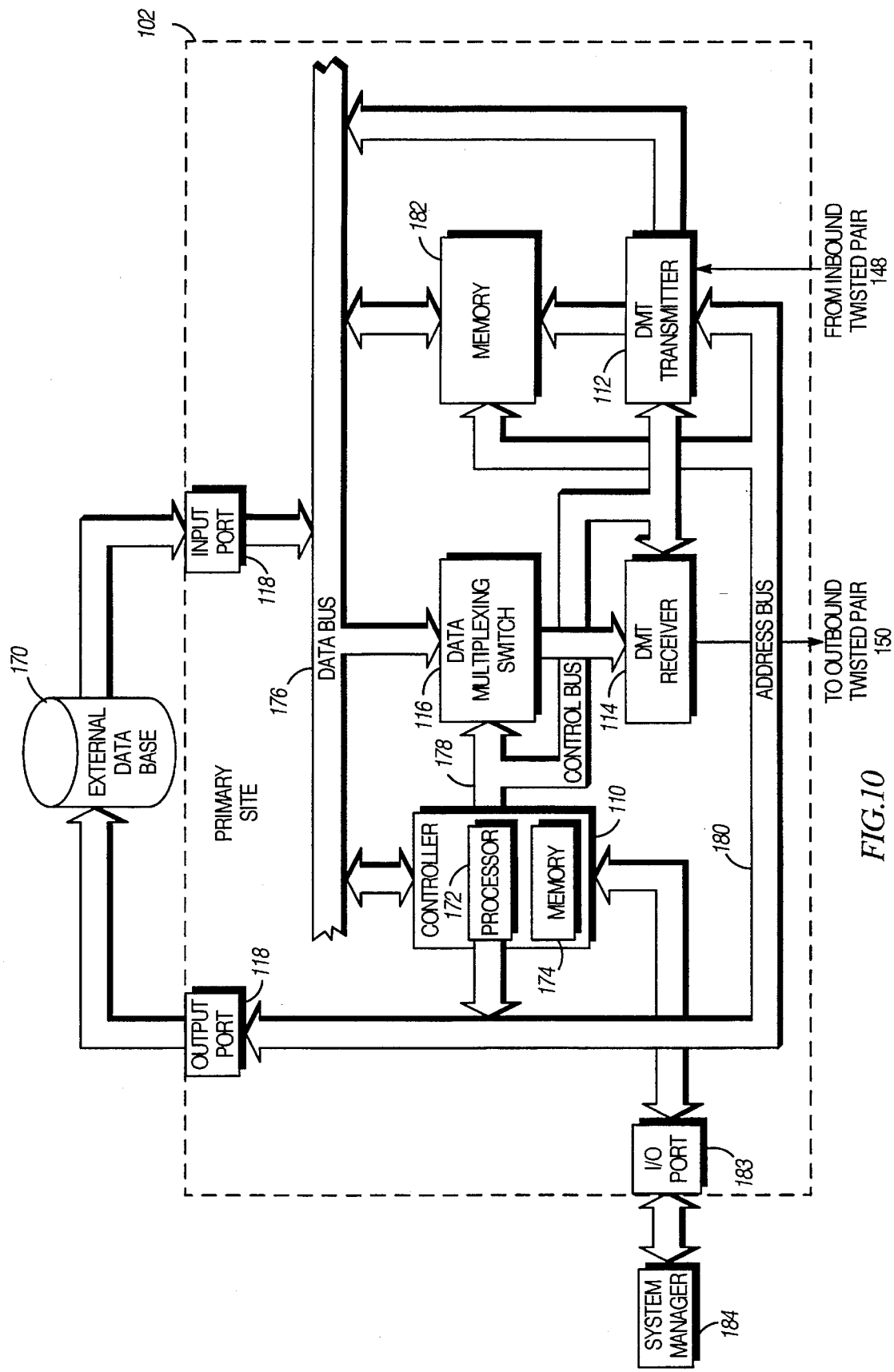
FIG. 10 illustrates a schematic block diagram of a primary site in accordance with the present invention.

FIG. 10 illustrates a schematic block diagram of the primary site 102. The primary site 102 includes a controller 110, data multiplexing switch 116, the DMT transmitter 114, the DMT receiver 112, memory 182, input/output port 118, input/output port 183, a data bus 176, a control bus 178, and an address bus 180. The controller 110 includes a processor 172 and memory 174. In practice, the controller 110 may be a micro-computer, a personal computer, a work station, or main frame computer. Whichever type of processing device is used as the controller 110, it should have sufficient processing power and memory to execute the primary site functions described throughout this specification.

In operation, the primary site determines, for data transmissions (calls), inbound and outbound carrier channel allocations for the inbound and outbound control channels; determines inbound site bit loading information for the plurality of secondary sites, i.e., the bit loading table for sites based on the spectral response of the inbound low pass transmission path; determines call bit loading tables, i.e., the bit loading tables that are based on a set of targeted secondary sites; determines carrier channel updates; and determines data processing for the system. Each of these function will be discussed in greater detail below.

The primary site may receive a request for data transmission from a variety of sources within the communication system and/or a variety of sources external to the system. Requests from external sources may be for a page, a facsimile, a telephone interconnect, or any type of controlling data transfer such as a data distributor's request to send data to a particular subscriber. To receive requests from the external sources, the primary site would include additional input/output ports. For example, the primary site would include a public switched telephone network (PSTN) interconnection to support telephone interconnect operations and to transceive facsimiles.

For requests that are received from within the communication system, the requests are from the carrier channels designated as the inbound control channel of the inbound low pass transmission path 148 by the DMT receiver 112. The DMT receiver 112 may provide, under the control of the controller 110, the request to memory 182 or to the data bus 176. The memory 182, which may be RAM (Random Access Memory), disk drive, magnetic tape, reel-to-reel, or any other type of digital storage means, stores information received from the DMT transceiver or any other information which the controller 110 places within the memory. Note that if memory 174 is of a sufficient size, memory 182 may not be required. The DMT transceiver 112 will be discussed in greater detail below with reference to FIGS. 40–45.

The controller 110 obtains the request either by reading the request directly from the data bus 176 or by reading the request from memory 182. Once the request is obtained, the controller 110 determines the type of service, or data transfer, being requested and the identity of the requesting subscriber. The request (or call request) may be for a two-way wireless communication, a paging request, a facsimile transmission, a POTS telephone call, a video data transfer, an audio data transfer, a data file transfer, or any other type of transmission of digital information that the communication system can support.

Having extracted the requesting unit's identity and the type of service being requested, the controller 110 determines whether the requesting unit is a valid user of the system. When the user has been validated the controller then determines whether this particular unit is authorized to receive the service requested. When the unit is authorized to receive the requested service, the controller 110 begins to process the request such that it may be fulfilled. In general, to fulfill the requested service, the controller 110 must first allocate carrier channels on the outbound low pass transmission path 150 (and the inbound transmission path 148 for two-way data transfers). Generally, carrier channel allocation is accomplished by retrieving the site bit loading tables for each site supporting one of the target units (i.e., target sites) and creating a call bit loading table for this particular call. Having created the call bit loading table, the controller determines, based on bandwidth requirements of the call (data transfer), the carrier channel allocations. A further discussion of carrier channel allocation will be presented below with reference to FIGS. 26–29.

Once the carrier channels are allocated, the controller 110 sends a carrier channel allocation message to the target sites via the carrier channels designated as the outbound control channel for the infrastructure. After informing the targets sites of the carrier channel allocation, the controller 110 obtains the requested data. The requested data may be obtained from an external data base 170, from an internal database, from the system manager 184, or from a source within the communication system. The external database 170, or the internal database, may store digital video information, digital audio information, data files, or any other type of digital information that may be of service to a subscriber. A source within the communication system may be one of the subscribers (e.g., a communication unit 142, a pager unit 138, a facsimile unit 130, a telephone 132, a television 134, or any other type of device that can receive digital information) affiliated with the system. For example, the communication unit 142 may transmit a digitized audio message (or an analog audio message) via an RF communication resource to an RF transceiver (base station) affiliated with a secondary site. The secondary site processes the digitized audio message into a DMT symbol and places it on a carrier channel designated as the inbound control channel.

Regardless of how the requested data was obtained, the controller 110 routes the requested data to the data multiplexing switch 116. The data multiplexing switch 116, which may be a TDMA (Time Division Multiplexing Access) switch, processes the data into a time frame manner. For example, the data multiplexing switch processes the requested data as a data entry in a TDM frame. Generating a TDM frame of a plurality of data entries is a well known process to one skilled in the art, thus no further discussion will be presented except to further explain the present invention. The TDM frame, and subsequent series of frames, is provided to the DMT transmitter 114. The DMT transmitter, which will be discussed in greater detail below with reference to FIGS. 34–39, transmits the data in the carrier channels of the outbound low pass transmission path 150.

To further illustrate the operations of the primary site 102, assume that a two way wireless communication has been requested. For this example, the two way wireless communication request would be received via the inbound low pass transmission path 148 in the carrier channel(s) designated as the inbound control channel. The request is received by the DMT receiver 112 which routes the request directly to the controller 110 or indirectly to the controller 110 via memory 182. Upon receiving the request, the controller 110 determines whether the requesting communication unit is authorized to access the system and, if so, whether the requesting communication unit is authorized to access this particular service. If both inquiries are answered positively, the controller 110 determines whether a sufficient number of inbound carrier channels and outbound carrier channels are available. If yes, the controller 110 determines whether there is a sufficient number of RF communication resources available to support the requested two way wireless communication. If this inquiry is answered positively, the controller 110 allocates the inbound and outbound carrier channels and the RF communication resources for this particular call request.

Having made these allocations, the controller 110 transmits the allocations, via the carrier channels designated as the outbound control channel, to the target secondary sites. Each target secondary site stores the carrier channel allocation information and data transmission begins. Data transmissions may begin when a communication unit transmits an audio message to an affiliated RF transceiver which, in turn, routes a digitized representation of the audio message to a secondary site. The secondary site converts the digitized representation into a DMT symbol, or a plurality of DMT symbols, and transmits the DMT symbols in the inbound carrier channels allocated to support this particular call. The primary site receives the DMT symbols, reconstructs digitized representations, combines the reconstructed digitized representations with other digitized representations. The combined digitized representations are then transmitted to the DMT transmitter which converts the combined digitized representations into DMT symbols. The DMT symbols are placed on the carrier channels of the outbound low pass transmission path allocated for this call. The targeted secondary sites receive the DMT symbols, reconstruct the digitized representations and routes the digital representations to the targeted subscribers. This process continues until the call ends.

Figure 11:
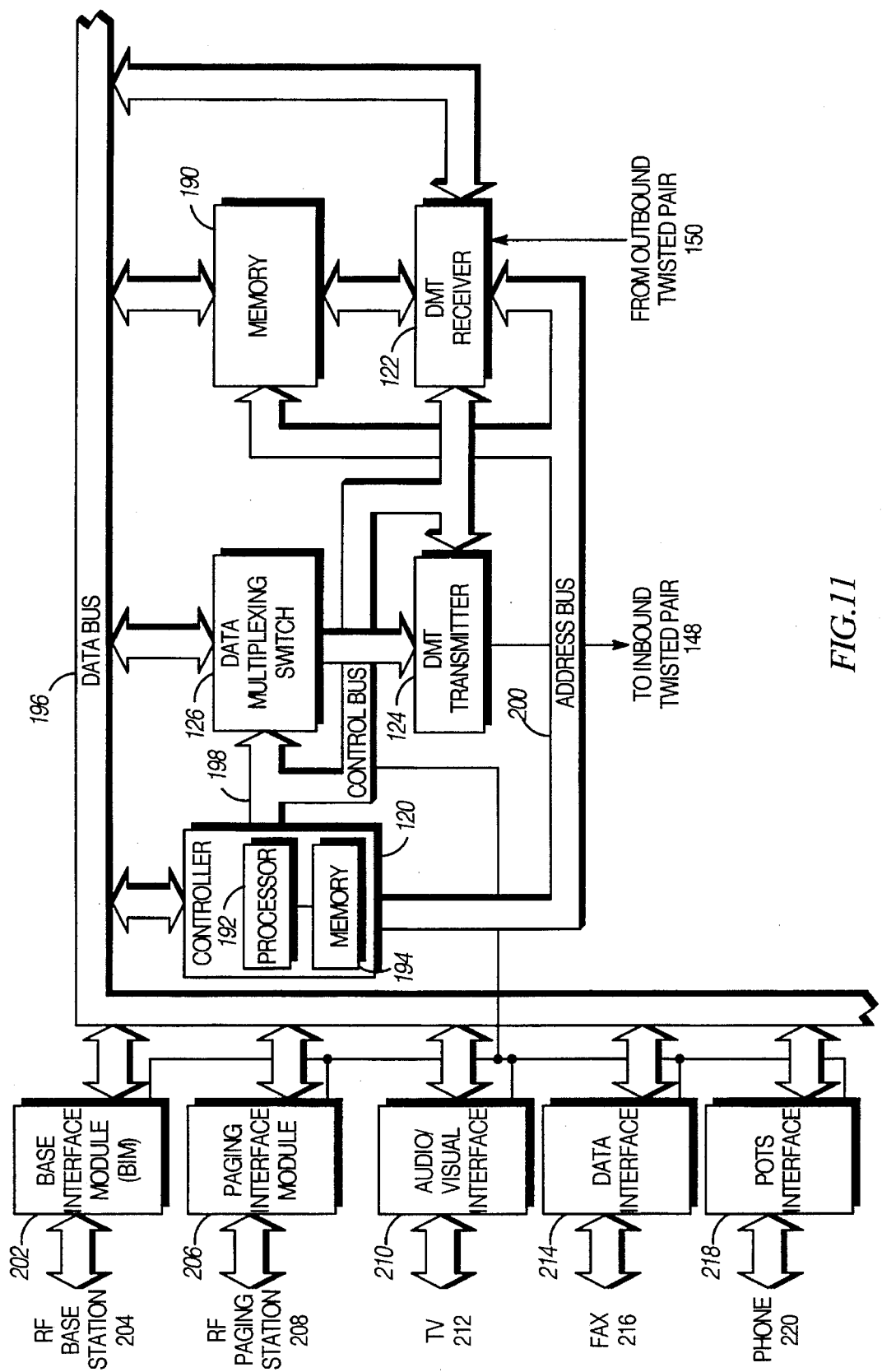
FIG. 11 illustrates a secondary site in accordance with the present invention.

FIG. 11 illustrates a schematic block diagram of a secondary site 108. The secondary site 108 includes a site controller 120, a data multiplexing switch 126, a DMT transmitter 124, a DMT receiver 122, memory 190, a data bus 196, a control bus 198, an address bus 200, and a plurality of subscriber interfaces 128. As shown, the subscriber interfaces 128 may be a base interface module 202, a paging interface module 206, an audio/visual interface 210, a data interface 214, or a plain old telephone system interface 218. In operation, the DMT receiver 122 receives information from an outbound twisted pair 150 and either places that information within the memory 190 or places it on the data bus 196. Received control information is placed on the data bus 196 and routed to the site controller 120. The site controller includes a processor 192 and memory 194 and may be a personal computer, a work station, or a main frame computer system. Note that if memory 194 is of sufficient size memory 190 may not be needed.

Upon receiving the control information, the site controller 120 interprets the control information and determines whether an action is required by the secondary site. For example, the control information may indicate that one of the subscriber units affiliated with the secondary site may be required to participate in a communication. Alternately, the control information may indicate that a POTS call has been received, data is to be transferred, an audio/visual data sequence has been received, or a paging request has been received. Regardless of what the control information indicates, it is stored in memory such that the secondary site controller can process, for the secondary site, the service. Thus, when call information is transmitted on carrier channels of the outbound low pass transmission path, the site controller 120 extracts the data from the appropriate carrier channels and routes it to the targeted subscriber.

As mentioned, the subscriber interfaces 128 can be of a variety of different types of interfaces. With a variety of subscriber interfaces, a secondary site can provide a variety of services to affiliated subscribers. For example, the base interface module 202 allows the secondary site to interface with an RF base station 204 such that subscribers affiliate with the secondary site can access two-way wireless communications. The paging interface module 206 allows the secondary site to interface with an RF paging station 208.

The audio/visual interfaces 210 allows the secondary site 108 to interface with a television set 212, a cable box, a VCR, a virtual VCR, a teleconferencing interface, etc. The data interface 214 allows the secondary site 108 to interface with a facsimile machine 216, a modem, or another type of digital interface device. The POTS interface 218 allows the secondary site 108 to interface with a telephone 220.

The site controller 120, based on the control information, addresses the appropriate subscriber interface such that data may be received or transmitted via the subscriber interface 128. For example, assume that the control information indicates a paging instruction. Upon receiving the control information, the site controller interprets the paging instruction to determine which carrier channels are being used to carry the paging message and which particular subscriber units are to receive the paging message. Having received and interpreted the control information, the DMT receiver 122 subsequently receives the paging message in the appropriate carrier channel and routes it, under the control of the site controller 120, to the paging interface module 206 via the data bus 196. Upon receiving the paging message, the paging interface module 206 converts the paging message into an RF paging signal and transmits the RF paging signal to the appropriate RF paging station 208.

As an alternative example, assume that the control information indicates a two way RF communication and a POTS communication. In this example, the site controller 120 stores the control information indicating the types of calls and the carrier channel which is carrying the information. When the DMT receiver 120 receives the call, it routes the data to the base interface module 202 and the POTS interface 218 under the control of the system controller 120. Thus, the two way RF communication information is prepared by the base interface module 202 and routed to the appropriate subscriber units affiliated therewith. Similarly, the POTS interface 218 prepares the data and routes it to the telephone 220.

Information may also be transmitted from the secondary site 108. In this mode, the DMT transmitter 124 places data on allocated carrier channels of the inbound twisted pair 148. To do this, the DMT transmitter 124 receives a digital data stream from the data multiplexing switch 126. The DMT transmitter 124 converts the digital data stream into a plurality of DMT symbols. The plurality of DMT symbols are placed on the allocated carrier channels. A detailed discussion of the DMT transmitter 124 will be provided below which reference to FIGS. 35–39.

Figure 12:
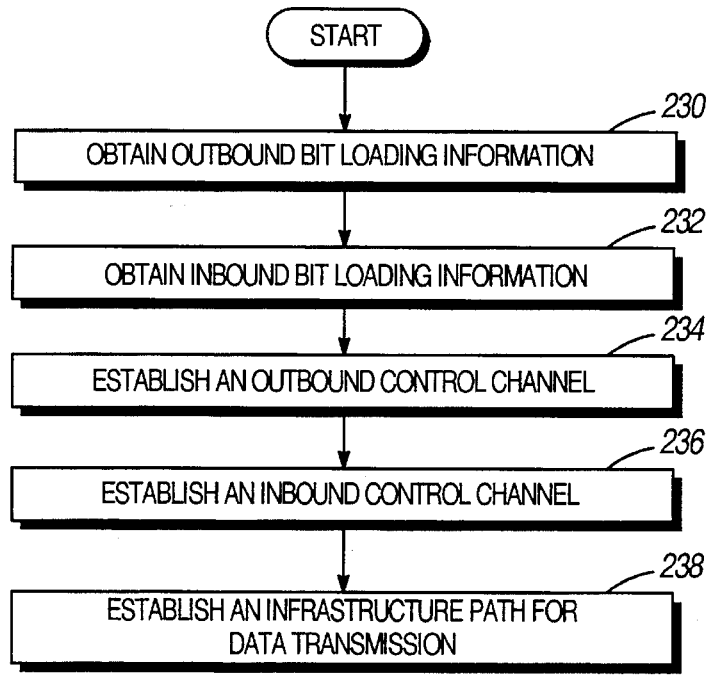
FIG. 12 illustrates a logic diagram for the overall operation of a primary site in accordance with the present invention.

FIG. 12 illustrated a logic diagram that may be used by the primary site to perform an overall system operation function. At step 230, the primary site obtains outbound bit loading information from a plurality of secondary sites. This is generally done by providing a training signal to each of the plurality of secondary sites. The training signal is a DMT symbol comprised of a plurality of signals modulated on the each of the carrier channels having a constant magnitude. Each of the secondary sites calculate the bit loading information from a spectral response of the output transmission path, wherein the bit loading information indicates, for each carrier channel, the number of bits that the carrier channel can support. Then, in a sequential manner, the plurality of secondary sites provide the outbound site bit loading information to the primary site. The sequential order may be determined by the primary site or by a predetermined polling algorithm.

At step 232, the primary site obtains inbound bit loading information from the plurality of secondary sites. This is done by sequentially requesting a second training signal from each of the secondary sites. Upon receiving the second training signal from a secondary site via the inbound transmission path, the primary site determines a spectral response of the inbound transmission path. From the spectral response, the primary site determines the inbound site bit loading information for this particular secondary site. Once the bit loading information is obtained for this secondary site, the primary site determines the inbound bit loading information for the remaining secondary sites.

At step 234, the primary site utilizes the outbound bit loading information to establish an outbound control channel. This is generally done by determining, for each carrier channel within the bit loading tables, a lowest bit loading value, having obtained the lowest value for each carrier channel, a lowest common denominator (LCD) outbound control channel bit loading table is generated. From this LCD outbound control channel bit table, the primary site selects, based on bandwidth requirements of the control channel, at least one carrier channel to act as the outbound control channel. The outbound control channel bandwidth may be determined based on the type of system employing the system infrastructure of the present invention. For example, if the system transmits a substantial amount of data between the sites, the bandwidth requirements will be much greater than the bandwidth requirements for a system that has little data transmission between sites.

At step 236, the primary site utilizes the inbound bit loading information to establish an inbound control channel. The primary site chooses the inbound control channel in a similar fashion as it chooses the outbound control channel. Note that the inbound and outbound control channels are being selected for the infrastructure of the system. These are not the RF control channels used by the subscriber units in a two way communication system or the control channel used in a paging RF system.

At step 238, the primary site utilizes the inbound and outbound bit loading information to establish an infrastructure for a data transmission. In general, this is accomplished by first determining the number of sites involved in the data transmission and retrieving their respective site bit loading tables. From the site bit loading tables, a lowest common denominator call bit loading table is determined. From the LCD bit loading table for the particular data transmission, inbound and outbound carrier channels are allocated to the data transmission based on the bandwidth requirements. Note that for a system infrastructure having only an outbound transmission path the primary site would not normally allocate inbound carrier channels to the data transmissions.

Figure 13:
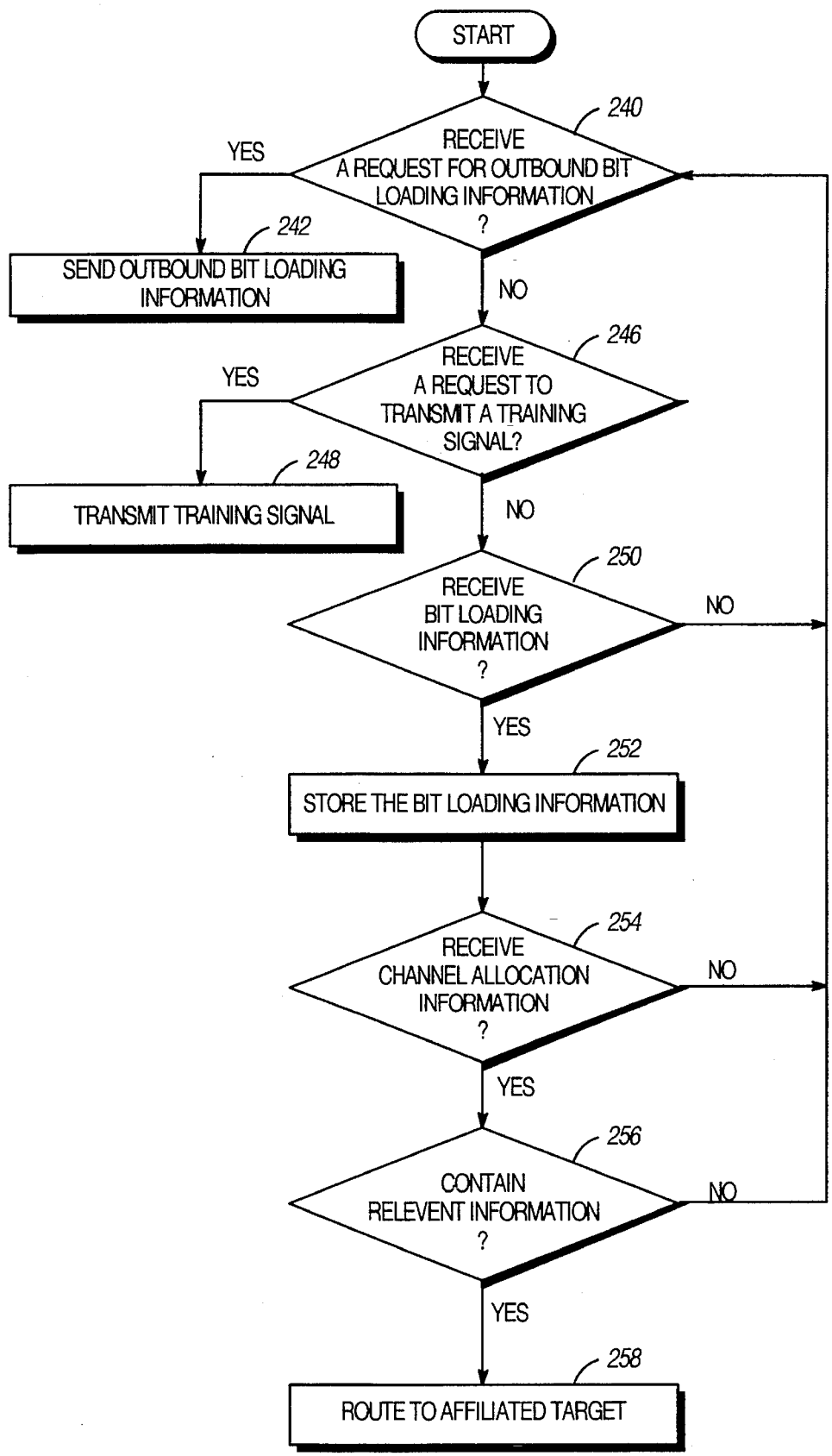
FIG. 13 illustrates a flow diagram for an overall operation of a secondary site in accordance with the present invention.

FIG. 13 illustrates a logic diagram which may be used by the secondary site to perform overall system operation functions. At step 240, the secondary site determines whether it has received a request for outbound bit loading information. If the answer is yes, the process proceeds to step 242 wherein the secondary site sends secondary bit loading information. Generation of the outbound bit loading information is done upon receiving a training signal from the primary site and calculating a spectral response of the outbound transmission path. From the spectral response, bit loading for each carrier channel is determining and compiled into an outbound site bit loading table.

If the secondary site has not received a request for outbound bit loading information, it proceeds to step 246 where it is determined whether it has received a request to transmit a second training signal. If the answer is yes, the process proceeds to step 248 wherein the secondary site transmits a second training signal to the primary site. The second training signal is a DMT symbol comprised of a plurality of signals modulated on each of the carrier channels having a constant magnitude.

If the secondary site has not received a request to transmit a training signal, the process proceeds to step 250 where it determines whether it has received a bit loading table. If the answer is no, the process proceeds back to step 240 and waits in a continuous loop until a request for outbound bit loading information is received, a request to transmit a second training signal is received, or the secondary site receives bit loading information. When the secondary site receives bit loading information, the process proceeds to step 252 where the secondary site stores the bit loading information. The bit loading information is received from the primary site and typically comprises an LCD call bit loading table.

Having stored the bit loading information, the process proceeds to step 254 where the secondary site determines whether it has received channel allocation information. If the answer is no, the process proceeds back to step 240. If, however, the answer is yes, the process proceeds to step 256 where the secondary site determines whether the channel allocation information contains any relevant information for the secondary site. The channel allocation information will contain relevant information for the secondary site when information is to be transmitted to one of the subscribers affiliated with this secondary site. For example, if a two way wireless cellular telephone is affiliated with the secondary site, and the channel allocation information has the cellular telephone involved in a communication, the channel allocation information will contain relevant information for the secondary site. Having determined that the channel allocation information contains relevant information for the secondary site, the process proceeds to step 258 where the relevant information is routed to an affiliated target or a subscriber unit.

Figure 14:
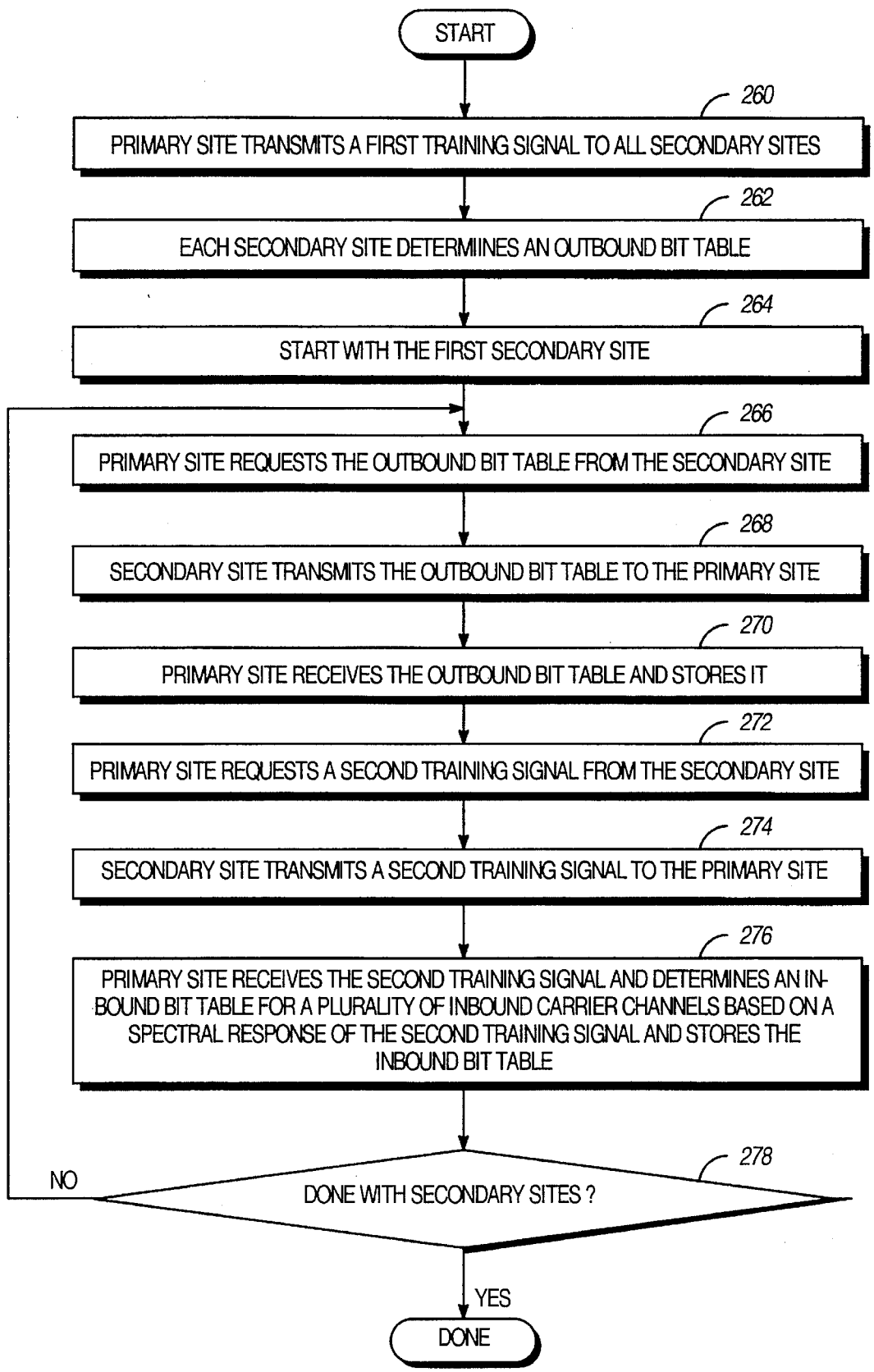
FIG. 14 illustrates a logic diagram for obtaining bit loading information in accordance with the present invention.

FIG. 14 illustrates a logic diagram that the primary site may utilize to determine the inbound bit loading information and the outbound bit loading information. At step 260, the primary site transmits a first training signal to all secondary sites. The training signal is a multi-frequency signal having a fixed amplitude. For example, the training signal may be a plurality of sinusoid signals having a constant amplitude wherein the frequency of each of the sinusoidal signals equates to a carrier channel frequency in the ADSL bandwidth. For example, one sinusoidal signal will have a frequency of 25 kilohertz, a second signal will have a frequency of approximately 29 kilohertz, a third signal will have a frequency of approximately 33 kilohertz, wherein each of the remaining sinusoidal signals will be increased by approximately four kilohertz up to approximately 1.1 megahertz. Thus, there will be up to 256 signals combined into a DMT symbol, which is transmitted as the training signal.

In step 262, each of the secondary sites receives the first training signal and determines a spectral response of the outbound transmission path. From the spectral response, an outbound bit loading table for a plurality of outbound carrier channel is generated. The spectral response is determined by analyzing each of the plurality of sinusoidal signals of the training signal. In essence, the secondary site determines the magnitude, and/or phase of the received sinusoidal signal and compares it to the magnitude and phase of the known transmitted sinusoidal signal. From the differences that occur, a spectral response can be obtained for an individual sinusoidal signal of the training signal. The individual sinusoidal signal corresponds to a carrier channel. From the spectral response, the secondary site can then calculate the bit loading for this particular carrier channel. For example, if the sinusoidal signal for a particular carrier channel had very little degradation from its transmitted signal, the carrier channel can handle a maximum number of bits. For an ADSL system, the maximum bits a carrier channel can accommodate per frame is 15 bits. Thus, as the quality of the transmission path decreases, the number of bits of a particular carrier channel can accommodate, or bit loading, decreases. Per ADSL requirements, the minimum number of bits a channel can accommodate is two bits. Thus, if the spectral response of a particular carrier channel is so poor that it would only accommodate 1 bit, this particular carrier channel is set to a bit loading of zero.

At step 264, the primary site begins collecting the outbound site bit loading tables from the sites by starting with a first secondary site. To retrieve the site bit loading table from the first secondary site, the primary site sends a request message to the secondary site wherein, upon receiving the request message, the secondary site responds with its bit loading table. Upon receiving the bit loading table from the first secondary site, the primary site stores it and then proceeds to step 266 where it requests the outbound bit loading table from another secondary site. At step 268, the next secondary site transmits the outbound bit loading table to the primary site wherein the primary site stores the outbound bit loading table as shown in step 270.

To collect inbound bit loading information from a secondary site, the primary site transmits a second training signal request to a secondary site. This is shown in step 272. The second training signal is similar to the first training signal in that it contains a plurality of sinusoidal signals separated in frequency by approximately 4 kilohertz starting at 25 kilohertz up to a frequency of 1.1 megahertz.

Upon receiving this request, a secondary site transmits the second training signal to the primary site, which is shown at step 274. Upon receiving the second training signal, the primary site determines an inbound bit loading table for a plurality of inbound carrier channels based on the spectral response of the secondary training signal, which is shown at step 276. In addition, at step 276, the primary site stores the inbound bit table for that particular secondary site. The primary site calculates the spectral response in a similar fashion as the secondary sites calculated the spectral response of the first training signal. Having stored the inbound bit loading table and outbound bit loading table for a secondary site, the primary site determines at step 278 whether is has obtained the inbound and outbound bit loading tables for all of the secondary sites. If not, the process repeats at step 266 for a subsequent secondary site and continues in this loop fashion until the primary site has the inbound and outbound bit loading table for all of the secondary sites. Having done this, the process is complete.

Figure 15:
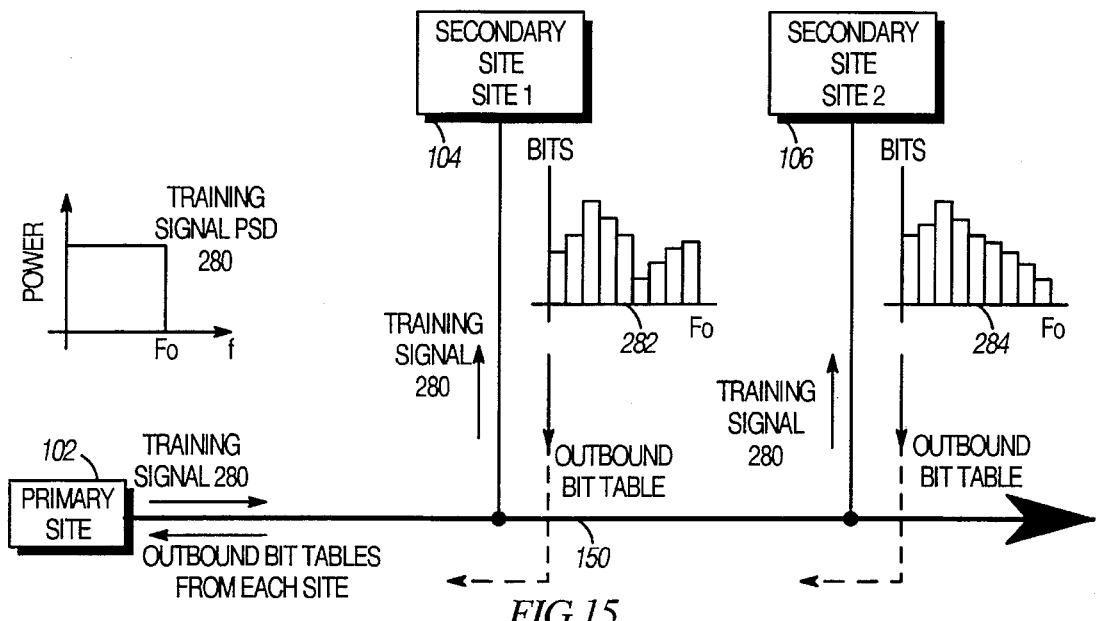
FIG. 15 illustrates an exemplary process for obtaining bit loading information in accordance with the present invention.

FIG. 15 illustrates the process of obtaining the outbound bit loading tables from a plurality of secondary sites. As shown, the primary site 102 transmits a training signal 280 to a plurality of secondary sites 104–106. The training signal 280 is shown in the frequency domain or spectral response. As mentioned above, the training signal 280 contains a plurality of sinusoidal signals having the same amplitude but separated in frequency by 4 kilohertz. The starting frequency of the training signals may be 4 kilohertz or 25 kilohertz and runs up to 1.1 megahertz.

The first secondary site 104, upon receiving the training signal, generates a spectral response for each of the sinusoidal signals of the training signal 280. From the spectral response, the secondary site determines a bit loading for each of the carrier channel to produce a bit loading table 282. As shown, the bit loading table of the first secondary site 104 has some carrier channels having more bit loading capabilities while others have less. Lower bit loading capabilities result from the transfer function of the outbound transmission path at particular carrier channels having more attenuation than other carrier channels which have less attenuation.

The second secondary site 106 calculates a similar bit loading table and provides the bit loading table back to the primary site 102. Note that the bit loading information from the first secondary site 104 is considerably different than the bit loading information from the second secondary site 106. This occurs due to different characteristics in the transmission path between the primary site and the first secondary site 104 and the transmission path between the primary site and the second secondary site 106. Typically, the first secondary site 104 and the second secondary site 106 will be separated by a significant amount or geographical difference such that the characteristic impedance of the transmission path connecting the particular secondary sites to the primary site will be different.

Figure 16:
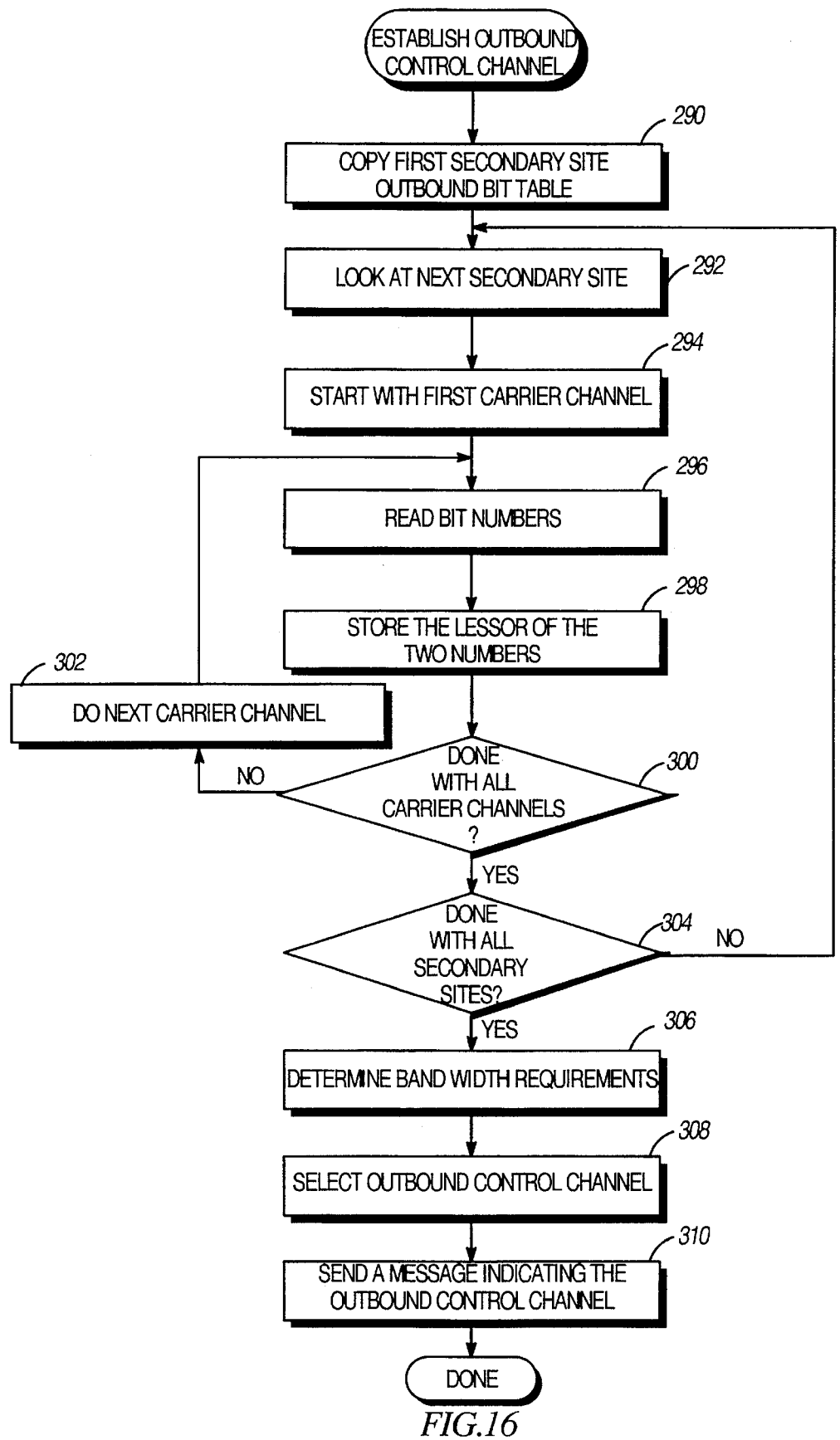
FIG. 16 illustrates a logic diagram for determining an outbound control channel for the system of FIG. 8 in accordance with the present invention.

FIG. 16 illustrates a logic diagram which the primary site may utilize to select an outbound control channel. At step 290, the primary site copies the outbound bit loading table of a first secondary site to an outbound control channel bit loading table. The outbound control channel bit loading channel at this stage is identical to the outbound bit loading table of the first secondary site, thus, it contains the number of bits that a particular carrier channel can accommodate for each of the plurality of carrier channels, which, for an ADSL system, is 256.

As step 292, the primary site looks at a next secondary site's outbound bit loading table. At step 294, the primary site starts with the first carrier channel entry in the outbound bit loading table of the next secondary site and the first carrier channel entry in the outbound control channel bit loading table. At step 296, the bit loading, or bit numbers, for the first carrier channel entry in the respective outbound bit loading tables are compared. At step 298, the lessor of the two bit numbers, or bit loading, is stored in the outbound control channel bit loading table. At step 300, the primary site determines whether all of the carrier channel entries have been compared. When all of the carrier channels have not been compared, the process proceeds to step 302 where the next carrier channel entry in the outbound control channel bit loading table is compared with the corresponding entry in the next secondary site's bit loading table.

If, however, all of the carrier channels entries have been compared, the process proceeds to step 304 where the primary site determines whether it has compared the outbound control channel bit loading table with the outbound bit loading tables for all of the secondary sites. If the answer is no, the process proceeds to step 292 wherein the bit loading table of another secondary site is compared with an updated outbound control channel bit loading table.

If, however, the primary site has compared all of the bit loading tables of all of the secondary sites to obtain the outbound control channel bit loading table the process proceeds to step 306. At step 306, the primary site determines outbound control channel bandwidth requirements. As mentioned, each carrier channel may accommodate between 2 to 15 bits per frame. In an ADSL system, the frequency spectrum is transmitted once every 250 microseconds or at a 4 kilohertz rate. Thus, one particular carrier channel can accommodate a given bandwidth based on the frame duration. For example, assume that a particular carrier channel can accommodate 2 bits, at the 4 kilohertz rate, the carrier channel can support a call having a bandwidth of 8 Kbps (kilobits per second). Thus, if the outbound control channel requires a bandwidth of 32 kilobits per second, a carrier channel that can accommodate 8 bits is required, or a sum of carrier channels that can accommodate 8 bits is required, for the control channel.

Given the outbound carrier channel bandwidth requirements and accessing the outbound bit loading table, an outbound control channel is selected at step 308. Having selected the outbound control channel, the primary site transmits a signal to all the secondary sites indicating the carrier channel allocations as the control channel. This is done at step 310. In general, the outbound control channel is used to transmit control information from the primary site to the plurality of secondary sites. Having transmitted the control channel message to the secondary sites, the process is complete.

Figure 17:
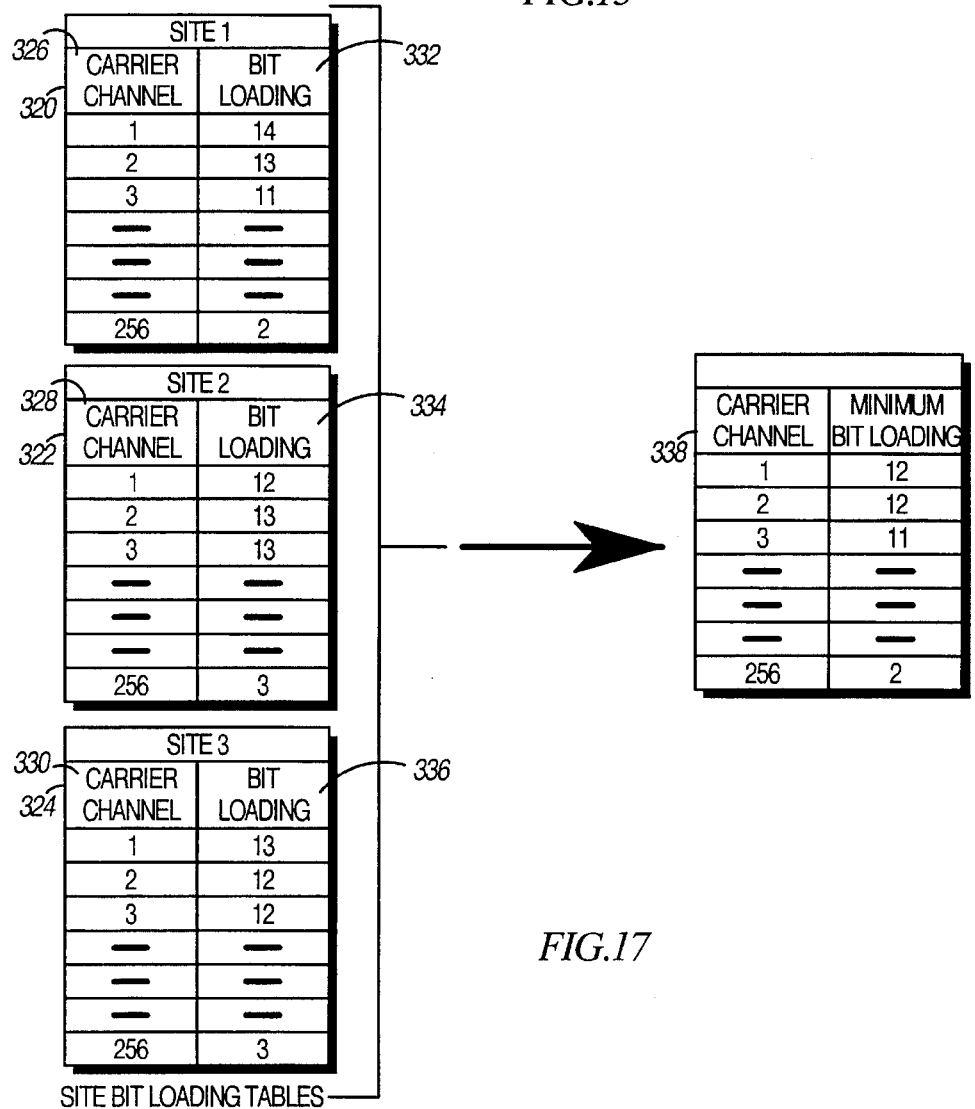
FIG. 17 illustrates an exemplary process for determining an outbound control channel in accordance with the present invention.

FIG. 17 is an illustrative example of how the outbound control channel bit loading table 338 is generated. Outbound bit loading tables for the plurality of sites are shown as outbound site bit loading tables 320–324. Each of the outbound bit loading tables 320–324 contains a carrier channel field 326–330 and a bit loading field 332–336. As mentioned, an ADSL system has 256 carrier channels such that each of the site bit loading tables 320–324 includes 256 carrier channel entries.

The outbound control channel bit loading table 338 is generated by comparing the bit loading, on a carrier channel by carrier channel basis, of all of the site bit loading tables. Thus, to begin producing the outbound control channel bit loading table 338, the bit loading table for the first site 320 is copied as the outbound control channel bit loading table 338. Next, a carrier channel by carrier channel comparison is made between the information stored in the outbound control channel bit loading table 338 and the outbound bit loading table of the remaining two sites 322,324. Thus, comparing the bit loading of carrier channel 1 of site two with the bit loading information of carrier channel 1 in the outbound control channel bit loading table 338, it is seen that the bit loading of carrier channel 1 in site two is less than the bit loading of channel 1 in site one. Thus, the outbound control channel bit loading table 338 is updated with the lessor of the two bit loading values, or in this case, 12 bits as indicated in the site bit loading table 322 of site two.

Next, the bit loading for carrier channel 2 is compared between the site bit loading table 322 of site two and the outbound control channel bit loading table 338. As seen, the bit loading for carrier channel 2 for the first and secondary sites is 13 bits. Note that from FIG. 17, the outbound control channel bit loading table 338 has 12 bits for the bit loading of carrier channel 2. This is due to the bit loading information of site three. As shown in site three, the bit loading for carrier channel 2 is 12. This process continues on a carrier channel by carrier channel basis until the outbound control channel bit loading table 338 contains, for each carrier channel entry, the lowest bit loading value of all of the site bit loading tables.

Note that the comparison of bit loading information of all of the site bit loading tables may be done in a variety of ways. For example, all of the tables may be compared simultaneously to generate the outbound control channel bit loading table 338. Alternately, the comparison may begin at control channel 256 or in any other manner. It should be readily apparent to one skilled in the art that there are a plurality of ways to generate the outbound control channel bit loading table 338 from the plurality of site bit loading tables 320–324.

Figure 18:
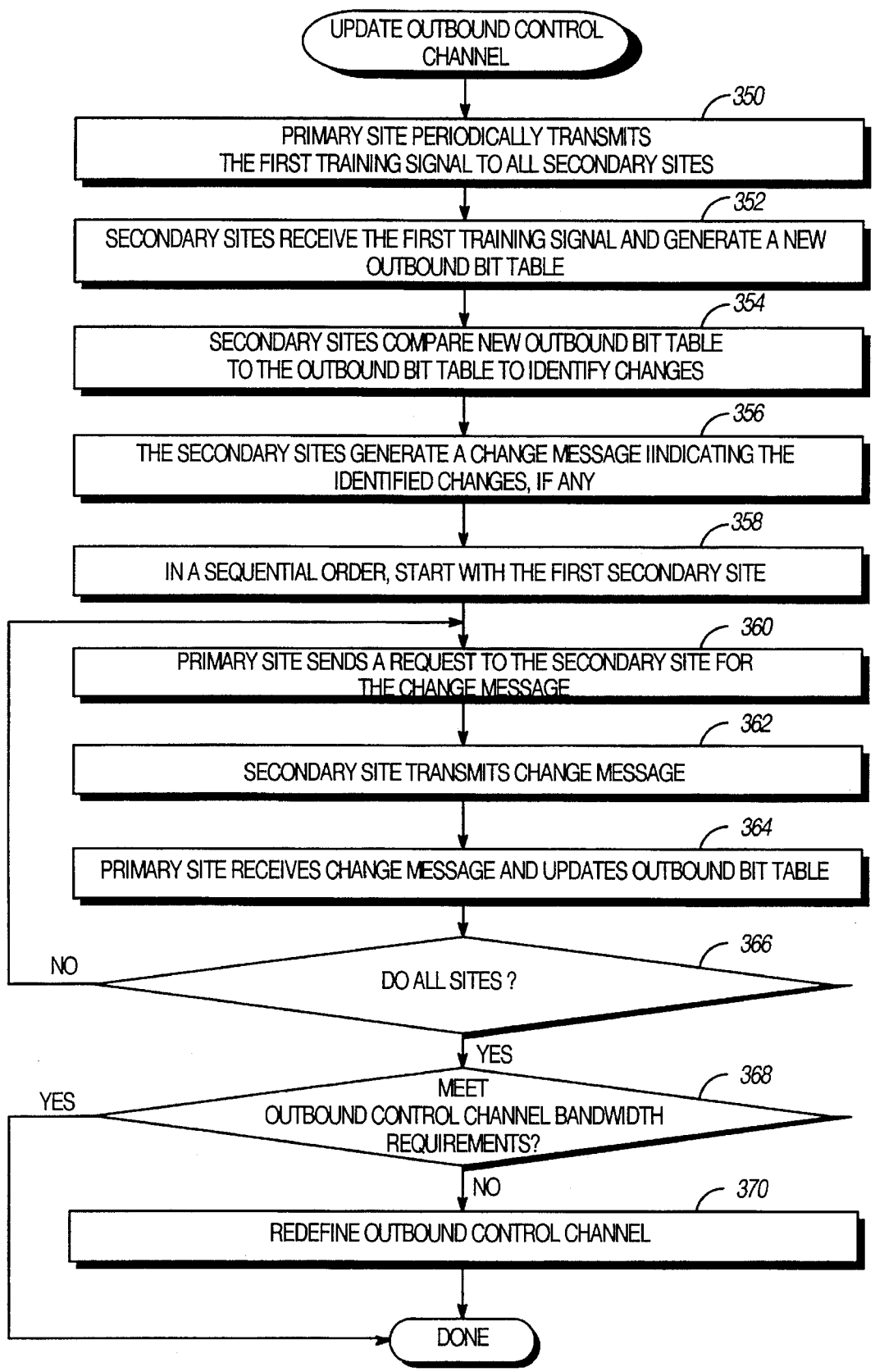
FIG. 18 illustrates a logic diagram for updating the outbound control channel in accordance with the present invention.

FIG. 18 illustrates a logic diagram that the primary site may utilize to update the outbound control channel. As is known, over time the transmission characteristics of the telephone line changes. Thus requiring the spectral response of the data line to be periodically updated. The ADSL standard dictates that once every 69 frames the training sequence be transmitted which may be used to update the bit loading. Thus, the spectral response of the transmission path is being updated every few hundred milliseconds.

At step 350, the primary site begins the updating of the outbound control channel by periodically transmitting the first training signal to all of the secondary sites. As mentioned above the training signal comprises a plurality of sinusoidal signals having a similar amplitude but separated in frequency by approximately 4 kilohertz in the range of 25 kilohertz up to 1.1 megahertz. At step 352, the secondary sites receive the first training signal and generate a new outbound bit loading table. The new outbound bit loading table may be separately stored from the existing outbound bit loading table or may overwrite the existing outbound bit loading table after changes are identified. Recall from the above discussion that the outbound bit loading table is generated from a spectral response of the transmission path as it receives the first training signal. The spectral response is then equated to the number of bits that a particular carrier channel can accommodate, which, in turn, is used to generate the outbound bit loading table.

At step 354, each of the secondary sites compare the new outbound bit table to the old outbound bit loading table to identify any changes. At step 356, the secondary sites generate a changed message indicating the identity of any changes. Note that the secondary site may generate a no change message if no changes have occurred or may simply omit generating a message entirely.

At step 358, the primary site, in a sequential order, requests either the new bit loading table, or a change message from a first secondary site. At step 360, the primary site sends a request to the secondary site for the change message which is transmitted by the secondary site at step 362. At step 364, the primary site receives the changes message and updates its outbound site bit loading table for the particular secondary site. At step 366, the primary site determines whether it has updated the outbound bit loading tables for all of the secondary sites. If not, the process repeats at 360 until all of the outbound site bit loading tables have been updated. Once all of the outbound site bit loading tables have been updated, the primary site determines whether the outbound control channel bandwidth requirements are met by the current carrier channel allocations. This occurs at step 368. If the bandwidth requirements are met the process is complete. If, however, the bandwidth requirements are not met the primary site reallocates carrier channel to redefine the outbound control channel. This occurs at step 370 and will be discussed in greater detail with reference to FIGS. 30–33.

Figure 19:
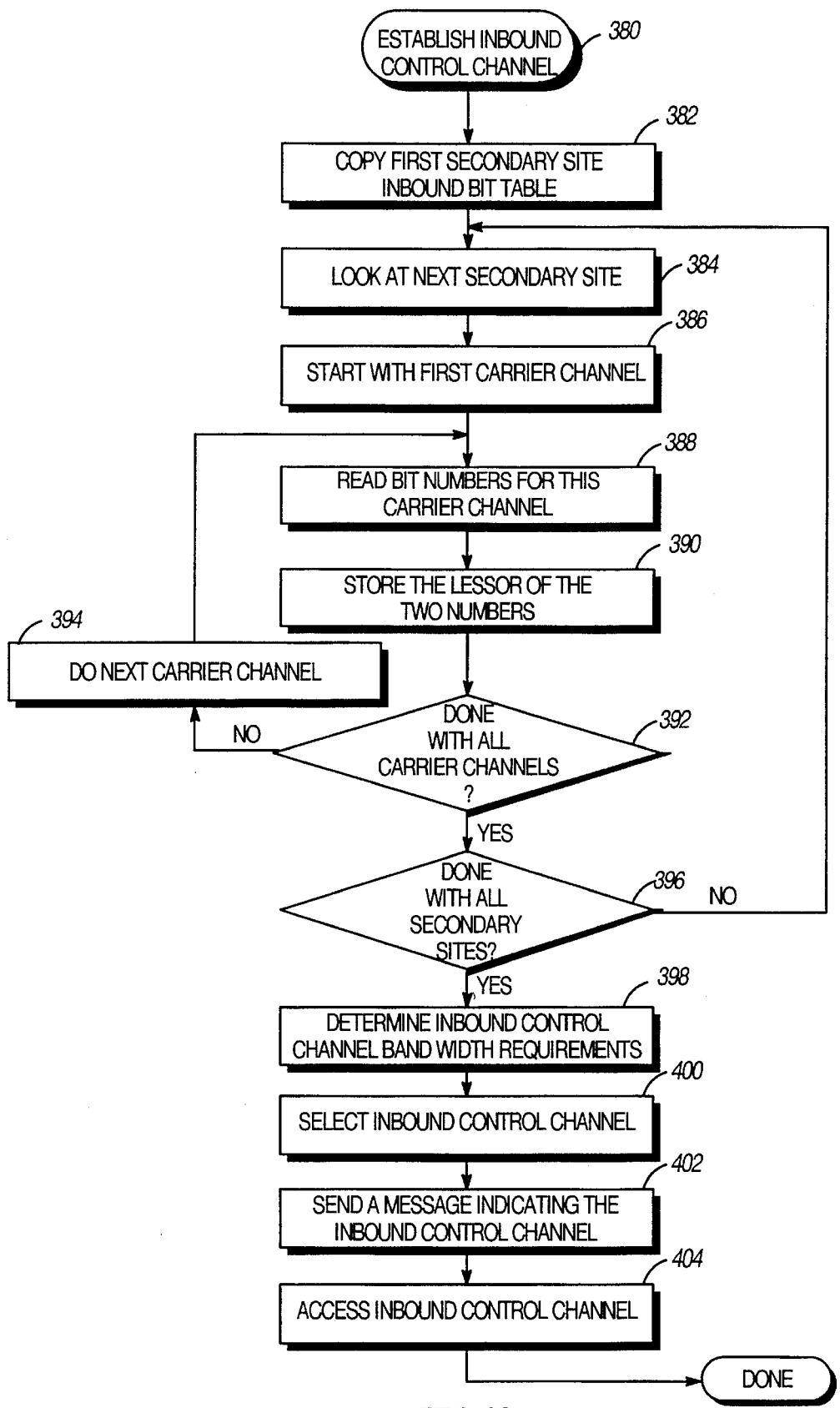
FIG. 19 illustrates a logic diagram for determining an inbound control channel for the system of FIG. 8 in accordance with the present invention.

FIG. 19 illustrates a logic diagram that may be used to establish an inbound control channel 380. At step 382, a first inbound bit loading table of a secondary site is copied into an inbound bit loading table. This is a similar step as that done for the outbound control channel case described above. At step 384, the bit loading table for a subsequent, or next, secondary site is retrieved. At step 386, a comparison, which is done on a carrier channel by carrier channel basis, is made between the bit loading information of the inbound control channel bit loading table and the next secondary site bit loading table.

At step 388, for the first carrier channel, the bit numbers, or bit loading, for this carrier channel is compared between the bit loading information in the inbound control channel bit loading table and the next secondary site bit loading table. At step 390, the lessor of the two bit loading values is stored in the inbound control channel bit loading table. Thus, if the data already in the inbound bit control channel bit loading table is the lessor of the two values, that value remains, otherwise, the bit loading value for the next secondary site is stored in the inbound control channel bit loading table.

Having compared the bit loading of the first carrier channel entry in the inbound control channel bit loading table and the next secondary site bit loading table, the process proceeds to step 392, where a determination is made as to whether all the carrier channel entries have been compared. When there are further carrier channel comparison to be made, the process proceeds to step 394 wherein the bit loading of the next carrier channel entry in the inbound control channel bit loading table and next secondary site bit loading table are compared as shown in step 388. At step 390, the lessor of the two bit loading values is stored in the inbound control channel bit loading table.

When the bit loading of all of the carrier channel entries of the next secondary site has been compared to the inbound control channel bit loading table, the process proceeds to step 396 where it is determined whether all of the secondary site bit loading tables have been compared to the inbound control channel bit loading table. If not, the process returns to step 384 where the next secondary site bit loading table is compared with the most current inbound control channel bit loading table.

If, however, all of the secondary site bit loading tables have been compared to the inbound control channel bit loading table, the process proceeds to step 398 where inbound control channel bandwidth requirements are determined. The inbound control channel bandwidth requirements can be determined by accessing a database where bandwidth requirements are stored, or inputted by a user of the communication system infrastructure. For example, if 32 kilohertz of bandwidth are needed, given that a frame cycle is 250 microseconds, or operating at a 4 KHz rate, the inbound control channel needs 8 bits per frame to meet the bandwidth requirements.

Once the bandwidth requirements have been obtained, the process proceeds to step 400 where at least one of a plurality of inbound carrier channels is selected as the inbound control channel from the inbound control channel bit loading table based on the bandwidth requirements. Having selected at least one of the plurality of inbound carrier channels to function as the inbound control channel, the primary site sends a message to all the secondary sites identifying the inbound carrier channel, or channels, functioning as the inbound control channel, this is done at step 402. Once the inbound control channel has been identified, the secondary sites may access the inbound control channel in a variety of ways. For example, the secondary sites may access the inbound control channel in a time division multiplexing access manner (TDMA), a frequency division multiplexing accessing manner (FDMA), or a combination of TDMA and FDMA. This is depicted at step 404 and will be further described with reference to FIGS. 20 and 21.

Figure 20:
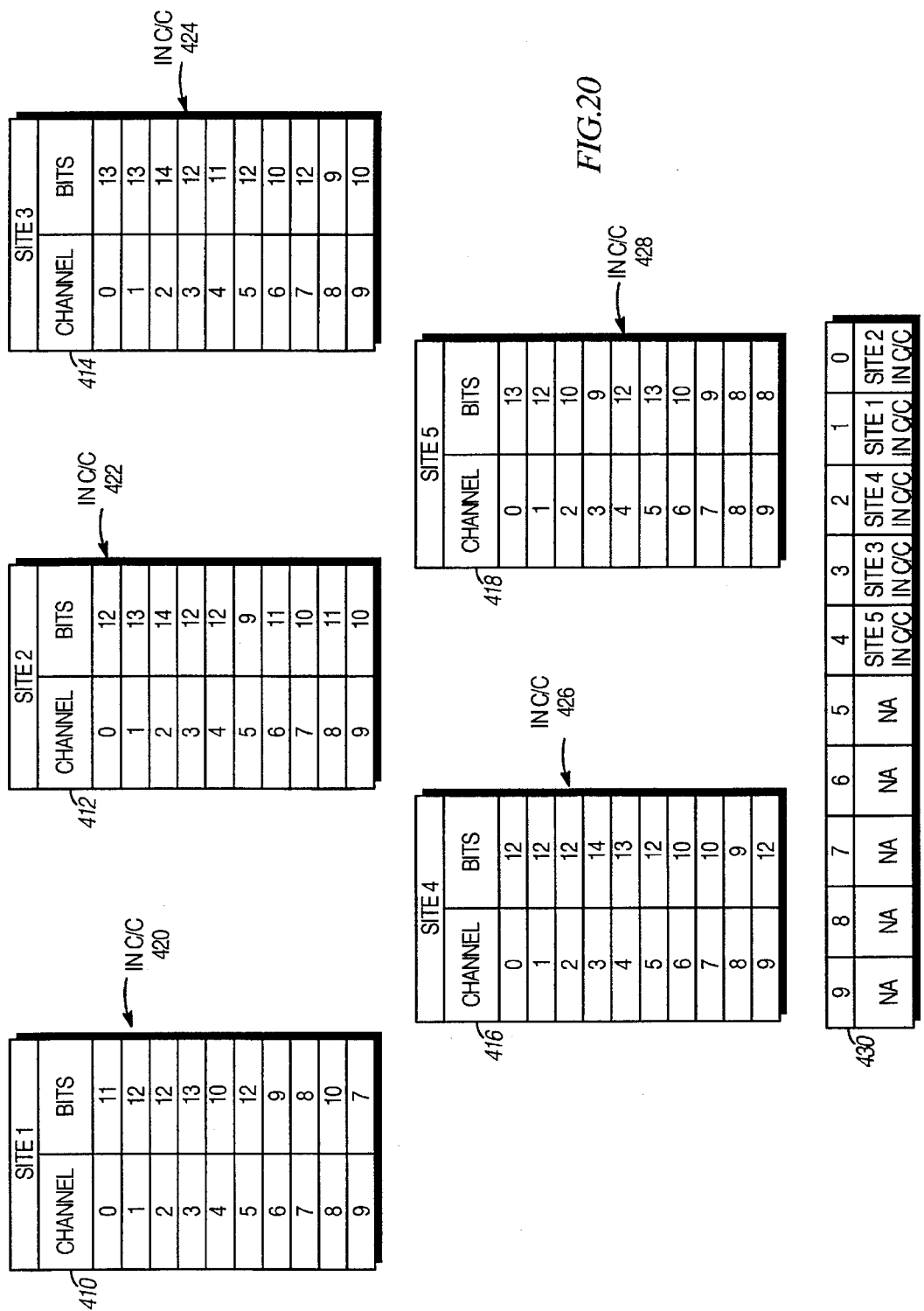
FIG. 20 illustrates an exemplary allocation and utilization of an inbound control channel in accordance with the present invention.

FIG. 20 illustrates an example of the secondary sites accessing the inbound control channel in an FDMA manner. For the purposes of this example, assume that the inbound transmission path of the communication system infrastructure includes 10 inbound carrier channels, the inbound control channel bandwidth is 12 bits, and the communication system includes 5 secondary sites. Given these assumptions, FIG. 20 illustrates five site bit loading tables 410–418, one for each of the secondary sites. From each of the site bit loading tables, an individual inbound carrier channel has been identified to function as the inbound control channel for the respective site. Thus, the inbound control channel for site 1 is carrier channel one 420; for site 2, is carrier channel zero 422; for site 3, is carrier channel three 424; for site 4, is carrier channel two 426; and for site 5, is carrier channel four 428.

As shown, in the FDMA accessing scheme, each secondary site is allocated a carrier channel to function as its own inbound control channel. As information is placed into frames, each frame is formatted to include the allocated carrier channels. An exemplary frame is shown with reference designation 430, which has five of the available carrier channels allocated to the secondary sites for use as inbound control channels. Typically, not all of these secondary sites will not transmit information on its allocated inbound carrier channel during every frame. Thus, many of the carrier channels functioning as inbound control channels will not be carrying information. Note that when an FDMA approach is used to access the inbound control channel, the method of FIG. 19 is not required because each site is allocated a separate inbound carrier channel to function as the inbound control channel. The separate inbound carrier channels can be selected from the individual site bit loading tables, thus no inbound call bit loading table is generated.

As an alternative to the FDMA process, the communication infrastructure system may incorporate a TDMA process. Under the TDMA process, an inbound carrier channel, or channels, will be selected as described in FIG. 19. With the inbound carrier channels selected, the sites would access the inbound control channel in a sequential order. Thus, for a first frame, site 1 would have exclusive access to the inbound control channel, during frame 2, the second site would have exclusive access to the inbound control channel followed by sites 3, 4 and 5. This sequential accessing process continues in a round robin fashion.

The TDMA approach works well for a communication system having a few sites. With only a few sites, each site would not have to wait too long to obtain access to the inbound control channel. When there are numerous sites, however, the TDMA approach has excessive delays between allocation of the inbound control channel to a particular site.

As a compromise between the TDMA approach and FDMA approach, a combination of the TDMA and FDMA approach may be used. FIG. 21 illustrates an example of a 10 inbound carrier channel, 5 site system, where the inbound control channel bandwidth requirements are 12 bits. In addition, sites 1–5 are divided into two sets: sites 1–3 are in set A, while sites 4 and 5 are in set B. Having divided the sites into sets, a lowest common denominator (LCD) bit loading table for each set is determined. The LCD bit loading tables are generated in the same fashion as the inbound control channel bit loading table as described in FIG. 19.

As shown, the LCD bit loading table for set A is bit loading table 434, while the LCD bit loading table for set B is bit loading table 436. From these bit loading tables 434,436, a carrier channel or carrier channels is selected to support the inbound control channel for each set. As shown, carrier channel one 438 was selected to support set A, while carrier channel zero 440 was selected to support set B. Thus, for each frame, carrier channel 0 is dedicated for inbound control information for the set of sites B, while carrier channel 1 is dedicated for inbound control channel information for sites in set A. In this manner, the sets access the inbound control channel in an FDMA manner, while the sites of the sets access in the inbound carrier channel in a TDMA manner.

As shown in frame N 442, site 1 of set A accesses the inbound control channel, while site 4 of set B accesses its respective inbound control channel. At frame N+1 444, site two access the inbound control channel for set A, while site 5 accesses the inbound control channel for set B. At frame N+2, 446, site 3 is accessing the inbound control channel for set A while site 4 is again accessing the inbound control channel for set B. At frame N+3 448, site 1 is again accessing the inbound control channel for set A while site 5 is again accessing the inbound control channel for set B. This TDMA/FDMA process continues in such a round robin fashion for each frame.

From the descriptions of FIGS. 20 and 21 it should be readily apparent to one skilled in the art that the inbound control channel may be established and accessed in a variety of ways. The manner in which the sites access the inbound control channel will depend on the priority levels of the sites, and the frequency in which the sites have inbound control channel information to transmit. For example, if a particular site is supporting a dispatch station used by a municipality's police and/or emergency medical departments, this site would require constant access to the inbound control channel such that delays in obtaining emergency service are eliminated. Thus, this type of site would need FDMA access to the inbound control channel. In contrast, a site may be supporting a plurality of telephone users or video subscribers, wherein a few hundred millisecond delay is inconsequential.. Thus, these sites could withstand a delay in accessing the inbound control channel where a TDMA approach would be sufficient. If both types of sites are affiliated with a communication system, the system would employ the FDMA/TDMA approach.

Figure 22:
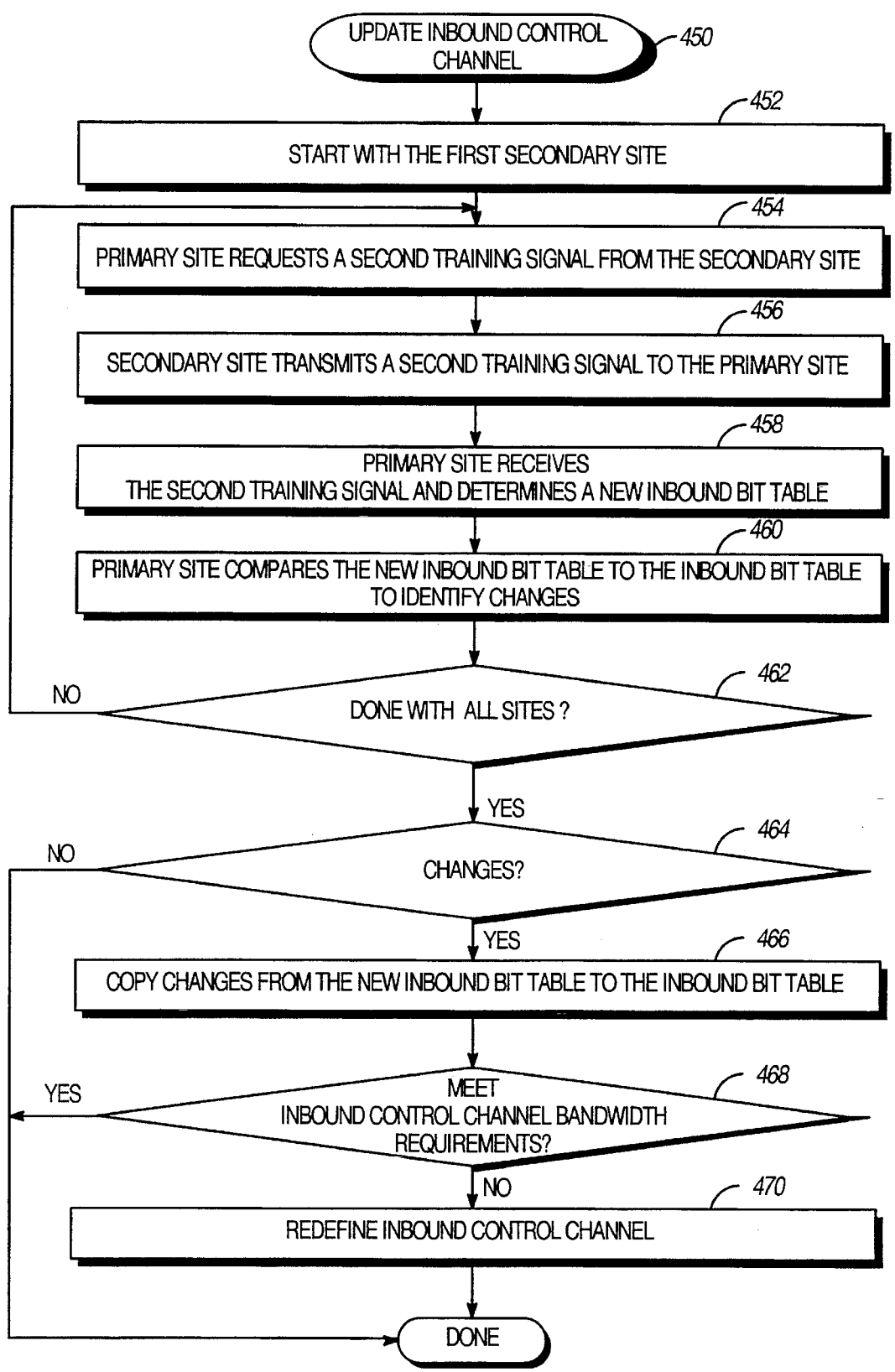
FIG. 22 illustrates a logic diagram for updating the inbound control channel in accordance with the present invention.

FIG. 22 illustrates a logic diagram that may be used to update allocations of inbound carrier channels to the inbound control channel 450. At step 452, the process begins by selecting a first one of the secondary sites. The selection of a first secondary site may be done in a variety of ways. For example, the primary site may select the secondary sites in a round robin fashion according to one of the primary site's databases. Having selected the first secondary site, the process proceeds to step 454 where the primary site requests a second training signal from this particular secondary site. At step 456, the secondary site transmits a second training signal to the primary site. At step 458, the primary site receives the second training signal and determines a new inbound site bit loading table for the particular site. The process of receiving a training signal and determining a bit loading table was discussed above with reference to FIG. 14. At step 460, the primary site compares the new inbound bit loading table to the previously stored inbound bit loading table to identify changes, where changes may be in the form of bit loading increases for a particular carrier channel or bit loading decreases for a particular carrier channel.

Having identified the changes, the process proceeds to step 462 where it is determined whether all the sites have been updated. If not, the process returns to step 454 for the next site. If, however, all the sites have been tested for changes the process proceeds to step 464. At step 464, the process determines whether any changes have occurred between the new bit inbound site bit loading table for each of the secondary sites and the previously stored site bit loading table for each of the secondary sites. For each secondary site that did not have a change, the primary site maintains the previously stored site bit loading table as the updated bit loading table and using this information for future carrier channel allocations for the site.

if, however, a change has occurred between the new site bit loading table for a particular site and the previously stored site bit loading table for the particular site, the process proceeds to step 466 where the previously stored inbound site bit loading table is updated with the changes. In other-words, the carrier channel entries having bit loading changes will be overwritten with the most current bit loading information for the particular carrier channel, which is the information contained in the new site bit loading table.

While the process shows testing all of the sites for changes before updating any of the individual site bit loading tables, one skilled in the art will readily recognize that a variety of updating techniques may be used. For example, the process may involve updating the individual site bit loading tables as changes are being identified for that site before testing for changes in other sites' bit loading tables. As another approach, the newly generated site bit loading table may be used as the updated inbound site bit loading table such that the previously stored site bit loading table is deleted or overwritten. Yet another approach may to change the carrier channel entries that have been identified as have a bit loading change without generating a new site bit loading table.

Returning to the discussion of the process, at step 466, the inbound control channel bit loading table is updated based on the updated site bit loading tables. The inbound control channel bit loading table is updated as a compilation of all of the changes that occurred for each site. Recall that the inbound site bit loading table is a compilation of all of the inbound site bit loading tables and contains the lowest bit loading for each inbound carrier channel. Having updated the inbound control channel bit loading table, the process, at step 468, determines whether the carrier channels currently functioning as the inbound control channel still meet the bandwidth requirements for the inbound control channel. If yes, the process is complete.

If, however, the carrier channels currently functioning as the inbound control channel do not meet the bandwidth requirements, the inbound control channel assignments must be redefined. This is determined at step 470. The determination of new carrier channels to function as the inbound control channel will be discussed in greater detail with reference to FIGS. 30–33.

Figure 23:
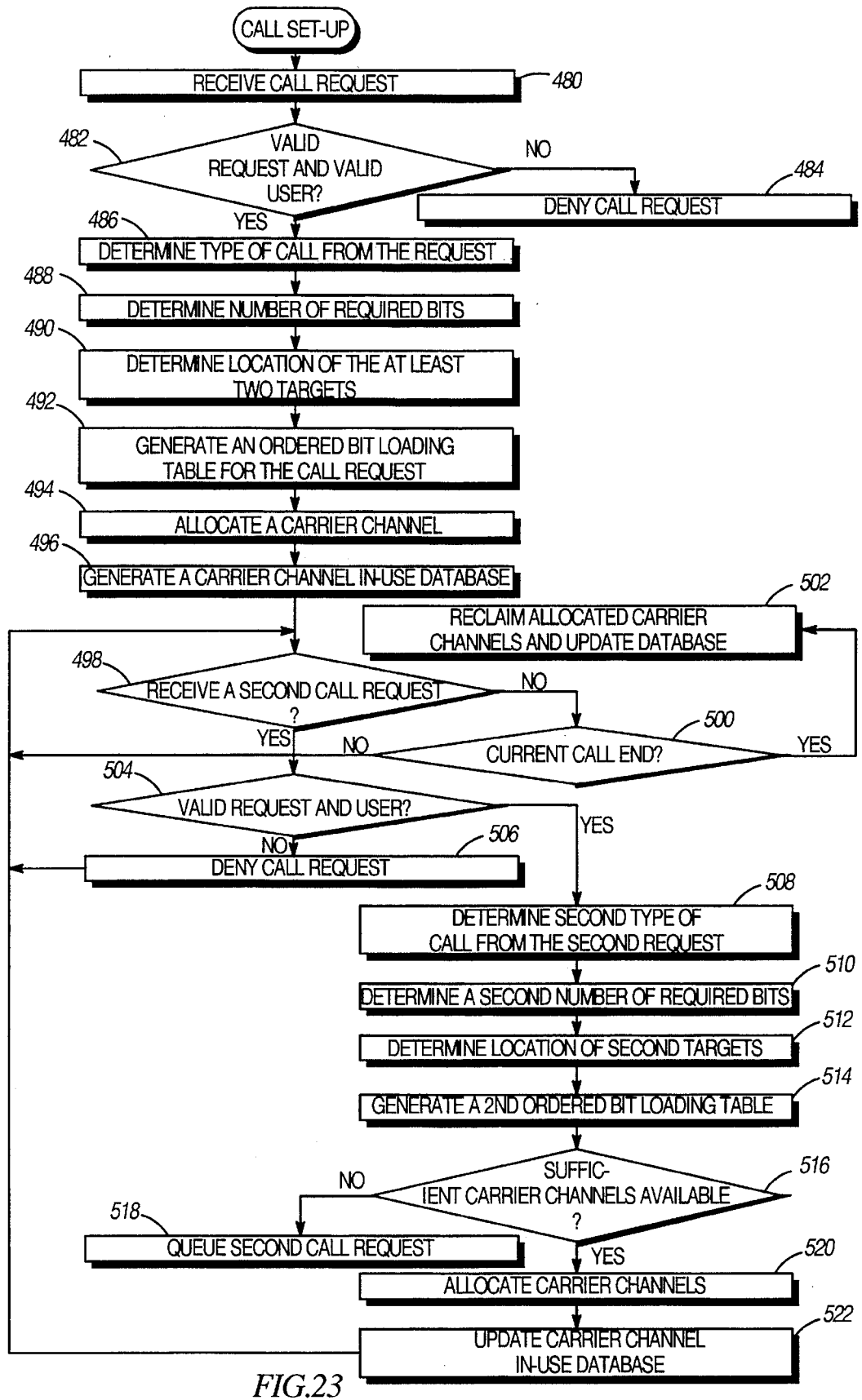
FIG. 23 illustrates a logic diagram for establishing an infrastructure for a call in accordance with the present invention.

FIG. 23 illustrates a logic diagram that may be used to establish a call within a communication system using the above described discrete multi-tone (DMT) infrastructure. For the purposes of this discussion, a call may be any form of data transfer that the communication system can support. For example, the call may be for a video data transfer, an audio data transfer, a page to a pager or pagers, a two-way RF communication, a facsimile, a plain old telephone service (POTS) call, a cellular telephone call, a data file transfer, status information requests and/or transfers, telephone interconnections, and other digital information transfers.

The process begins at step 480 where at least one call request is received from a user via a secondary site and an inbound control channel. As an alternative to receiving the call request from a user, the call request may be received from an external source. For example, the call request may be a facsimile request from a telephone user via a telephone interconnect, where the targeted recipient of the facsimile is affiliated with a secondary site (E.g. the recipient is a facsimile machine coupled to a cellular telephone or land mobile radio). As another example, the call request may be from the system manager which is requesting status information, is updating security codes with mobile radios, is changing service parameters of a mobile radio, pager, or cellular telephone, or other types of system managing functions. As yet another example, the call request may be from a dispatch station, where the dispatch station may be coupled to the primary site or a secondary site.

Regardless of the type of request, the process proceeds to step 482, where the validity of the user and request are determined. The validity of the user is verified by the secondary site to determine if the user is an affiliated user, where an affiliated user is one that the secondary site can identify from a database as being registered with the secondary site. If not affiliated, the user is not validated. If verified by the secondary site, the primary site may also perform a validity check of the user to further insure that the user is valid. The request may be validated by the secondary site, the primary site, or both. To validate the request, the primary site—and, when the secondary site is validating the request, the secondary site—includes a database which stores the types of requests the user may validly transmit. In other words, the database contains a list of services the user may access via the communication system. If either the request or the user is not validated, i.e. the user is not authorized to make the particular request or the user is not authorized to access the system, the process proceeds to step 484 where the particular call request is denied.

In addition to validating the user and the request, the targeted units may also be validated. A targeted unit is validated in a similar manner as the requesting user. In other words, when the primary site has extracted the identity of the targeted unit, the primary site determines whether the targeted unit is affiliated with the communication system. If not, the request, at least for that targeted unit, is denied.

When the user and request are valid, the process proceeds to step 486 where the type of call is determined from the particular call request. Note that the call request includes the identity of requesting unit, the type of call being requested, and a target destination. Having determined the call type, the process proceeds to step 488 where the number of required bits is determined by accessing a database of call types and corresponding bits required. As an example, the types of calls and their corresponding bit requirements stored in the database may be digital audio communications having a 64 kilobits per second (Kbps) requirement, 32 Kbps requirement, 16 Kbps requirement, or 8 Kbps requirement; digital video communications having, for example, a 100 Kbps requirements, a 1 Mbps requirements, or a 2 Mbps requirement; facsimile transmissions having a 4.8 Kbps, a 9.6 Kbps, or greater; or data file transfers having any data rate requirements.

Given the data rate requirements, and the frame rate of the DMT or ADSL system is 4 kilohertz, the digital audio having data rate requirement of 64 Kbps requires 16 bits per frame to be properly supported by the communication system infrastructure. The 16 bit requirement is determined by dividing the 64 Kbps data rate requirement by 4 KHz. Using similar calculations, the 32 Kbps digital audio would require 8 bits per frame, the 16 Kbps digital audio would require 4 bits per frame, and the 8 Kbps digital audio would require 2 bits per frame. The bit requirement per frame for other types of data transmissions, or transfers, would be calculated in an identical manner. Thus, the database of call types and corresponding bits required would be broken down to the particular call type (E.g. 64 KBPS audio) and the corresponding number of required bits per frame (E.g. 16 bits).

Having determined the number of required bits, the process proceeds to step 490 where the location of at least two targets are determined based on the particular call request. For example, if the call request is for a two-way RF communication, the targets may be other communication units located in different sites. Alternatively, the call request may be for a page of a number of particular pagers located in a plurality of sites. As yet a further alternative example, the call request may be to the same digital video information to a plurality of users. As one skilled in the art will readily appreciate, the call request could be for any digital information conveyance that the communication system can support.

Having identified the location of the targets, the process proceed to step 492 where an ordered bit loading table for the call is generated. The ordered call bit loading table is generated by first accessing the database of site bit loading tables to retrieve a site bit loading table for each of the sites supporting one of the at least two targets, i.e., the sites that have at least one of the targets affiliated therewith. Having retrieved the site bit loading tables, the tables are compared, on a carrier channel by carrier channel basis, to determine the lowest bit loading for each carrier channel. Once the lowest bit loading for each carrier channel is identified, available carrier channels are identified from a carrier channel allocation information database. From this information, the carrier channel entries for the available carrier channels are arranged in an ordered fashion to create the ordered bit loading table.

The ordered fashion may be ordering the carrier channel entries—a carrier channel and it's associated bit loading— from the carrier channel having the lowest bit loading to the carrier channel having the highest bit loading. Alternatively, the table could be ordered from the carrier channel having the highest bit loading to the carrier channel having the lowest bit loading. The ordering of the order call bit loading table should coincide with a constellation encoding scheme. For example, if the constellation encoding scheme is loading data on to carrier channels having the highest bit loading first, the ordering of the ordered bit loading table should be the carrier channel having the highest bit loading to the carrier channel having the lowest bit loading. One skilled in the art will readily appreciate that the ordering of the ordered bit loading table may be done in a variety of ways other than the examples mentioned.

With the ordered bit loading table generated, at least one of the carrier channels is allocated to the call request as shown in step 494. Allocations of carrier channels to a particular call request will be discussed in greater detail with reference to FIGS. 26–29. Having done this, the process proceeds to step 496, where a carrier channel in use database, or carrier channel allocation information database, is generated. This database, as the name implies, indicates which carrier channels are assigned to which particular call. This will be described in more detail below.

At step 498, the process determines whether a second call request is received. When a second call request has not been received, the process proceed to step 500 where it is determined whether the current call has ended. If not, the process waits until either a second call request is received or a current call ends. When a current call ends, the process proceeds to step 502 where the allocated carrier channels are reclaimed and the carrier channel in use database is updated. Having reclaimed the allocated carrier channels, they are available for allocation to another call.

When a second call is received, the process proceeds to step 504, where the validity of the user and the requested service are tested. If not, the process proceeds to step 506 where the second call request is denied. Having denied the second call request, the process returns to step 498 where the process waits to receive either a second call request or for a current call to end.

When the request and the user of the second call request are valid, the process proceeds to step 508 where the type of call for the second call request is determined. (Recall that the type of call being requested can be directly determined from the call request.) Having determined the type of call request, the process proceeds to step 510 where the number of bits required for the second call are determined. (Recall that the number of required bit may be determined by accessing the call type to required bits table.) Having done this, the process proceeds to step 512, where the locations of the targets for the second call are determined. (Recall that this is done by accessing a subscriber-location database within the primary site.) From this the process proceeds to step 514, where a second ordered bit loading table is determined. Note that the second ordered bit loading table will be comprised of the lowest bit loading information for the plurality of sites involved in the second call less any carrier channels in use as identified in the carrier channel in use database. Thus the ordered bit loading table will include only an ordered representation of available carrier channels.

At step 516, the process determines whether there are a sufficient number of carrier channels available to support the second call. This is generally accomplished by determining the total number of available bits by summing the bit loading of the available carrier channels. If the total number of available bits compares favorably (E.g. greater than) to the number of required bits for the call, then there are a sufficient number of carrier channels to support the call. If the process determines that there are not a sufficient number of available carrier channels, the process proceeds to step 518, where the second call is queued, or denied.

If, however, there are a sufficient number of carrier channels available, the process proceeds to step 520 where carrier channels are allocated to the second call. (Allocation of carrier channels to a call will be discussed in greater detail with reference to FIGS. 26–29.) Having allocated the carrier channels, the process proceeds to step 522 where the carrier channel in use database, or carrier channel allocation information database, is updated to indicate the carrier channels that have been allocated to the second call. Once this is completed, the process returns to step 498 where is waits to receive another call request or for a current call to end.

Figure 24:
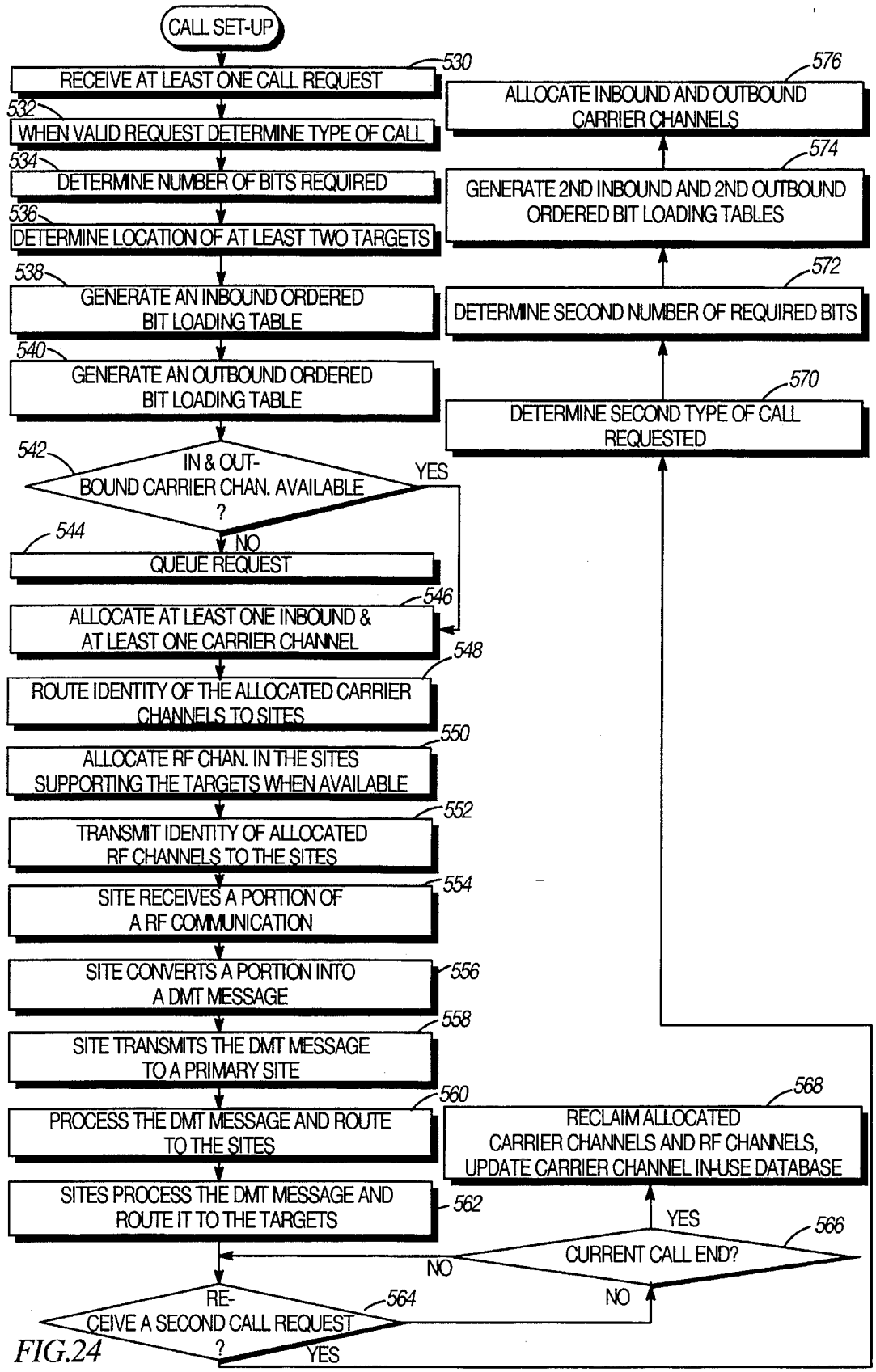
FIG. 24 illustrates an alternative logic diagram for establishing a call in the system of FIG. 8 or FIG. 9 in accordance with the present invention.

FIG. 24 illustrates a logic diagram that may be used to implement carrier channel allocations for call requests in a four wire system, i.e. one that has a dedicated inbound transmission path and a dedicated outbound transmission path. At step 530, the primary site receives at least one call request. The process then proceeds to step 532 where it determines whether the user and the call request are valid. If either the user or the call request is invalid, the primary site denies the requested service and the process ends for this call request. If the user and call request are valid, step 532 further determines the type of call from the call request.

At step 534, the process determines the number of bits required for this particular call. (Recall that this is done by accessing a call type-to-required bit database stored within the primary site.) At step 536, the process identifies the sites in which the at least two targets are located. From this, the process proceeds to steps 538 and 540 where the primary site generates an inbound ordered bit loading table and an outbound ordered bit loading table. Note that steps 538 and 540 may be done simultaneously, or in a sequential fashion as shown or in inverse sequential fashion. A detailed discussion for the generation of the inbound and outbound ordered bit loading tables will be done below with reference FIG. 28.

Having generated the inbound and outbound ordered bit loading tables, the process proceeds to step 542 and determines whether each of the inbound and outbound transmission paths have sufficient carrier channels available. In other words, the process determines if there is a sufficient number of inbound carrier channels and a sufficient number of outbound carrier channels to support the requested call. If not, the process proceeds to step 544 and queues the particular call request. Alternatively, the process, via the primary site, may deny the particular call request. If, however, there are a sufficient number of inbound and outbound carrier channels, the process proceeds to step 546.

At step 546, the process allocates at least one inbound and at least one outbound carrier channel to the particular call request. (The allocation of carrier channels to a particular call will be discussed in greater detail below with reference to FIGS. 26–29.) At step 548, the primary site transmits the identity of the allocated inbound and outbound carrier channels to the sites supporting the targets via the outbound control channel. In practice, each of the secondary sites will receive the control information (i.e., the identity of the allocated inbound and outbound carrier channels), but the control information will contain an address identifying the targeted sites (i.e., the sites supporting the target units) such that only the addressed sites will process the control information.

After allocating the carrier channels, the process proceeds to step 550 where the primary site determines, for a one-way or two-way wireless communication call request, whether each target site has an available RF communication resource, or channel. When each site has an available RF communication resource, the primary site allocates the RF communication resources to the particular call. At step 552, the primary site transmits control information, via the outbound control channel, to the target sites, wherein the control information identifies the allocated RF communication resources.

One skilled in the art will appreciate that the present invention, for one-way RF communications (E.g. paging) and two-way RF communications (E.g. land mobile and/or cellular telephone) has two layers of resource trunking. The first layer, which is done in prior art communication systems, is the trunking of RF communication resources. As is known, by trunking RF communication resources, as opposed to dedicated RF communication resources to particular users, a communication system is able to support more users because the RF communication resources are better utilized. The second type of trunking, which is provided by the present invention, is the trunking of infrastructure resources. Thus, instead of the dedicated T1 links, fiber-optic links, or microwave links coupling the secondary sites to a primary site, or central controller, the present invention trunks the infrastructure resources based on call requests. By using infrastructure trunking, expensive T1 links, expensive fiber optic links, and expensive microwave links can be replaced with inexpensive twisted pair copper wire telephone lines. This is of added benefit in newly emerging industrialized nations that have a limited communication infrastructure of twisted pair copper wire telephone lines and little, if any, of the more expensive transmission links.

Returning to the discussion of the logic diagram of FIG. 24 at step 554, where at least one of the target sites receives a portion of an RF communication. For the purposes of this discussion, a portion of an RF communication may be, for a two-way RF communication, an audio or data transmission by a first RF communication device where a subsequent portion of the RF communication would be an audio or data transmission in connection with the first portion of the RF communication. For example, assume that the two-way RF communication is between a police officer and a dispatch operator at a police station, where the first portion of the RF communication is the dispatcher requesting the police officer to identify his or her location. The second portion of the RF communication would be the police officer's response.

Alternatively, the RF communication may be for a one-way RF communication. In this situation, the portion may constitute the entire RF communication. For example, the RF communication may be used for data transmissions from remote data collection sites, where the data site transmits its data at given time intervals without prompting from the primary site.

After the site receives the portion of the RF communication the process proceeds to step 556 wherein the site converts the RF communication into a discrete multi-tone (DMT) message. This conversion process was generally discussed with reference to FIGS. 8–13 and will be more detailedly discussed with reference to FIGS. 34–39. Having converted the RF communication into a DMT message, the site transmits the DMT message to the primary site via the allocated inbound carrier channel, or channels, for this particular call. This is depicted at step 558.

At step 560, the primary site processes the DMT message and routes the processed DMT message to the target sites. (The processing of DMT messages was generally discussed with reference to FIGS. 8–13 and will be discussed in greater detail with reference to FIGS. 40–46.) The processed DMT message, which may be a summation of several RF communication portions, is routed to the target sites via the outbound carrier channel or channels allocated to this particular call. Having received the processed DMT message, the sites convert the processed DMT message into a digital message and route the digital message to the target units via the allocated RF communication channels. This is depicted at step 562.

While the first, or another, call is active, the process determines whether a second call request has been received which is shown in step 564. Note that at any point during the process, a call could be received and processed as described herein. If a second call has not been received, the process proceeds to step 556 and determines whether a current call has ended. If a current call has not ended, the process waits for another call request or for a current call to end. If a current call ends, the process proceeds to step 568 where the allocated carrier channels of the inbound and outbound transmission paths are reclaimed and the carrier channel in use database, or carrier channel allocation information database, is updated.

When a second call request is received, the process proceeds to step 570 where the process determines the type of call requested. Having determined the type of call, the process proceeds to step 572 where the process determines the number of required bits for the call. Knowing the number of required bits, the process proceeds to step 576 where the primary site generates inbound and outbound ordered bit loading tables. From the inbound and outbound ordered bit loading tables, the process proceeds to step 576 and allocates inbound and outbound carrier channels to the second call request when such carrier channels are available.

Figure 25:
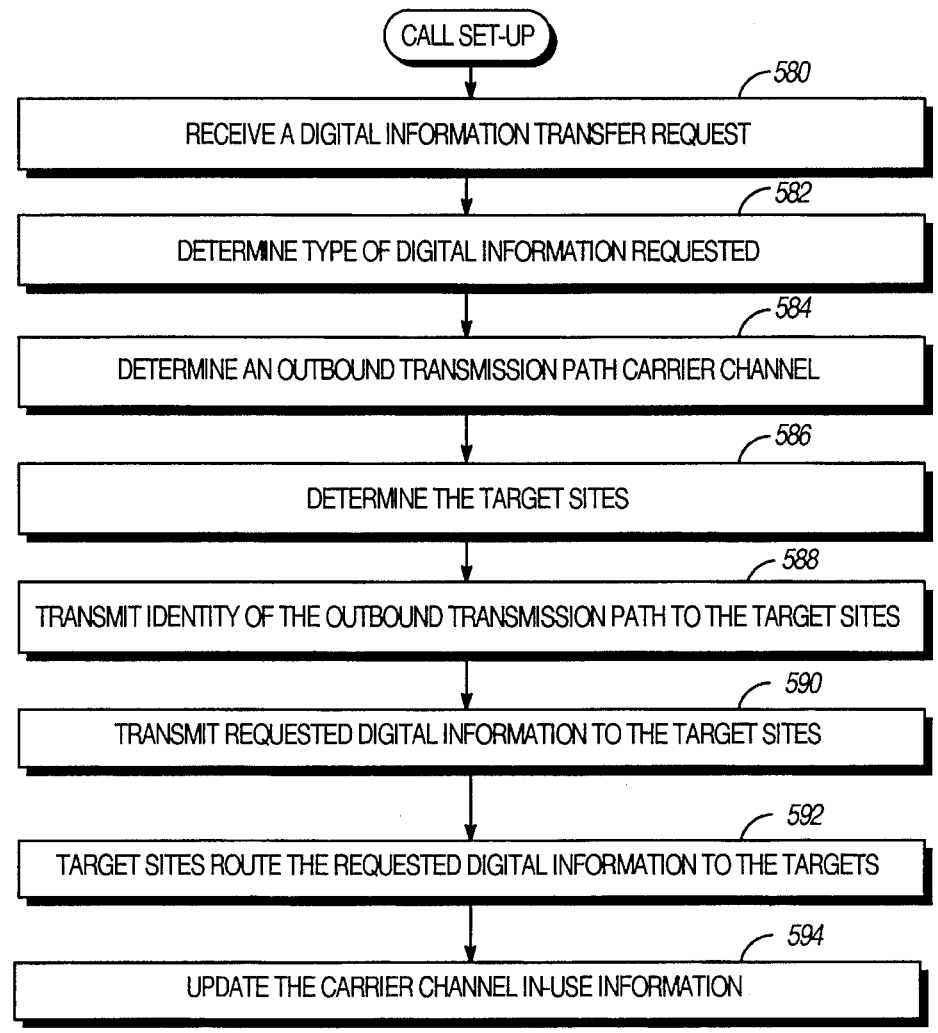
FIG. 25 illustrates another alternative embodiment for establishing a call within the system of FIG. 8 or FIG. 9 in accordance with the present invention.

FIG. 25 illustrates an alternate logic diagram for establishing an infrastructure to support a call. At step 580, the primary site receives, via an inbound carrier channel, a digital information transfer request. For the purposes of this discussion, the digital information transfer request may be a request for transmission of digital audio information, digital video information, data files, a one-way RF communication, a two-way RF communication, or any other type of conveyance of digital information the communication system can support.

At step 582 the process determines the particular type of digital information being requested. Having determined the type of digital information, the process proceeds to step 584 where the primary site identifies at least one carrier channel of a plurality of carrier channels to function as an outbound transmission path for this digital information transfer. The primary site selects the carrier channel based on the type of digital information being requested and a carrier channel in use database, or carrier channel allocation information database. Allocation of carrier channels will be discussed in greater detail with reference to FIGS. 26–29.

Having allocated carrier channels for the outbound transmission path, the process proceeds to step 586 where the primary site determines target sites. The target sites are the sites that have a subscriber affiliated therewith and where that subscriber is targeted to receive the requested digital information. Typically, the digital information transfer request will include the type of data being requested and the identity of the targeted subscribers. Thus, the primary site can readily determine the target sites given the identity of the targeted subscribers by accessing a subscriber unit-location database. Such a database is well known in the RF communication system art, thus no further discussion will be presented except to further illustrate the present invention.

At step 588, the primary site transmits the identity of carrier channels functioning as the outbound transmission path to the target sites via an outbound control channel. Recall that the outbound control channel is one, or more, of the plurality of carrier channels which has been dedicated to function as the outbound control channel. At step 590, the primary site transmits, via the outbound transmission path, the requested digital information to the target sites. At step 592, the target sites route the requested digital information to the targeted subscribers. At step 594, the process updates the carrier channel in use database to include the allocation of the carrier channels to the outbound transmission path. Note that the updating of the carrier channel in use information may be done simultaneously with step 584.

Figure 26:
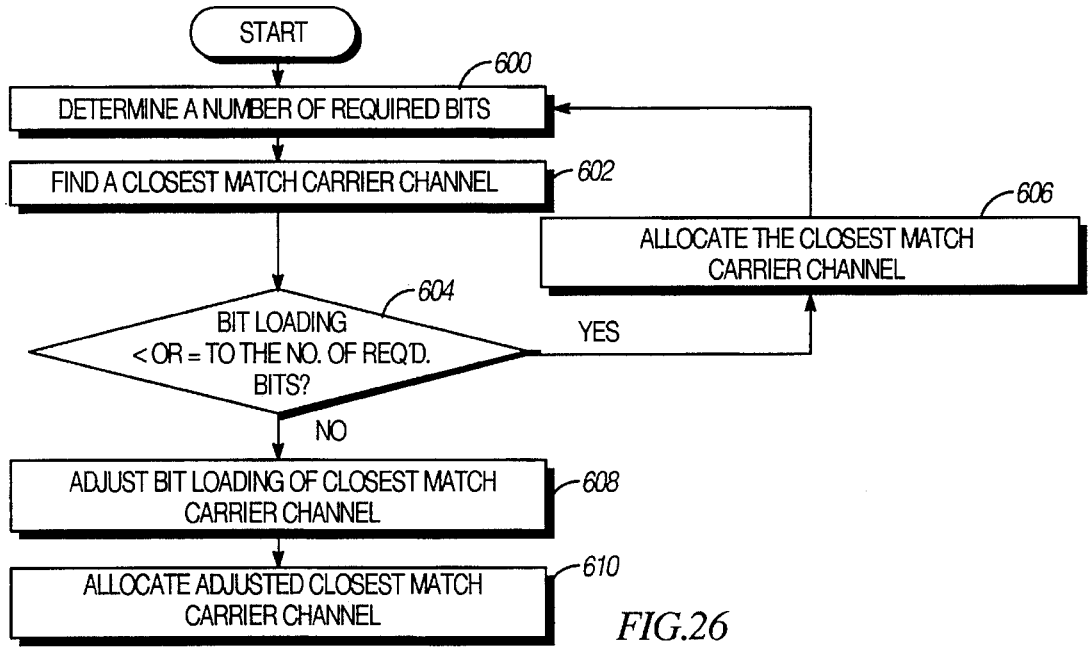
FIG. 26 illustrates a logic diagram that may be used to implement carrier channel allocations in accordance with the present invention.

FIG. 26 illustrates a method for allocating a carrier channel to a particular call. This process assumes that the call bit loading table has already been established. Recall that the call bit loading channel is a compilation of the lowest bit loading of each carrier channel from a plurality of site bit loading tables. Given this, the process begins at step 600 by determining the number of bits required for the particular call. Recall that the required number of bits may be determined by accessing a call type and required bits database. For example, a 64 Kbps digital audio transmission requires 16 bits per frame.

Having identified the number of required bits, the process proceeds to step 602 where the process scans the call bit loading channel to find a closest match carrier channel. For the purposes of this discussion, a closest match carrier channel is one that has a bit loading most closely matching the number of required bits. At step 604, the bit loading of the closest match carrier channel is compared to the number of required bits. If the bit loading of the closest match carrier channel is less than or equal to the number of required bits, the process proceeds to step 606 and allocates the closest match carrier channel to the particular call.

When the bit loading of the closest match carrier channel is less than the number of required bits, a remaining number of required bits is calculated by subtracting the bit loading of the closest match carrier channel from the number of required bits. Next, the call bit loading table is scanned to find a second closest match carrier channel for the remaining number of required bits. If the bit loading of the second closest match carrier channel is less than or equal to the remaining number of required bits, the process allocates the second closest match carrier channel to the particular call. If the bit loading of the second closest match carrier channel is less than the remaining number of required bits, a second remaining number of required bits is determined by subtracting the bit loading of the second closest match carrier channel from the remaining number of required bits. This process continues in this loop until the bit loading of the next closest match carrier channel is greater than or equal to the last remaining number of required bits.

When the bit loading of the closest match carrier channel, or the next closest match carrier channel, is greater than the number of required bits, the process proceeds to step 608 and adjusts the bit loading of the closest match carrier channel, or the next closest match carrier channel, is adjusted to equal the number of required bits, or remaining number of required bits. Having done this the process proceeds to step 610 wherein the adjusted closest match carrier channel is allocated to the particular call. Note that the closest match carrier channel is being adjusted to match the number of required bits such that only relevant data is being transmitted. As an alternative to adjusting the bit loading of the closest match carrier channel, the primary site could inject null data into the excess bits, i.e., the bits which exceed the number of required bits.

Figure 27:
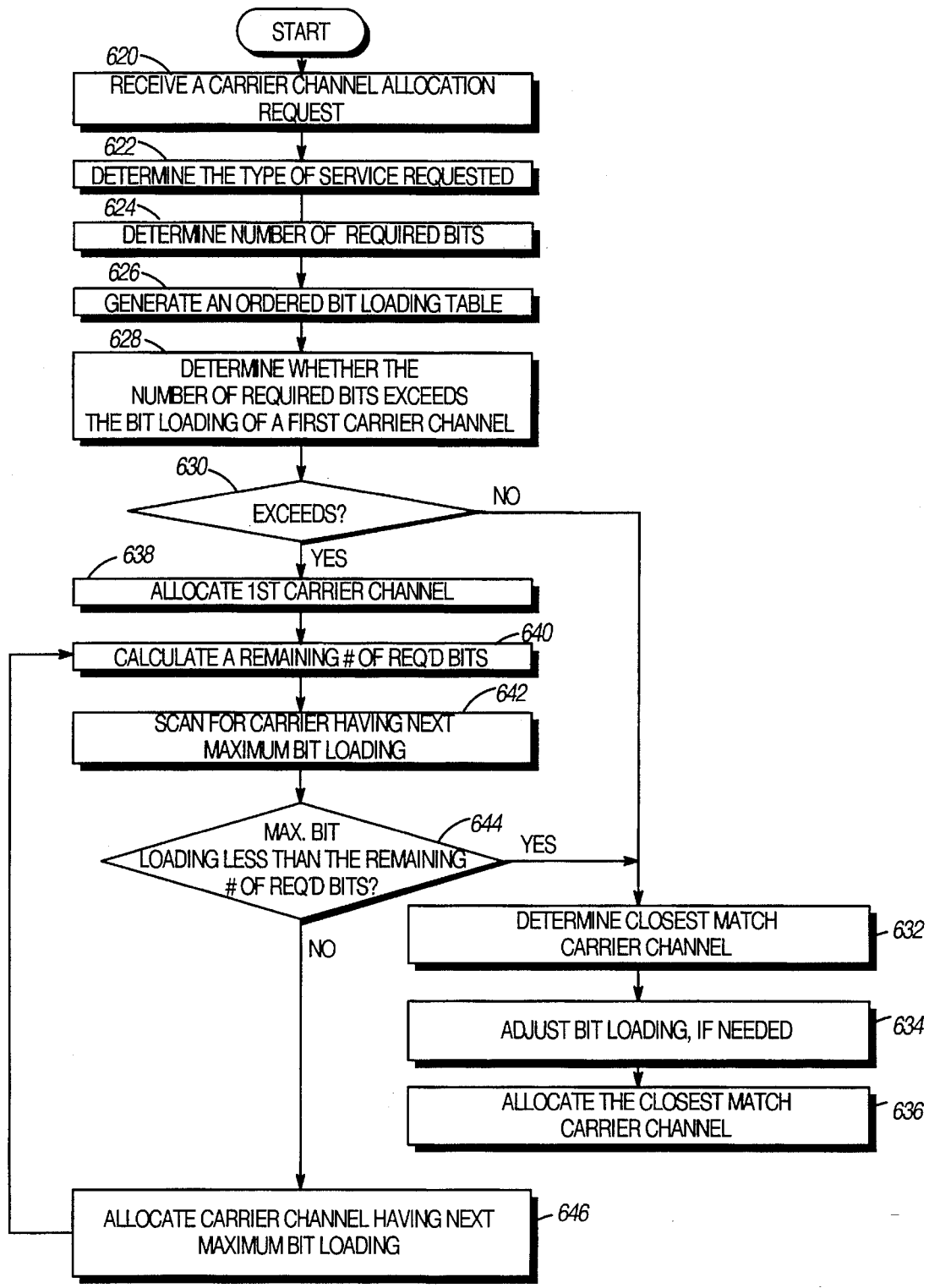
FIG. 27 illustrates an alternate logic diagram that may be used to implement carrier channel allocations in accordance with the present invention.

FIG. 27 illustrates an alternate method for allocating a carrier channel to a particular call request. At step 620, the primary site receives a carrier channel allocation request, wherein the carrier channel allocation request may request allocations of outbound carrier channels separately or with inbound carrier channels for a particular call. Having received the carrier channel allocation request, the process proceeds to step 622, where the primary site determines the type of service being requested from the carrier channel allocation request. The type of service being requested may be transfer of digital audio, digital video, establishing a one-way wireless communication path, establishing a two-way wireless communication path, or any other service that may be supported by a communication system.

At step 624, a service type-to-bit requirement database is accessed to determine the number of required bits for this particular requested service. For the purposes of this discussion, the service type-to-bit requirement database stores, for a particular service, the number of bits required per frame. The number of bits per frame is calculated based on a data rate requirement of the requested service and the operating rate of the infrastructure. For an infrastructure that uses ADSL technology, the number of required bits equals the data rate requirement divided by 4,000 (the frame rate for ADSL). Thus, for a service having a 64 Kbps data rate requirement, the number of required bit will require 16 bits per frame (64,000/4,000=16).

At step 626, the primary site generates an ordered bit loading table based on the carrier channel allocation request. Recall that an ordered bit loading table is a compilation of target site bit loading tables that includes available carrier channels ordered in a given manner. Determination of the target sites is performed by the primary site by interpreting the request to identify targeted subscribers. From the targeted subscribers, the primary site accesses a subscriber-location database to determine the sites having the targeted subscribers affiliated therewith.

At step 628, the primary site scans the ordered bit loading table to determine whether the number of required bits exceeds the bit loading of a first channel carrier having a maximum bit loading. At step 630, the process determines whether the number of required bits exceeds the bit loading of the first carrier channel. When it does, the process proceeds to step 638, where the primary site allocates the first carrier channel to the particular request. Having made this allocation, the process proceeds to step 640 and calculates a remaining number of required bits based on the number of required bits and the bit loading of the first carrier channel. As an example, assume that the number of required bits is 30 and the bit loading of the first carrier channel is 14 bits. The remaining number of required bits (16) is determined by subtracting the bit loading (14) from the number of required bits (30).

Having determined the remaining number of bits, the process proceeds to step 642, where the primary site scans the ordered bit loading table for a second carrier channel having the next maximum bit loading. Note that when a carrier channel is allocated to the particular call it is flagged within the ordered bit loading table, such that it will not be reallocated.

At step 644, the primary site determines whether the maximum bit loading of the next available carrier channel is less than the remaining number of required bits. If the remaining number of bits exceeds the bit loading of the next carrier channel, the process proceeds to step 646 where the primary site allocates the next carrier channel to the particular call request. Having done this, the process repeats at steps 640 through 644 until the remaining number of required bits is less than the bit loading of an available carrier channel having a maximum bit loading. Continuing with the example of step 640, where the number of required bits is 30 and the first carrier channel has a bit loading 14 bits, the first remaining number of required bits is 16. Assume that the bit loading of the next carrier channel is 13 bits such that the second remaining number of bits is 3 (16–13=3). Further assume that the carrier channel having the next maximum bit loading has a bit loading of 12 bits. Thus, the condition for the "do loop" has been met and the process moves on to step 632.

At step 632, which may be arrived at from a negative decision at step 630 or a positive decision at step 644, the process determines a closest match carrier channel. The primary site determines the closest match carrier channel by scanning the ordered bit loading table to find a carrier channel that has a bit loading that matches, or most closely matches, the number of required bits or remaining number of required bits. For example, with the example given above, the last remaining number of required bits is 3. Thus the first carrier channel having a bit loading of 3 will be allocated by the primary site to the particular call. If not, a carrier channel having a bit loading greater than three but as close to 3 as possible, i.e., a carrier channel having a bit loading of 4 bits, will be allocated.

At step 634, the bit loading of the closest match carrier channel is adjusted if needed. As mentioned in the preceding example, when the closest match carrier channel has a bit loading of 4 bits but only 3 bits are required, the bit loading of the particular carrier channel is adjusted down to the 3 bits. Having made this adjustment, the process proceeds to step 636 where the closest match carrier channel is allocated to the particular request. As an alternative to reducing the bit loading of the carrier channel, the excessive bits may be filled with null information or the excessive bits may be used for another call request.

Figure 28:
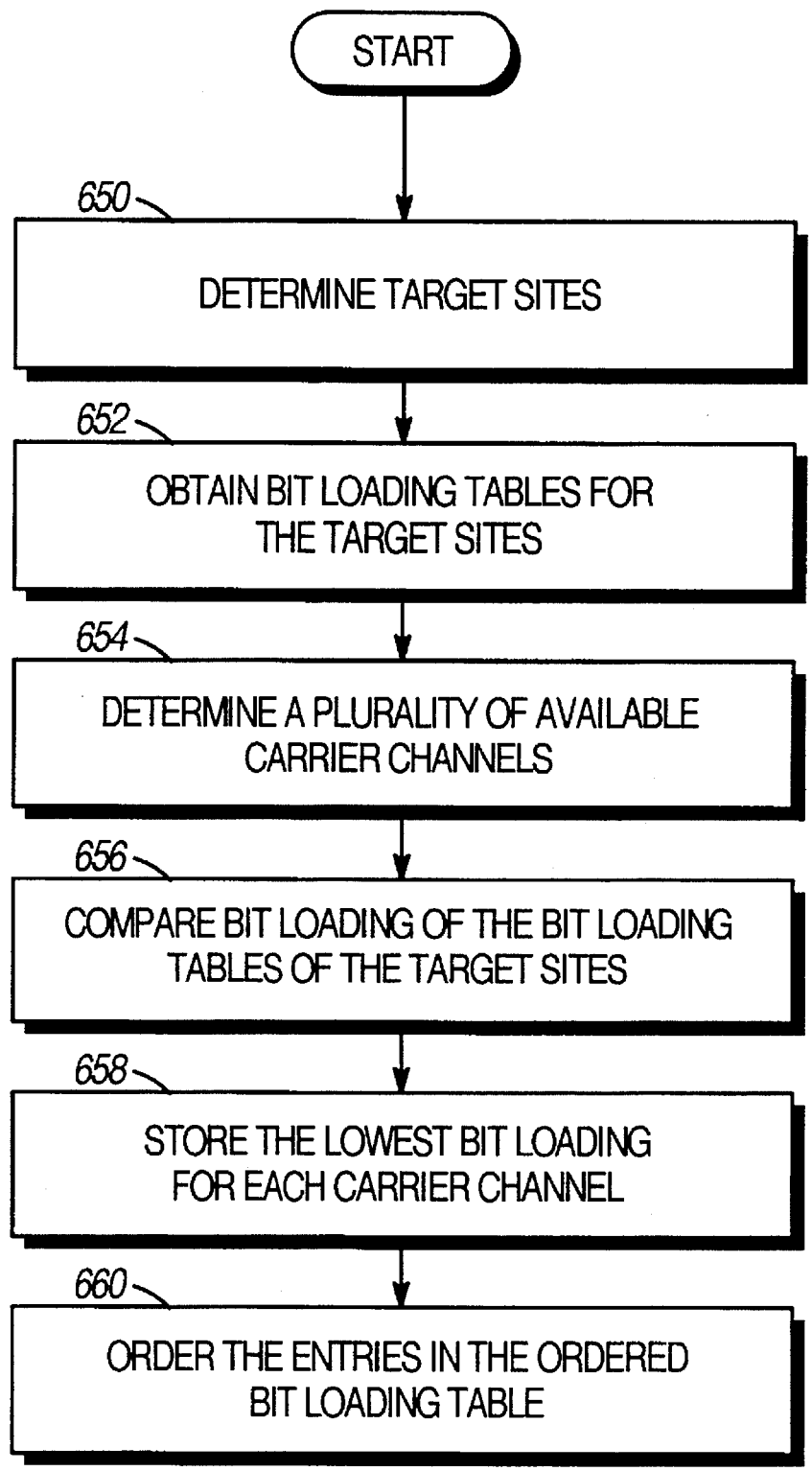
FIG. 28 illustrates a logic diagram that may be used to generate an ordered bit loading table in accordance with the present invention.

FIG. 28 illustrates a logic diagram that may be used to generate an ordered bit loading table. At step 650, the primary site determines target sites from a channel allocation request. Recall that target sites are sites that have a targeted subscriber unit affiliated therewith. Having determined the target site, the process proceeds to step 652 and accesses a site bit loading database to obtain site bit loading tables for each of the target sites. Having done this, the process proceeds to step 654 and accesses a carrier channel in use database, or carrier channel allocation database, to determine a plurality of available carrier channels. Having gathered this information, the process proceeds to step 656 where, for each carrier channel of the plurality of available carrier channels, a comparison is made between the bit loading in each of the site bit loading tables of the target sites. From this comparison, the lowest bit loading value, for each carrier channel, is stored in a call bit loading table, which is depicted at step 658.

Having compared the bit loading of each carrier channel entry in the site bit loading tables, the process proceeds to step 660 where the primary site orders the carrier channel entries in the call bit loading table to produce the ordered bit loading table. The ordering of the bit loading table may be done to simulate how an ADSL encoder and decoder function. For example, in a typical ADSL encoder, the encoder allocates data to carrier channels having the largest number of bit loading before allocating data to carrier channels having lower bit loading. Thus, the ordered bit loading table will generally be ordered from the carrier channel having the largest bit loading to the carrier channel having the lowest bit loading.

Figure 29:
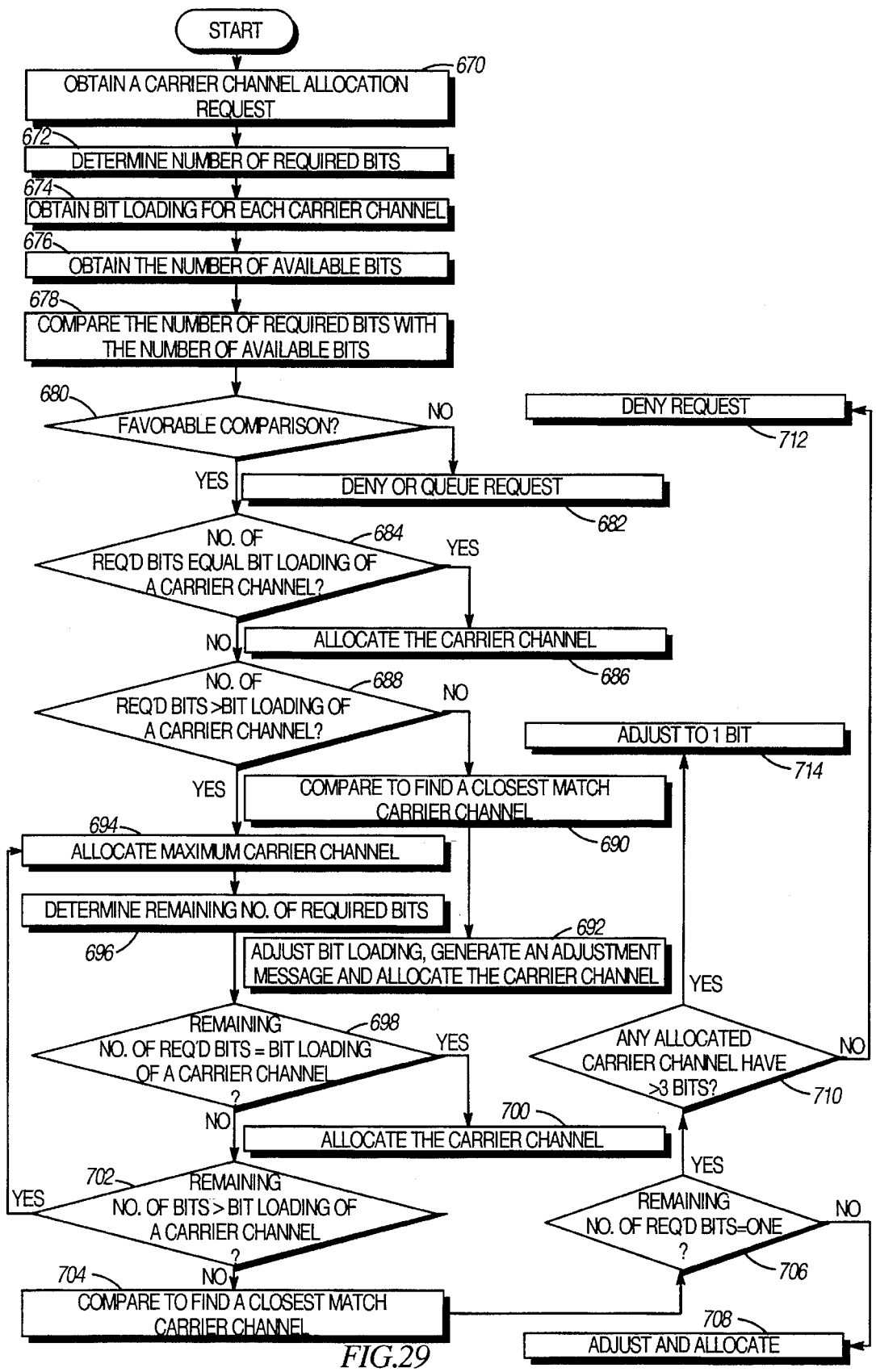
FIG. 29 illustrates another alternate logic diagram that may be used to implement carrier channel allocations in accordance with the present invention.

FIG. 29 illustrates an alternative method for allocating carrier channels to call requests in the system as shown in either FIG. 8 or FIG. 9. At step 670, the primary site obtains a carrier channel allocation request. The request may be obtained by generating the request within the primary site, or may be received from an external source. An external source may be one of the plurality of sites or from a system manager. Regardless of how the carrier channel allocation request is obtained, the process proceeds to step 672 where the process determines a number of required bits. As previously mentioned, the primary site determines the number of required bits by accessing a call type-to-bit requirement database.

At step 674, the primary site accesses an ordered bit loading table to obtain bit loading for each carrier channel. The ordered bit loading table may be generated as previously described with reference to FIG. 28. Having obtained the bit loading for each carrier channel, the process proceeds to step 676, wherein the process sums the bit loading of the carrier channels to obtain a number of available bits. At step 678, the process compares the number of required bits with the number of available bits calculated in step 676. As step 680, the process branches depending on whether the comparison of step 678 was favorable, a favorable comparison occurs when the number of available bits matches or exceeds the number of required bits.

If the comparison at step 680 was unfavorable, the process proceeds to step 682 where the process queues or denies the request and transmits a system busy or denied message to the requesting subscriber. If, however, the comparison was favorable, the process proceeds to step 684 where the process determines whether the number of required bits equals the bit loading of a carrier channel. This determination is done by scanning the ordered bit loading table to see if the bit loading of any of the carrier channels matches the number of required bits. If the scan finds a match, the process proceeds to step 686 where the process allocates the carrier channel having the bit loading which matches the number of required bits to the carrier channel request. If, however, a match is not found in step 684, the process proceeds to step 688 where a determination is made as to whether the number of required bits is greater than the bit loading of a carrier channel having the maximum bit loading in the ordered bit loading table.

When the answer to the comparison to step 688 is no, at step 690, the process compares the bit loading of each carrier channel with the number of required bits to find a closest match carrier channel. A closest match carrier channel is one that has bit loading greater than the number of required bits, but is closest to the number of required bits. For example, if the number of required bits is 4 and the only two carrier channels available have a bit loading of 6 bits and 8 bits, the carrier channel having the bit loading of 6 bits will be the closest match. At step 692, the process adjusts the bit loading of the closest match carrier channel to equal the number of required bits, an adjustment message is generated, and the closest match carrier channel is allocated to the call request.

Adjusting the bit loading of the closest match carrier channel is done by changing the bit loading to match the number of required bits, thus in the mini example presented above, the carrier channel having a bit loading of 6 bits will be adjusted to 4 bits. This adjustment is used to prevent unnecessary data being transmitted. As one skilled in the art can readily appreciate, this adjustment may be alleviated by injecting null information into the extra 2 bits. If such an approach is taken, a null indication is generated such that the receiving end knows which particular bits are carrying the null information. Alternatively, the extra two bits could be used to carry data for another data transfer request.

When the number of required bits is greater than the bit loading of any carrier channel, at step 694, the process allocates the carrier channel having the maximum bit loading, i.e., the maximum carrier channel, to the carrier channel request. Having done this, the process proceeds to step 696 where the process determines a remaining number of required bits from the number of required bits and the bit loading of the maximum carrier channel. As an example, the remaining number of required bits may be determined by subtracting the bit loading of the maximum carrier channel from the number of required bits.

At step 698, the process determines whether the remaining number of required bits equals the bit loading of any available carrier channel. If yes, the process proceeds to step 700 where the particular carrier channel is allocated to the carrier channel request. Having done this, the particular carrier channel allocation request has been allocated a sufficient number of carrier channels to fulfill the bandwidth requirements of the service being requested. Thus, concluding the process for this particular carrier channel allocation request.

If, however, the remaining number of bits does not equal the bit loading of a carrier channel the process proceeds to step 702 where the process determines whether the remaining number of bits is greater than the bit loading of any available carrier channel. If the answer is yes, the process reverts back to step 694 where the carrier channel having the maximum bit loading is allocated to the particular carrier channel request then a second remaining number of required bits is calculated.

If, however, the remaining number of required bits is less than the bit loading of a carrier channel having a maximum bit loading the process proceeds to step 704. At step 704, the bit loading of each carrier channel is compared with the remaining number of required bits to find a closest match carrier channel. Having found a closest match carrier channel, the process proceeds to step 706 where a determination is made as to whether the remaining number of required bits is equal to 1. If the answer to step 706 is no, the process proceeds to step 708 where the closest match carrier channel has its bit loading adjusted to match the remaining number of required bits and the closest match carrier channel is allocated to the carrier channel allocation. Having done this, the carrier channel allocation request has been supplied with a sufficient number of carrier channels to meet the bandwidth requirements for the call.

If, however, the remaining number of required bits is equal to 1, the process proceeds to step 710 where an inquiry is made as to whether any of the allocated carrier channels has a bit allocation greater than 3. If not, the process proceeds to step 712 where the request is denied. If, however, the answer to step 710 is yes, the closest match carrier channel has its bit loading adjusted to 2 bits and a previously allocated carrier channel has its bit loading reduced by 1 bit. For example, assume that an allocation to a particular request has already allocated a carrier channel having a bit loading of 7 bits. A remaining number of bits is calculated to be 1, a closest match carrier channel is found to have 3 bits. Thus, the closest match carrier channel will have its bit loading adjusted to 2 bits and the bit loading of the previously allocated carrier channel will have its bit loading reduced to 6 bits.

The previous step is required due to ADSL requirements. Per the ADSL requirements, the minimum bit loading a carrier channel can have is 2 bits. With two bits, the quadrature amplitude modulation (QAM) signal generated from the two bits will have a single constellation point in each quadrant. Having one constellation point in each quadrant is the minimum amount of constellation points that a QAM signal can represent.

Figure 30:
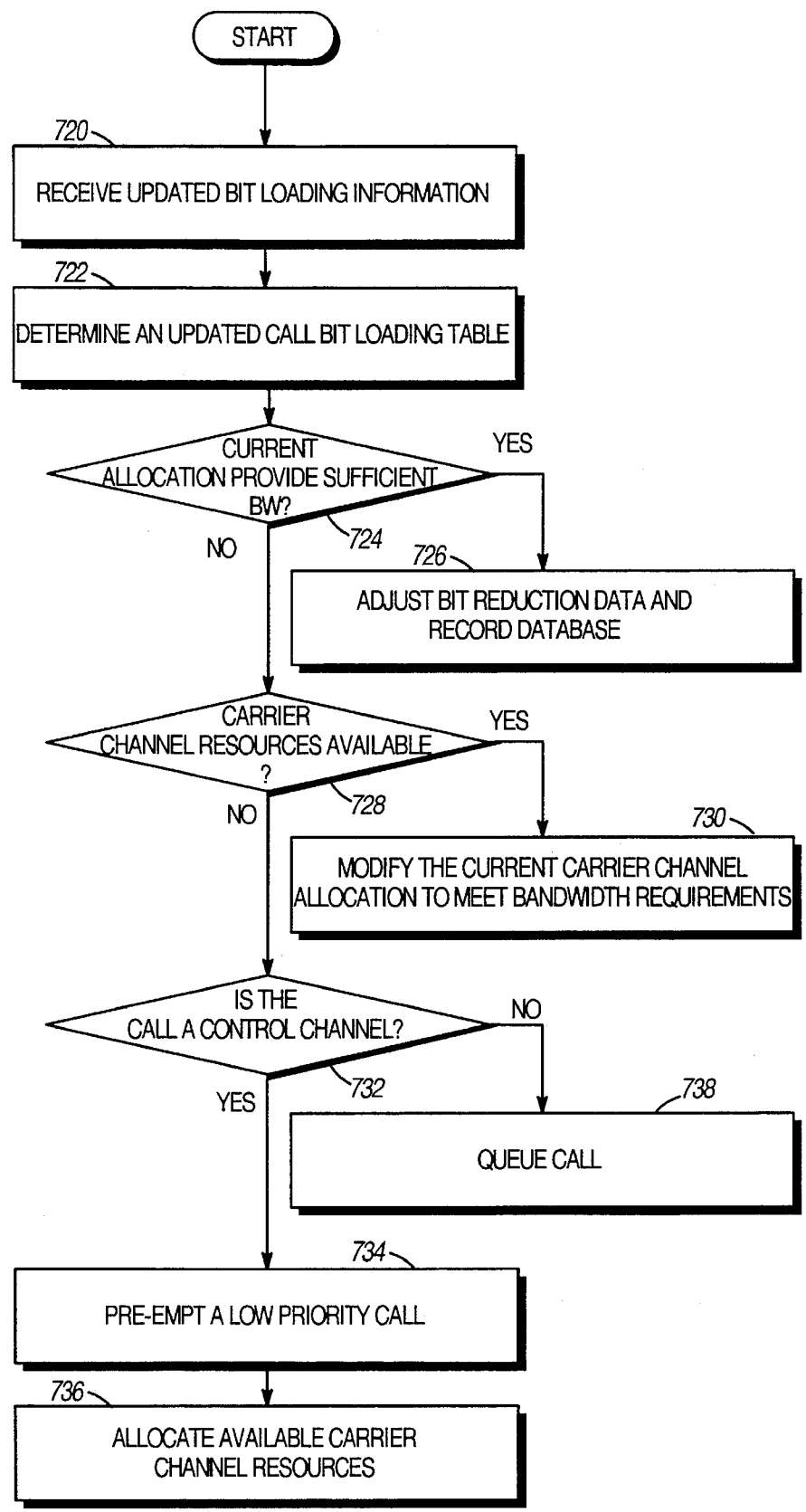
FIG. 30 illustrates a logic diagram that may be used to update carrier channel assignments in accordance with the present invention.

FIG. 30 illustrates a logic diagram that may be used to perform carrier channel allocation updates. At step 720, the primary site receives updated bit loading information from a plurality of sites. In an ADSL system, bit loading information is updated on a regular basis. Typically updating occurs every 69th frame by transmitting a training signal to the plurality of sites. The frequency in which the updating needs to take place may be adjusted based on the environment in which the twisted pair copper wire telephone line exists. For example, the transfer characteristics of the twisted pair copper wire telephone line change due to temperature, wind, humidity, and other environmental variations.

Having received the updated bit loading information from the plurality of sites, the process proceeds to step 722 where, for each active call, an updated call bit loading table is determined. As previously mentioned a call bit loading table is i compilation of site bit loading tables wherein the site bit loading tables are determined by the particular sites having a target unit located within their boundaries. Thus, the process at step 722 is a similar process as described above other than the function at step 722 utilizes the updated bit loading information from the sites obtained in step 720.

Having generated the updated call bit loading tables, the process proceeds to step 724 where the primary site determines whether the current carrier channel allocation for the particular call provides sufficient bandwidth. This determination is made by comparing the updated bit loading of the carrier channel(s) allocated to a particular call with the previous bit loading of the carrier channel(s). If the bit loading for the allocated carrier channels remain the same or increase, the answer to step 724 will be yes. If, however, the bit loading goes down, the answer to step 724 is no.

As an example, assume that two carrier channels have been allocated to a particular call. The bit loading for these two carrier channels is 7 bits and 6 bits, respectively, and the bandwidth requirements is 13 bits. After a bit loading update, the bit loading of these two carrier channels has changed to 8 bits and 5 bits, respectively. Thus, the bandwidth requirements are still met even though the distribution of the data will be different. If, however, the updated bit loading for the two carrier channels is 7 bits and 5 bits, respectively, the current carrier channel allocation does not provide sufficient bandwidth.

If the answer to step 724 was yes, the process proceeds to step 726 where, for a carrier channel having a bit loading increase, bit reduction data is adjusted within the carrier channel allocation database. For the purposes of this discussion, the bit reduction information indicates the number of bits that a carrier channel has been reduced to match the bandwidth requirements. For example, a carrier channel has a bit loading of 12 bits, but, the call bandwidth requirements only needs 10 bits. Thus, in the carrier channel allocation database, the bit loading of the carrier channel will be adjusted to 10 bits and the bit reduction data will be 2 bits.

If the answer to the inquiry of step 724 was no, the process proceeds to step 728. At step 728, an inquiry is made as to whether addition carrier channel resources are available. Additional carrier channel resources may be in the form of available carrier channels or available bits due to a previous bit reduction. If the answer to the inquiry of step 728 is yes, the process proceeds to step 730 wherein the current carrier channel allocation is modified to meet the bandwidth requirements. This may be done by adjusting the bit loading of allocated carrier channels or by allocating addition carrier channels to the call. If, the modification is done by adjusting the bit loading of allocated carrier channels, the bit reduction information is added to the bit loading of the carrier channel to generate new bit loading information and the bit reduction data is reduced to zero. For example, assume that one carrier channel was allocated to a particular call and the carrier channel has an adjusted bit loading of 10 bits and a bit reduction of 2 bits. After an update, the bit loading of the channel was reduced to 10, thus the 2 bits of bit reduction would be deleted to meet the required bandwidth.

If the answer to step 728 was no, the process proceeds to step 732 where an inquiry is made as to whether the particular call is a control channel. If the answer to step 732 is no, the process proceeds to step 738 where the call is queued until carrier channel resources become available, or the call is terminated.

If, however, the answer to step 732 is yes, the process proceeds to step 734. At step 734, a low priority call is pre-empted to produce available carrier channel resources. Having made carrier channel resources available, these carrier channel resources are allocated to the control channel, which is depicted at step 736.

Figure 31:
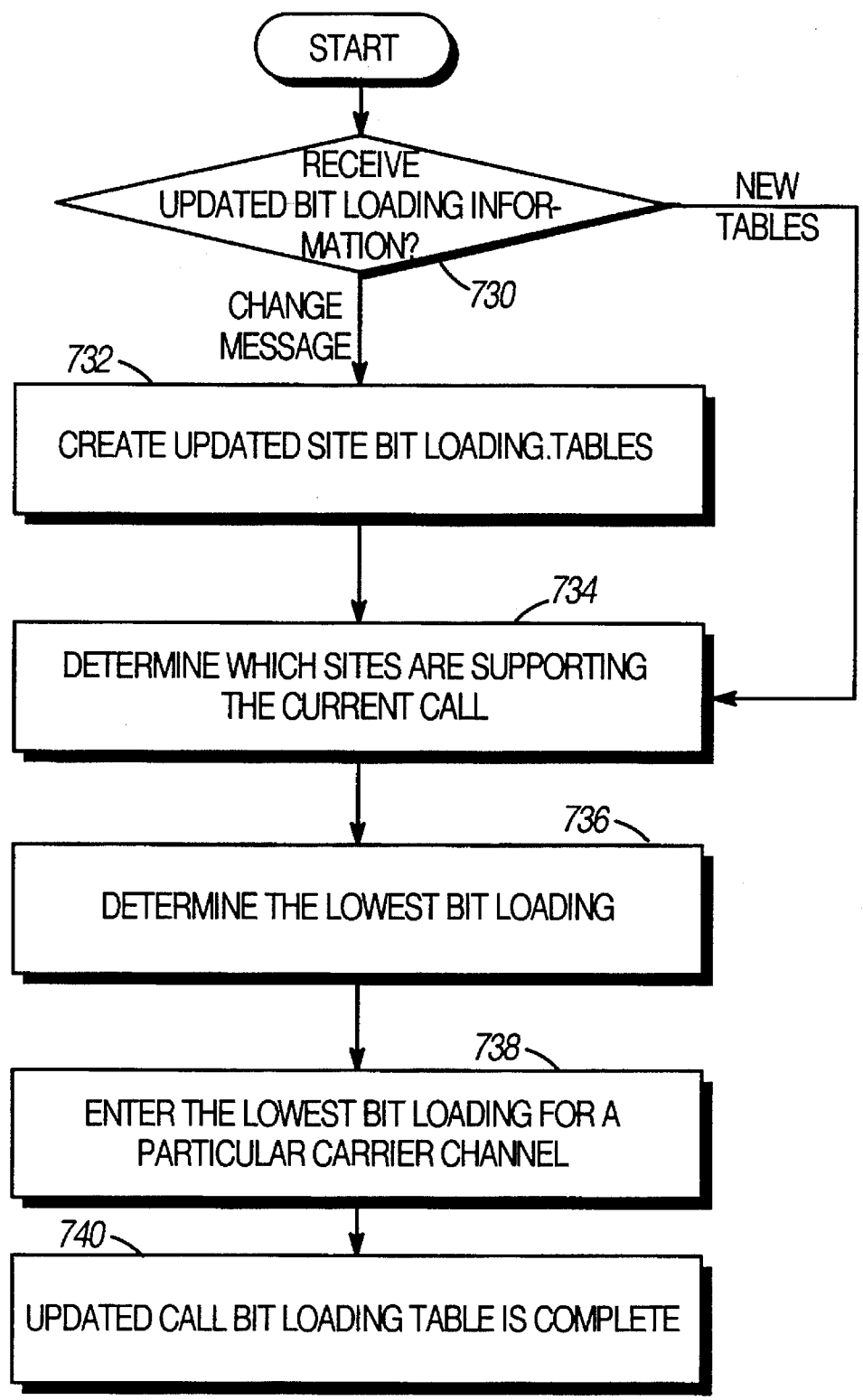
FIG. 31 illustrates a logic diagram that may be used to update bit loading tables in accordance with the present invention.

FIG. 31 illustrates a logic diagram for producing an updated call bit loading table. At step 730, updated bit loading information is received as either new site bit loading tables or as a bit loading change message. As indicated by this inquiry, the updated bit loading information may be received as new site bit loading tables, wherein a site, after receiving the update training signal, transmits a new, or updated, site bit loading table to the primary site. Alternately, the site could compare the new bit loading table with the previous bit loading table for any differences. When the site detected a difference, the site generates a change message indicating which carrier channels had a bit loading change and the type of change. Having done this, the site sends the change message.

When the bit loading information is transmitted as a change message, the process proceeds to step 732 where the primary site creates an updated site bit loading table from the change message. This is accomplished by taking the existing site bit loading table and interpreting the change messages to create the updated site bit loading table. Having done this the process proceeds to step 734.

At step 734, a site location database is accessed to determine which sites are supporting a current call to produce a set of sites. The process then proceeds to step 736 wherein, for each carrier channel entry in the set of sites bit loading tables, the lowest bit loading is determined. Thus, if a call is being supported by three sites and carrier channel 1 has a bit loading of 12 bits in site 1, 11 bits in site 2, and 13 bits in site 3, the lowest bit loading for carrier channel 1 is 11 bits. This 11 bits will be entered into the updated call bit loading table. This is depicted at step 738, wherein the lowest bit loading for a particular carrier channel is entered into the updated call bit loading table. Next, the process proceeds to step 740 where each of the particular carrier channels in the set of site bit loading tables are compared to determine the lowest bit loading. Then, the lowest bit loading is entered into the update call bit loading table. Once each of the carrier channels has been compared, the update call bit loading table is complete.

Figure 32:
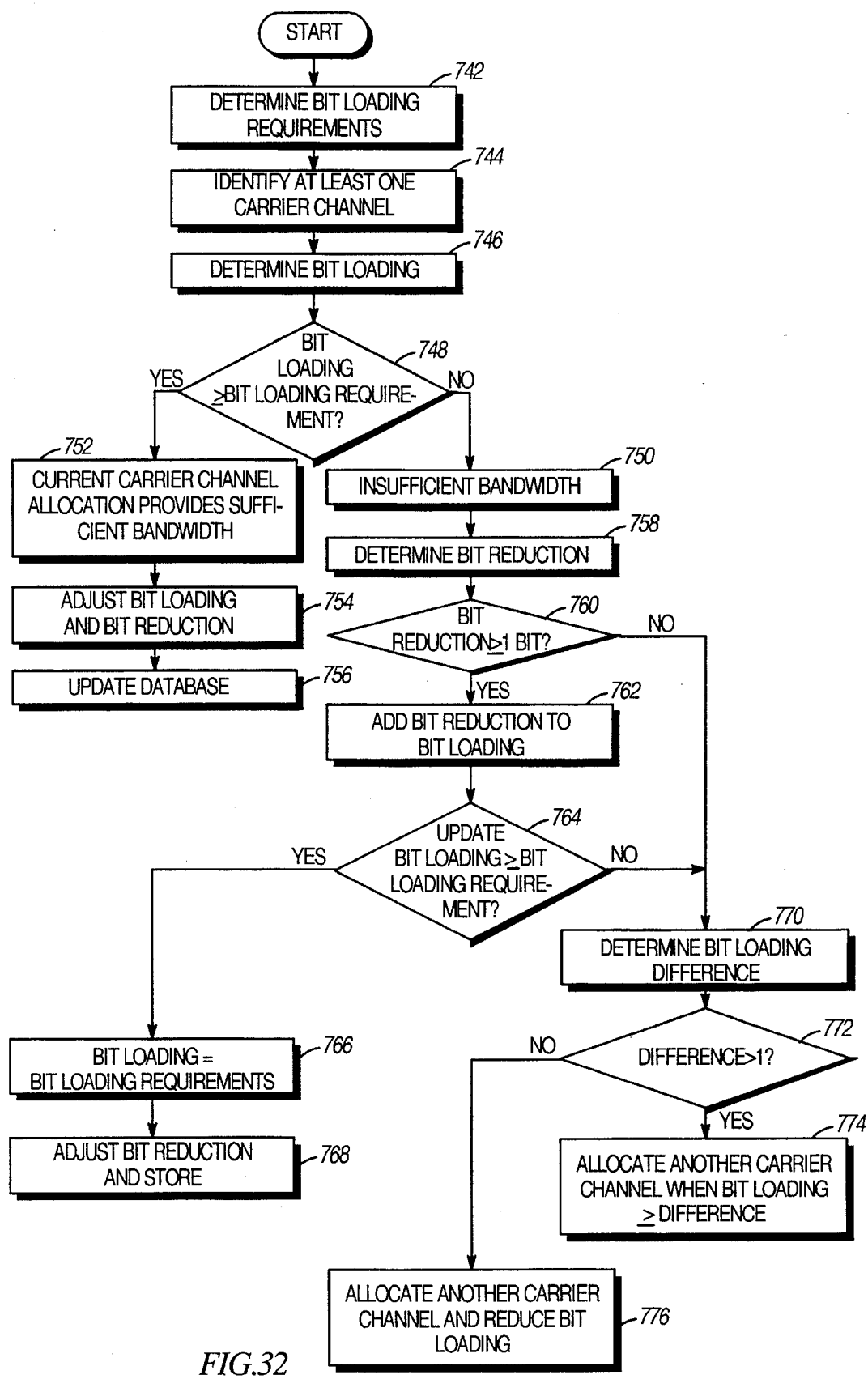
FIG. 32 illustrates an alternate logic diagram that may be used to update carrier channel assignments in accordance with the present invention.

FIG. 32 illustrates an alternative embodiment for updating carrier channel allocations. At step 742, the process accesses a carrier channel allocation database to determine bit loading requirements for a particular call. Having obtained this information, the process proceeds to step 744 where the carrier channel allocation database is again accessed to identify at least one carrier channel. Having done this, the process proceeds to step 746, wherein bit loading of the at least one carrier channel is determined from the updated call bit loading table. With this information, a comparison is made at step 748 to determine whether the bit loading of the carrier channel is greater than or equal to the bit loading requirements.

If the bit loading of the carrier channel indicated in the updated call bit loading table is greater than or equal to the bit loading requirements, the process proceeds to step 752 where the process indicates that the current carrier channel allocation provides sufficient bandwidth. In other words, when the bit loading remains the same or increases for the allocated carrier channel, the bandwidth requirements are met, thus the carrier channel provides sufficient bandwidth. Having made this determination the process proceeds to step 754.

At step 754, the process first determines whether the bit loading of the allocated carrier channel increases, or is greater than the bit requirements. If not, the process is complete for this updating process. If, however, the bit loading has increased, the carrier channel's bit loading is adjusted to met the bandwidth requirements. In addition, the bit reduction data is updated to indicate the number of bits the allocated carrier channel has been reduced. Having done this, the process proceeds to step 756 where the carrier channel allocation database is updated with the carrier channel's bit loading and bit reduction data.

If the updated bit loading of the carrier channel is less than the bit loading requirements, the process proceeds to step 750 where it is determined that the current carrier channel allocation does not provide sufficient bandwidth. In other words, when the bit loading of the allocated carrier channel is reduced as a result of the updating, the carrier channel cannot support the bandwidth, or meet the bit requirement of the particular call. Having made this determination, the process proceeds to step 758.

At step 758, the process accesses the carrier channel allocation database to determine bit reduction data for the at least one carrier channel. This is done to determine whether the previous bit loading of the carrier channel had been bit reduced to match the bandwidth requirements for the call. Note that when the updated call bit loading table is generated, the bit loading for a carrier channel will be the maximum bit loading for that carrier channel less the number of bits indicated by the bit reduction data. For example, assume that initially a carrier channel had a bit loading of 12 bits. The bandwidth requirement for the particular call it is supporting is only 10 bits. Thus, the bit loading in the call bit loading table would be 10 bits and the bit reduction data would be 2 bits. When the carrier channel bit loading is updated, it is determined that its new maximum bit loading is 10 bits. When the call bit loading table is updated, it will be updated to 8 bits (10 minus 2) due to the 2 bits in the bit reduction field of the carrier channel allocation database.

Having accessed the carrier channel allocation database at step 758, the process proceeds to step 760 where it is determined whether the bit reduction data is greater than or equal to 1 bit. If the bit reduction data is greater than or equal to 1, the process proceeds to step 762 where the bit reduction data is added to the bit loading of the carrier channel to get further updated bit loading information. Having generated the updated bit loading, the process proceeds to step 764 where it is determined whether the updated bit loading is greater than or equal to the bit loading requirements.

If the updated bit loading is not greater than or equal to the bit loading requirements, or the bit reduction data is 0 bits, the process proceeds to step 770 where a determination is made to identify a bit loading difference. The bit loading difference can be determined by subtracting the current bit loading capabilities of the carrier channel from the bit loading requirements. At step 772, the process determines whether the bit loading difference is greater than 1. If the bit loading difference is greater than 1, the process proceeds to step 774 where another carrier channel is allocated to the current call. Having done this, the carrier channel allocation database is updated.

If, however, the bit loading difference as determined in step 772 is not greater than 1, the process proceeds to step 776. At step 776, another carrier channel having a bit loading of at least 2 bits is allocated to the particular call. Having done this, the previously allocated carrier channel has its bit loading reduced by 1. Having reduced the bit loading by 1, the bit reduction data for this carrier channel is updated.

When the updated bit loading is greater than or equal to the bit loading requirements as determined at step 764, the process proceeds to step 766. At step 766, the bit loading of the carrier channel is set equal to the bit loading requirements. Having done this, the process proceeds to step 768 where the bit reduction data is updated to reflect the number of bits the bit loading has been reduced and this value is stored in the carrier channel allocation database.

Figure 33:
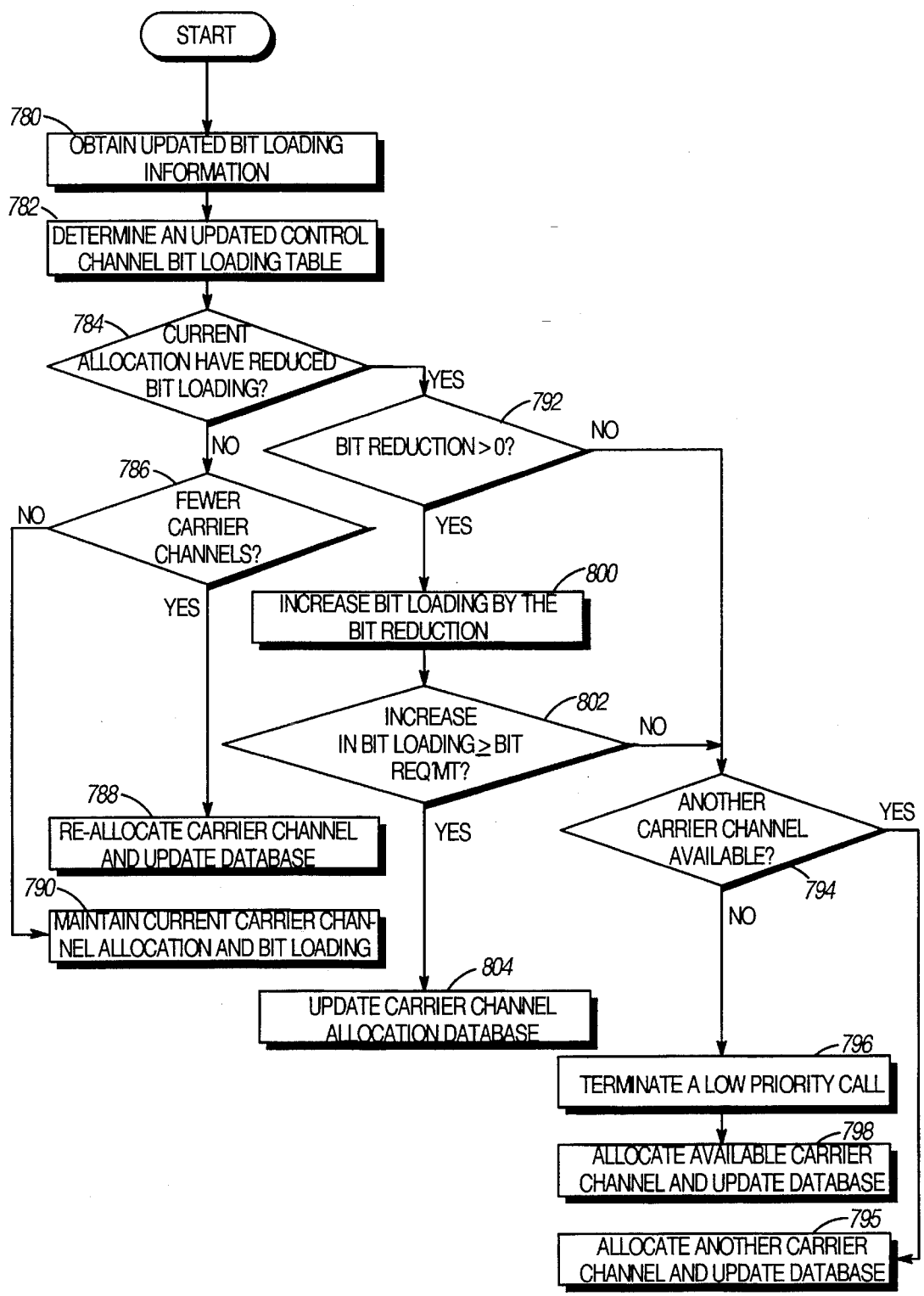
FIG. 33 illustrates a logic diagram that may be used to update carrier channel assignments for a control channel in accordance with the present invention.

FIG. 33 illustrate a logic diagram that may be used for updating carrier channels that have been allocated to a control channel. At step 780, updated bit loading information is obtained from a plurality of sites. Having obtained this information the process proceeds to step 782 where an updated control channel bit loading table is determined. Recall that a control channel bit loading table is a compilation of all of the site bit loading tables wherein the control channel bit loading table stores the lowest bit loading for each carrier channel.

At step 784, the process determines whether the current carrier channel allocation for the control channel had a total bit reduction. A total bit reduction is determined by summing the bit loading for each carrier channel allocated to the control channel. If a total bit reduction did not occur, the process proceeds to step 786 where an inquiry is made as to whether the control channel can be fulfilled with fewer carrier channels. This determination is based on comparing the bit loading of the allocated carrier channels to the control channel in comparison to the number of required bits for the control channel. If the bit loading of one of the carrier channels can be removed and the bit requirements for the control channel can be met, then the control channel can be fulfilled with fewer carrier channels.

If the control channel cannot be fulfilled with fewer carrier channels, the process proceeds to step 790. At step 790, the current carrier channel allocations are maintained and bit loading may be adjusted accordingly. Note that the bit loading may be adjusted to meet the bandwidth requirements and, if done, the bit reduction will be stored in a carrier channel allocation database.

When the current carrier channel allocation for the control channel has undergone a bit reduction, the process proceeds to step 792. At step 792, an inquiry is made as to whether any of the carrier channels allocated to the control channel have bit reduction data greater than 0. In other words, the inquiry at step 792 determines whether a carrier channel allocated to the control channel had its bit loading reduced to match the bandwidth requirements. If the inquiry to 792 is yes, the process proceeds to step 800. At step 800, the bit loading of the particular carrier channel is increased by the bit reduction data. Having done this, the process proceeds to step 802, where an inquiry is made as to whether the bit loading increase provides sufficient bit loading to meet the bit requirements. If the answer to 802 is yes, the process proceeds to step 804 where the carrier channel allocation database is updated to reflect the change.

If the answer to step 792 or the answer to step 802 is no, the process proceeds to step 794. At step 794 an inquiry is made as to whether another carrier channel is available. If yes, the process proceeds to step 795 where the other carrier channel is allocated to the control channel and the carrier channel allocation database is updated to reflect this change. If, however, another carrier channel is not available the process proceeds to step 796.

At step 796, a low priority call is terminated to produce an available carrier channel. Prioritization of calls has not been discussed in great detail, but to one skilled in the art, prioritization is a well known technique. Thus, a detailed description of call prioritization is not necessary for the understanding of this invention.

Having terminated a low priority call, the process proceeds to step 798 where the carrier channel made available is allocated to the control channel. Having made this allocation, the carrier channel allocation database is updated.

Figure 34:
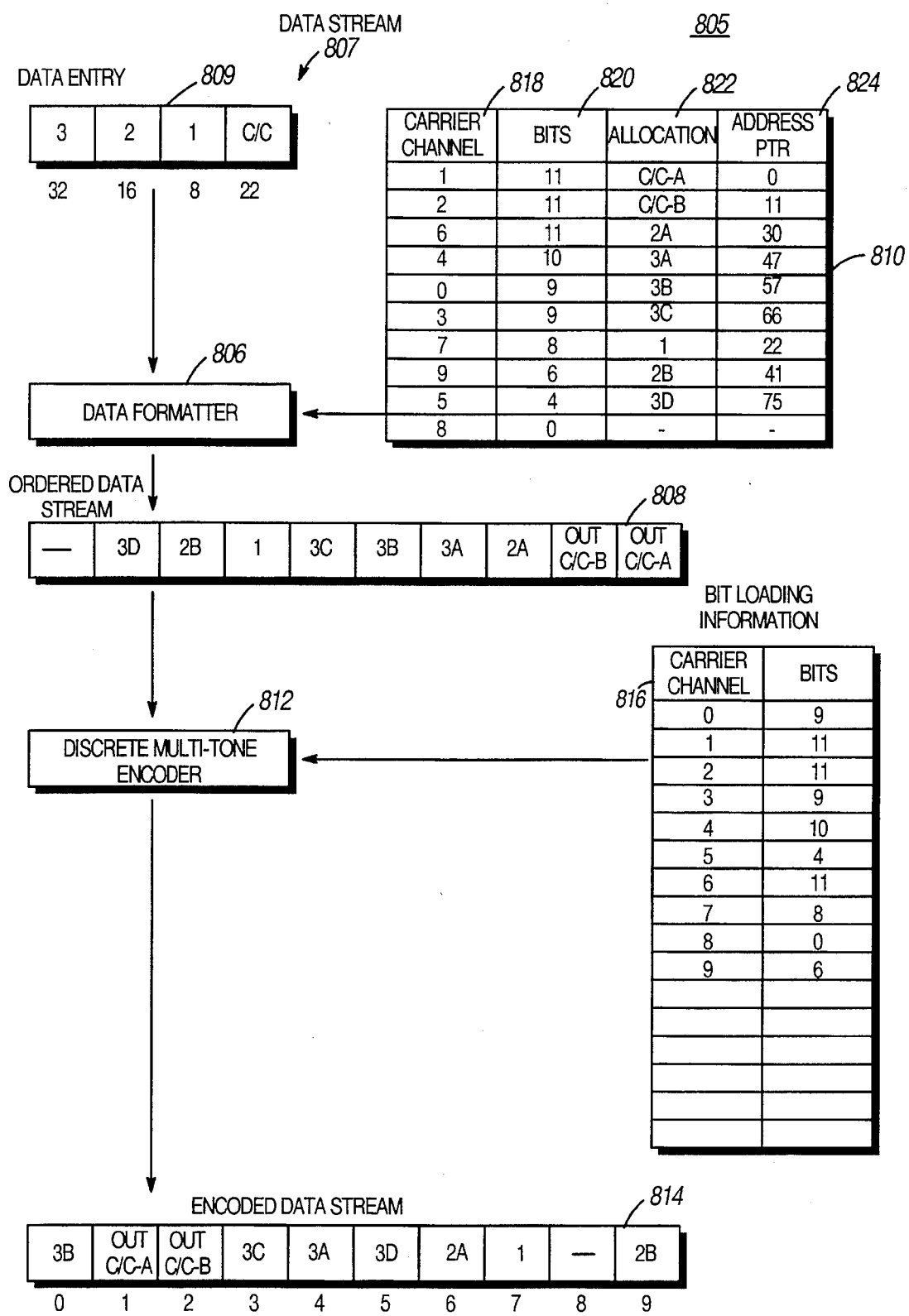
FIG. 34 illustrates a functional block diagram of a DMT transmitter in accordance with the present invention.

FIG. 34 illustrates a function block diagram of a discreet multi-tone transmitter 805. As shown, a stream of data entries 807, which includes a plurality of data entries 809, is received by a data formatter 806. In addition to receiving the data stream 807, the data formatter also receives carrier channel allocation information 810. From the data stream 807, the data formatter produces an ordered data stream 808 based on the carrier channel allocation information 810. The ordered data stream 808 is then received by a discreet multi-tone encoder 812, which also receives bit loading information 816. Based on the bit loading information 816, the discrete multi-tone encoder 812 produces an encoded data stream 814.

The illustration of FIG. 34 depicts a system having only ten carrier channels. In a typical ADSL system, however, there are 256 carrier channels, or separate frequencies. The present invention contemplates using the ADSL system techniques, nevertheless, for the sake of illustration, the remainder of the discussion for this figure will deal with a system having only ten carrier channels. As shown, the data stream 807 includes an outbound control channel data entry, a first data entry, a second data entry, and a third data entry. The order in which the data entries are placed in the data stream are determined upon receipt of the calls or some other determination mechanism. This determination is made by the TDMA switch of FIGS. 10 and 11, wherein the TDMA switch produces the data stream 807. Note that the data stream 807 is shown with a number under each data entry, where the number represents the number of required bits per frame. Thus, the outbound control channel requires 22 bits, while the first data entry requires 8 bits, the second data entry requires 16 bits, and the third data entry requires 32 bits.

The carrier channel allocation information table 810 includes a carrier channel field 818, a bits field 820, an allocation field 822, and an address pointer field 824. The generation of the address pointer information will be described later with reference to FIGS. 46–50. As shown, carrier channel 1 and carrier channel 2 each have a bit loading of 11 bits and are allocated to the outbound control channel. Carrier channel 7 is allocated to data entry, or call, 1. Carrier channels 6 and 9 are allocated to data entry, or call, 2. Carrier channels 0, 3, 4, and 5 are allocated to data entry, or call, 3. The determination of carrier channel allocation was done in accordance with the logic diagrams of FIGS. 26–29.

The data formatter 806 utilizes the carrier channel allocation information 810 to generate the ordered data stream 808. The ordered data stream 808 is needed to insure that the discrete multi-tone encoder 812 will affiliate the appropriate portions of the data entries with the allocated carrier channels. For example, as mentioned, carrier channels 1 and 2 have been allocated to the outbound control channel. The discreet multi-tone encoder 812, assuming a constellation encoding pattern of loading data into a carrier channel having the greatest bit loading to carrier channels having the smallest bit loading, will place the data it receives in the carrier channels having the largest bit loading first. Thus, as shown in the carrier channel allocation information table 810, the first carrier channel that the discrete multi-tone encoder will place data in is carrier channel 1. Having filled carrier channel 1, the encoder will then sequentially fill carrier channels 2, 6, 4, etc.. Thus, the data formatter 806 must organize the data stream of data entries 807 into the ordered data stream such that the data blocks of the data entries will be affiliated with the appropriate carrier channel.

While the discreet multi-tone encoder 812 will load particular carrier channels based on their bit loading, the encoded data stream will be organized in a sequential manner based on the bit loading information. The sequential manner is based on the carrier channel numbering. As shown, the encoded data stream 814 is organized from carrier channel 0 to carrier channel 9. The bit loading information informs the DMT encoder 812 as to how much of the ordered data stream is to be placed on to each of the carrier channels. The DMT encoder 812 will essentially use the ADSL encoding scheme, thus no further discussion will be presented except to further illustrate the present invention.

Figure 35:
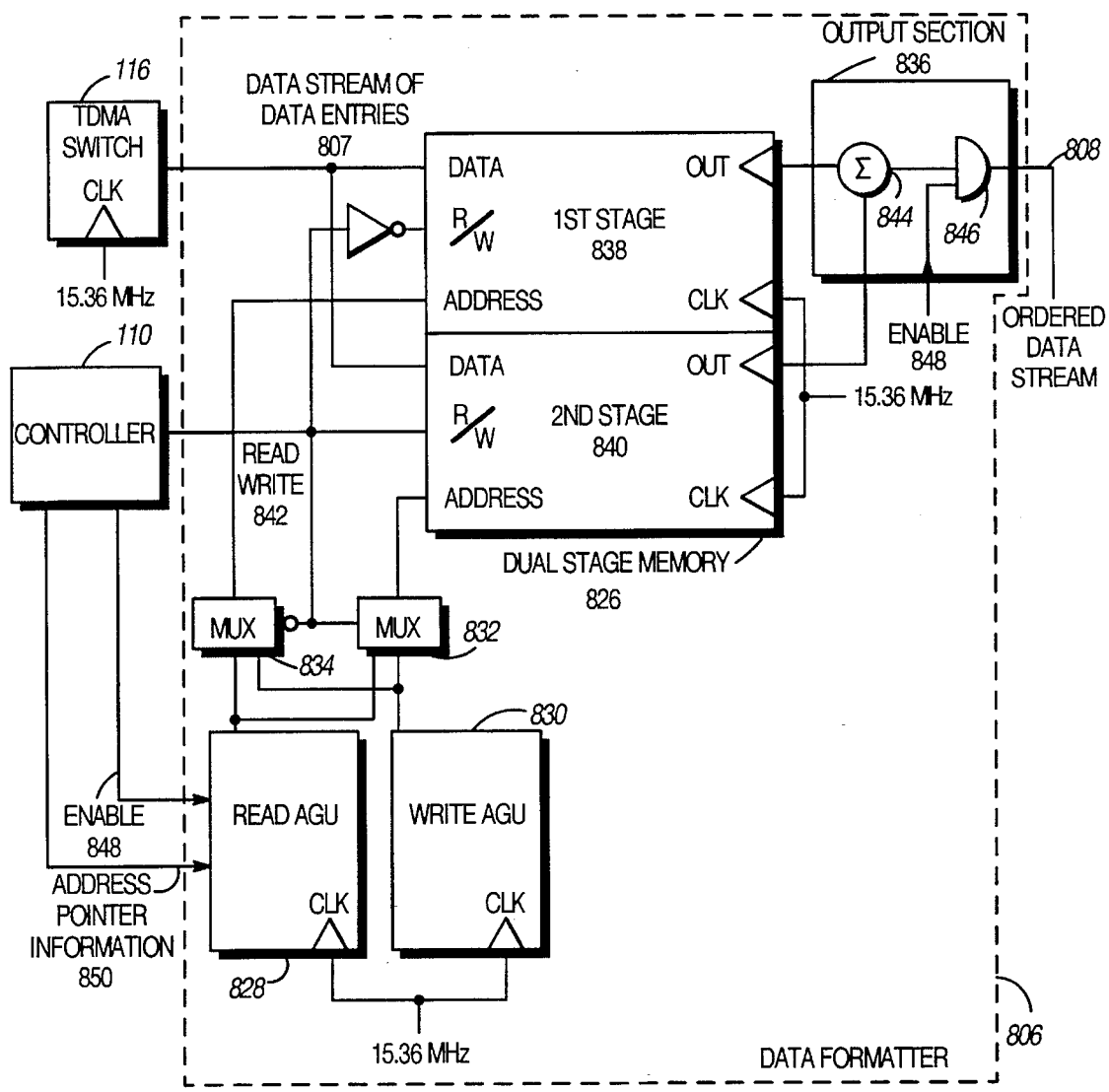
FIG. 35 illustrates a schematic block diagram of a data formatter of the DMT transmitter in accordance with the present invention.

FIG. 35 illustrates a more detailed schematic block diagram of the dam formatter 806. As shown, the data formatter 806 includes a dual stage memory 826, an output section 836, a read address generation unit (AGU) 828, a write address generation unit 830, a first multiplexer 834, and a second multiplexer 832. The dual stage memory 826, which may be a Manchester encoder, includes a first stage 838 and a second stage 840. The output section 836 includes an adder 844 and an AND gate 846.

In operation, the data stream of entries 807 are received in a shift right serial manner into the data input port of either the first stage 838 or the second stage 840 and read out in the ordered data stream 808. The controller 110, which may be the controller within the primary site or any one of the secondary sites as illustrated in FIG. 10 or 11, provides a read-write signal 842, an enable signal 848, and address pointer information 850 to the data formatter 806. The read-write signal 842 indicates which of the stages of the dual stage memory 826 will be providing the ordered data stream 808 and which will be storing the data stream 807. In addition, the read-write signal 842 enables the mutliplexers 834,836 to provide the addresses generated by the read AGU 828 or the write AGU 830 to the first or second stage of the dual stage memory 826. The read-write signal 842 is toggled on a frame cycle basis. In other words, for one frame (250 μSec for an ADSL frame) the read-write signal 842 is providing a logic "1" signal to the second stage 840 and to multiplexer 832, such that the second stage 840 is in the read mode and receiving addresses from the read AGU 828. During this frame cycle, an inversion of the read-write signal 842 (logic "0") is provided to the first stage 838 and multiplexer 834 such that the first stage is in the write mode and receiving addresses from the write AGU. For the next frame cycle, the read-write signal provides a logic "0" signal such that the second stage is now in the write mode while the first stage is in the read mode. To one skilled in the art, the logic value of the read-write signal may be altered and still achieve the desired results.

Figure 62:
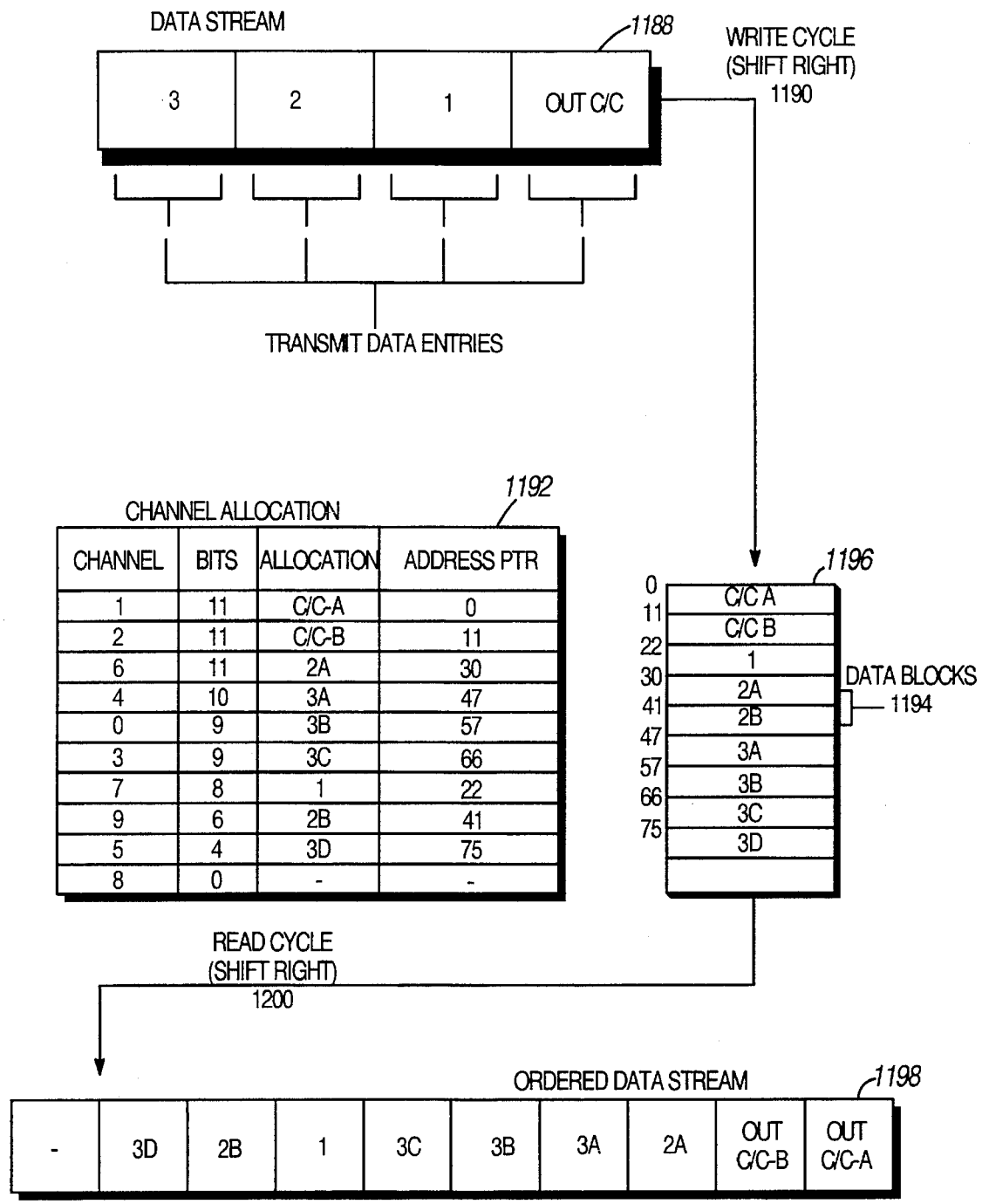
FIG. 62 illustrates a data flow diagram in accordance with the present invention.

The address pointer information 850 is used by the read AGU to allow the stages to be read out in a fragmented manner to produce the ordered data stream. This will be discussed in greater detail below with reference to FIG. 62. Alternatively, the address pointer information 850 could be utilized by the write AGU 830 to write in the information in a staggered manner, such that the data stream 807 is stored as the ordered data stream 808 and serial read out serially. Generation of the address pointer information 850 will be discussed below with reference to FIGS. 48–50.

Note that the data formatter 806 is clocked at a rate of 15.36 MHz. This frequency is chosen based on the maximum bit rate for an ADSL system. (Note that the clock rate may be chosen to be a different value depending on the needs of the system, or the clock rate may be variable based on the data rate.) Recall that an ADSL system has 256 carrier channels, with each carrier channel being able to carry up to 15 bits. Also recall that the ADSL frame rate, or frame cycle, is 4 KHz. Thus, the maximum bit rate is 256*15*4K which equals 15.36M. While the maximum bit rate is 15.36 Mbps, the practical maximum bit rate will be 6 Mbps to 9 Mbps based on the gauge of wire used and the length of wire. Thus, there will be a sufficient number of clocks cycles in which no data is being stored or sourced. To prevent dataless entries into the ordered data stream 808, the controller 110 provides the enable signal 848 to the output section 838 and the read AGU 828. The enable signal 848 is logic "1" when actual data is being read from the dual stage memory 826 and a logic "0" thereafter for a frame cycle. For example, if bits are read from the dual stage memory 826 in a serial manner and there are 1,000,000 bits of data stored, the enable signal will be logic "1" for the first 1,000,000 clock cycles within a frame cycle and will be logic "0" for the remaining 14,360,000 clock cycles of the frame cycle. Thus, to one skilled in the art, the enable signal 848 may be generated by a variety of digital circuits, such as a counter and latch, a sub-routine within a microprocessor, etc.

In operation, the write AGU 830 produces a circular buffer addressing scheme wherein the bits of the data stream 807 are serially shifted right into the first or second stage 838, 840, depending on which stage is in the write mode. Thus, the first bit in the data stream 807 will be stored in the first storage location of either the first stage 838 or the second stage 840. The next bit in the data stream 807 will be stored in the second storage location, the third bit in the third storage location, and so on until all of the bits of the data stream 807 have been stored for this frame cycle.

Once a frame's worth of data has been stored, the write AGU 830 resets, or circles around, such that, for the next frame, the write AGU 830 provides the same addresses in the same order as it did for the previous frame. Note that the enable signal 848 may also be provided to the write AGU 830, such that, when all the bits of a frame of the data stream 807 have been stored, the write AGU 830 stops generating addresses for this frame.

The read AGU 828 provides addresses to the first or second stage, depending on which stage is in the read mode, in a staggered manner. The staggered manner is determined based on the address pointer information 850 such that the data is read out as the ordered data stream. To illustrate, refer back to FIG. 34. As shown in FIG. 34, the carrier channel allocation information 810 includes an address pointer field 824. The address pointer information 850 indicates the beginning address for a data block of a data entry 809 of the data stream 807. From the carrier channel allocation database 810, it can be seen that the data entry 809 entitled outbound control channel is allocated carrier channels 1 and 2; the first data entry is allocated carrier channel 7; the second data entry is allocated carrier channels 6 and 9; and the third data entry is allocated carrier channels 4, 0, 3, and 5.

For each data entry that is allocated two or more carrier channels, the data entry is divided into data blocks, where the number of data blocks equals the number of allocated carrier channels. Further note that the ordering of the data blocks is based on the bit loading of the allocated carrier channels. For example, data entry three is allocated carrier channels 4, 0, 3, and 5, where carrier channel 4 has the greatest bit loading (10 bits), then carrier channel 0 (9 bits), carrier channel 3 (9 bits) and carrier channel 5 (4 bits). Thus, data block "a" of data entry three is allocated carrier channel 4, data block "b" is allocated carrier channel 0, data block "c" is allocated carrier channel 3, and data block "d" is allocated carrier channel 5.

While data entries are broken down into data blocks for carrier channel allocation, the data entries are stored as data entries, but are read out as data blocks to produce the ordered data stream. As an example of this refer to FIG. 62 which illustrates an exemplary process for storing the transmit data stream 1188 in a write section 1196 of the dual stage memory (826 of FIG. 35) and subsequently reading the stored data to produce the ordered data stream 1198. As shown, the data stream 1188 comprises a plurality of transmit data entries. In particular, outbound control channel, data call 1, data call 2, and data call 3. During the write cycle 1190, which comprises a shift right operation, the dual stage memory sequentially stores the first data entry followed by data call 1, data call 2, and data call 3.

From the carrier channel allocation table 1192, it can be seen that only data call 1 is allocated a single carrier channel. The other data entries are allocated two or more carrier channels and, as a result, are broken down into data blocks 1194. As shown, the outbound control channel data entry has two data blocks, wherein the first data block is allocated carrier channel 1 and the second data block is allocated carrier channel 2. Data call 1 is allocated carrier channel 7; data call 2 has two data blocks, where the first data block (2a) is allocated carrier channel 6 and the second data block (2b) is allocated carrier channel 9; and data call 3 has four data blocks, where data block 3a is allocated carrier channel 4, 3b is allocated carrier channel 0, 3c is allocated carrier channel 3, and 3d is allocated carrier channel 5. Given the data block breakdown and the constellation encoding pattern used by a constellation encoder (discussed in FIG. 36 below), the ordered data stream 1198 can be generated.

For purposes of this discussion, assume that the constellation encoder loads data into the carrier channels having the largest bit loading capabilities first. From the carrier channel allocation database 1192, the carrier channel order, based on greatest bit loading to least bit loading, is 1, 2, 6, 4, 0, 3, 7, 9, 5, and 8. Thus, the first 11 bits of data the constellation encoder receives will be placed in carrier channel 1, the next 11 bits in carrier channel 2, the next 11 bits in carrier channel 6, the next 10 bits of data in carrier channel 4, the next 9 bits of data in carrier channel 0, and so on. To ensure that the data blocks are allocated the appropriate carrier channels, the ordered data stream 1198 supplies the data to the constellation encoder in the right order. Thus, the ordered data stream 1198, for this example, contains, in a serial order, the data affiliated with carrier channel 1 first, followed by the data affiliated with carrier channel 2, then 6, 4, 0, 3, 7, 9, 5, and 8.

As shown, the first data block that is read from the dual stage memory during the read cycle 1200, is the first data block of the outbound control channel data entry. The initial read address for this data block is set equal to the address pointer for this data block. The read address is then incremented at clock cycle intervals up to the number of bits in the data entry. For the first data block of the outbound control channel, this is 11 bits, thus, the read address is incremented 11 times from the address pointer for this data block. Having produced the 11 addresses, the read cycle retrieves the address pointer for the data allocated to the next greatest bit loading carrier channel. In this example, the address pointer for the second data block of the outbound control channel is retrieved and addresses are produced to read this data block. After this data block has been read, the next data block affiliated with the carrier channel having the next greatest bit loading is read. In this example, that is the first data block of data call 2. This process continues until all the data blocks have been read in an order based on the bit loading of the respective allocated carrier channel. For a given frame cycle, the ordered data stream will have an order of outbound control channel data block "a", outbound control channel data block "b", data call 2 data block 2a, data block 3a, 3b, 3c, data call 1, 2b, and 3d, which corresponds to the constellation encoding of greatest bit loading to least bit loading carrier channels.

Referring back to the discussion of FIG. 34, the ordered data stream 814 is read on a data block basis, while the data stream 807 is stored on a data entry basis. As discussed, the reading of the data is further based on the constellation encoding scheme used by the constellation encoder. Given, this information, the ordered data stream 808 is produced. From the ordered data stream, the DMT encoder 812, which utilizes the constellation encoding scheme, generates the encoded data stream 814. As shown, the encoded data stream is sequentially organized by carrier channel number, but the data contained within each carrier channel is as defined in the carrier channel allocation database 810.

While the above discussion focused on storing the data stream 807 on a data entry by data entry basis and reading on a data block by data block basis to produced the ordered data stream 808, the process could be reversed. For example, the data stream could be stored on a data block by data block basis and retrieved in a sequential order to produce the ordered data stream 808. Under this approach, the addressing technique that was used for the read AGU would now be used for the write AGU. Similarly, the addressing technique that was used for the write AGU would now be used for the read AGU.

Figure 36:
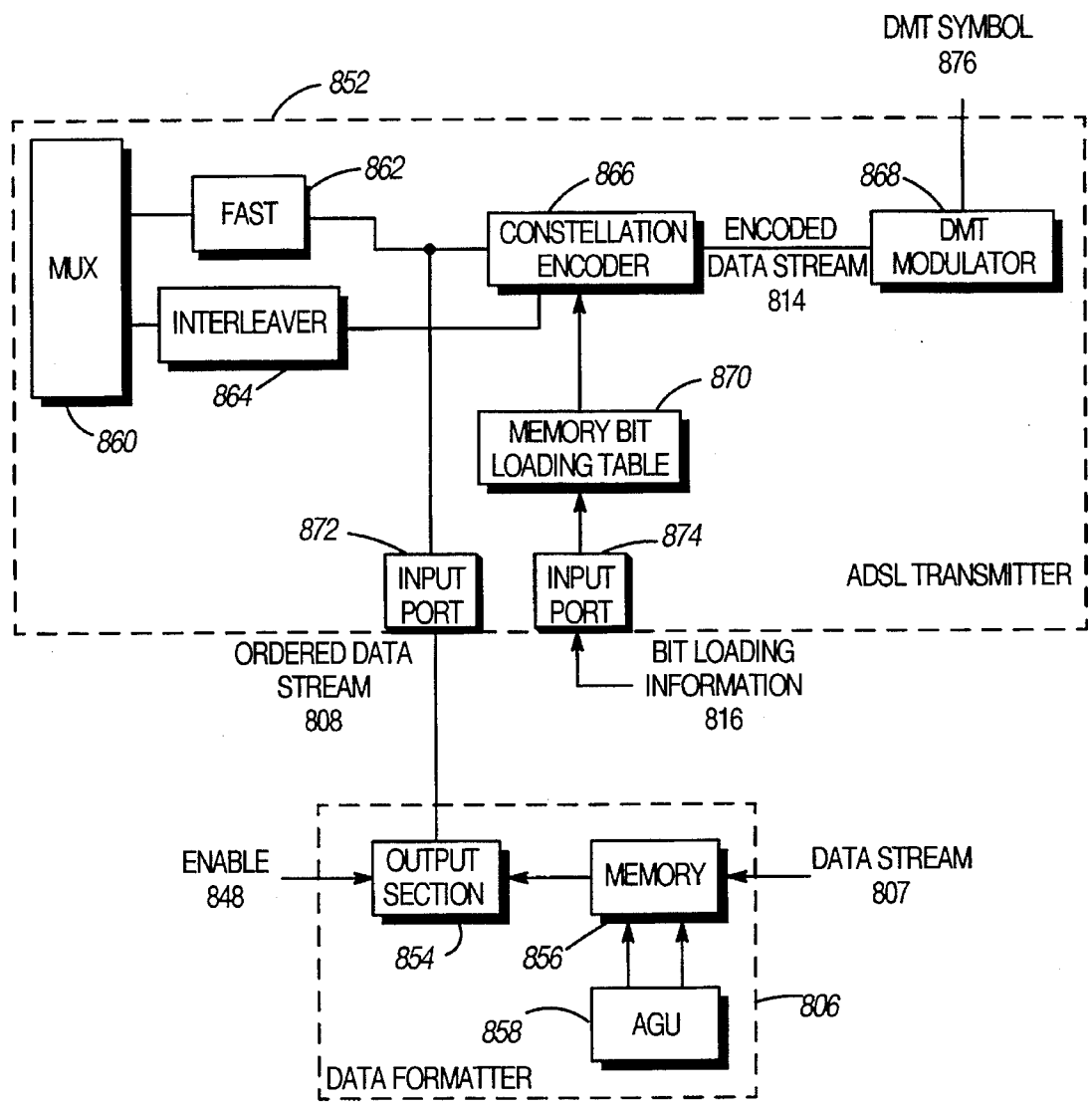
FIG. 36 illustrates a schematic block diagram of an ADSL transmitter coupled to a data formatter in accordance with the present invention.

FIG. 36 illustrates an alternate embodiment of a DMT transmitter of FIG. 10 or 11. As shown, the DMT transmitter includes an ADSL transmitter 852 and a data formatter 806. The data formatter includes an address generation unit 858, memory 856, and an output section 854. The address generation unit provides a first addressing scheme to the memory to store data and a second addressing scheme to read the data. As mentioned above, the first addressing scheme may be a circular buffer approach, while the second addressing scheme utilizes the address pointer information and the bit loading information such that the data is read out to produce the ordered data stream 808. The output section 854 provides the ordered data stream 808 to the ADSL transmitter 852 when an enable signal 848 is active.

The ADSL transmitter 852 includes an input MUX 860, a fast path 862, an interleave path 864, a constellation encoder 866, a DMT modulator 868, memory that stores a bit loading table 870, and two input ports 872 and 874. The first input port 872 allows the ADSL transmitter 852 to receive an ordered data stream 808 and directly provide the data to the constellation encoder 866. The constellation encoder 866 can then, based on the bit loading table 870, convert the ordered data stream into an encoded data stream 814 and subsequently covert it into a time domain DMT symbol 876 by the DMT modulator 868. The bit loading information in memory 870 may be provided from an external source via the second input port 874.

Up to this point, the data provided to the ADSL transmitter 852, or the DMT encoder 812, has been generated without consideration to error correction. As one skilled in the art will readily appreciate, the data-formatter 806 may include error correction techniques, to ensure a more reliable data transmission. For example, the data formatter 806 may include an interleave technique, an encryption technique, cycle redundancy checks (CRC), forward error correction, or any other type of error correction. Note that when error correction techniques are used by the data formatter 806, a data de-formatter must include the inverse error correction techniques.

As an alternative to incorporating error correction into the data formatter 806, the error correction within the ADSL transmitter 852 could be used. In this embodiment, the data formatter 806 would provide the ordered data stream to the inputs of the MUX 860. The data formatter 806 would include another layer in creating the ordered data stream 808 due to the four T1 inputs of the MUX 860.

Figure 37:
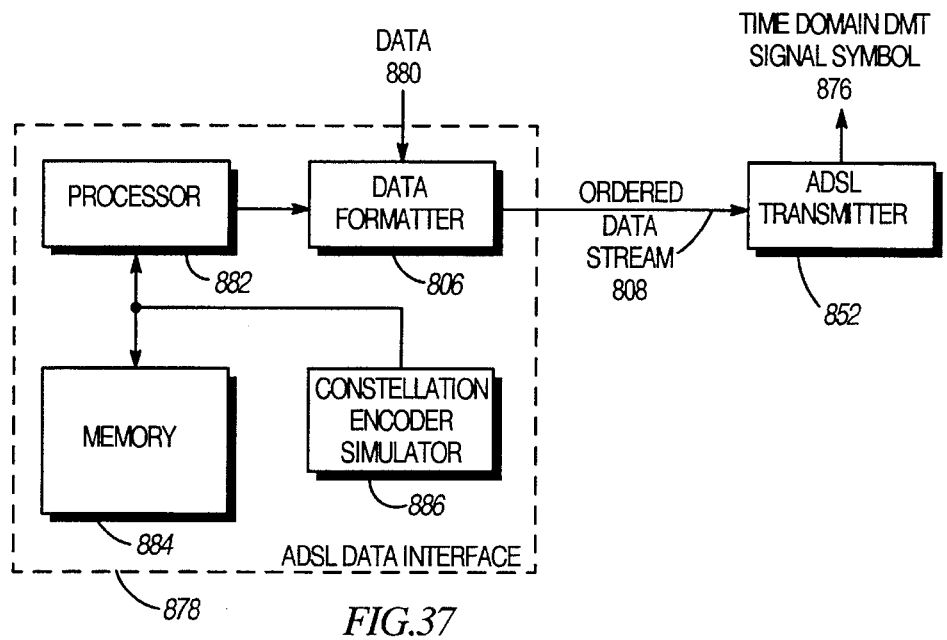
FIG. 37 illustrates a schematic block diagram of an ADSL data interface coupled to an ADSL transmitter in accordance with the present invention.

FIG. 37 illustrates an ADSL data interface 878 coupled to an ADSL transmitter 852. As shown, the ADSL data interface 878 includes a data formatter 806, a processor 882, memory 884, and a constellation encoder simulator 886. The memory 884 stores bit loading information, carrier channel allocation information, and bit loading requirements. The memory 884 may also store call type information, call bit requirements, call bit loading tables, and site bit loading tables. The processor 882 generates the carrier channel allocation information based on the bit loading requirements and the bit loading information and provides control signals to the data formatter 806. Such control signals are the address pointer information, the enable signal, and the read-write signal. Thus, the processor 882 is similar in function as the processor shown in FIGS. 10 and 11, which are included in the controller 110.

The constellation encoder simulator 886 simulates the manner in which the constellation encoder of the ADSL transmitter encodes the data. As previously mentioned, the constellation encoder will load the data in the carrier channel having the largest bit loading first followed by carrier channels with sequentially less bit loading capabilities. Thus, the constellation encoder provides information to the processor 882 indicating the order in which carrier channels will be loaded with data. From this information, an ordered bit loading table may be created such that the ordered data stream may subsequently be generated. Note that the constellation encoder simulator 886 may be incorporated as part of the processor 882, but for the purposes of this drawing, is shown separately.

Figure 38:
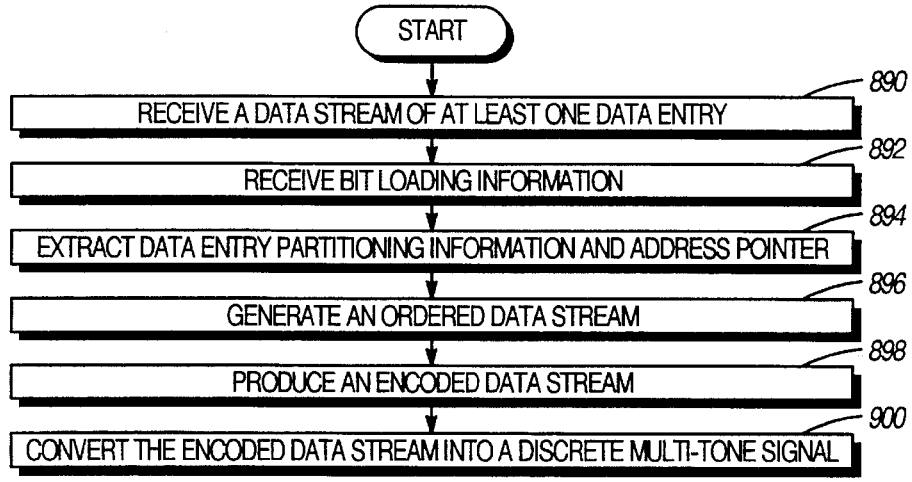
FIG. 38 illustrates a logic diagram that may be used to implement a DMT transmitter in accordance with the present invention.

FIG. 38 illustrates a logic diagram that may be used to emulate a DMT transmitter. At step 890, a transmit data stream is received wherein the data stream includes at least one data entry. Having received the data stream, the process proceeds to step 892 where bit loading information is received. Next, the process proceeds to step 894 where the process receives address pointer information for the data stream. From the address pointer information, the process extracts data entry partitioning information and an address pointer for each data entry portion.

At step 896, an ordered data stream is generated from the transmit data stream based on the address pointer information. This may be done by storing the transmit data stream in a sequential order and reading the stored data based on the data entry partitioning information. Alternatively, the transmit data stream may be stored based on the data entry partitioning information and read in a sequential order to produce the ordered data stream. Having done this, the process proceeds to step 898 wherein an encoded data stream is produced from the ordered data stream based on the bit loading information. Having done this, the process proceeds to step 900 where the encoded data stream is converted into a discreet multi-tone signal or symbol. Note that the process described above for FIG. 38 is done for each frame.

Figure 39:
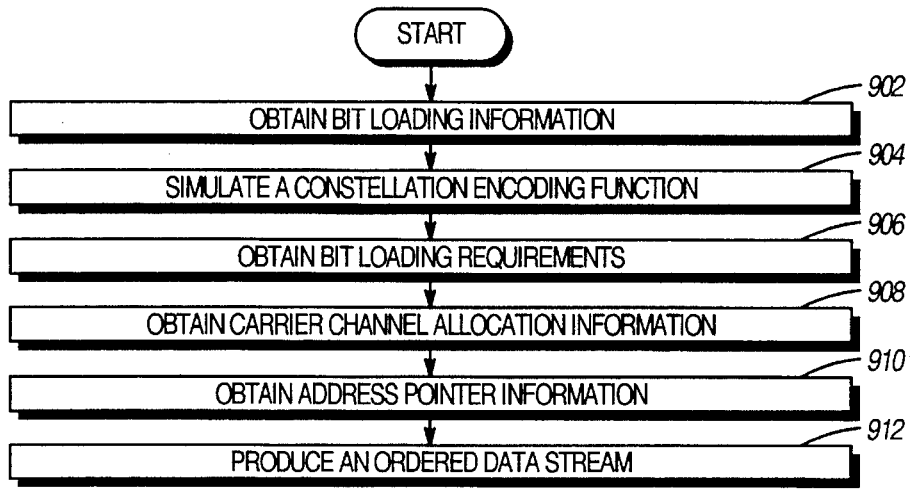
FIG. 39 illustrates an alternative logic diagram that may be used to implement a DMT transmitter in accordance with the present invention.

FIG. 39 illustrates an alternative logic diagram for implementing a DMT transmitter. At step 902, bit loading information is obtained as either a site bit loading table or a call bit loading table. A call bit loading table, as previously mentioned, is a compilation of a plurality of site bit loading tables. The manner in which this information is obtained may be done by receiving it from a controller, or acquiring it by querying the secondary sites for bit loading information and compiling the bit loading information. At step 904, a constellation encoding function of an ADSL transmitter is simulated by arranging carrier channels based on the bit loading information of each carrier channel and a constellation encoding function. This produces a simulated encoded order of carrier channels, which may be depicted as an ordered bit loading table. Having done this, the process proceeds to step 906 where bit loading requirements for the data are obtained by accessing a bit rate requirement data base. The manner in which this data is obtained may be done by receiving it from a controller within a primary site or secondary site, or may be generated by receiving data from users of the system or from a system manager.

The process proceeds at step 908 where carrier channel allocation information is obtained. The carrier channel allocation information may be received from a controller of a primary site or secondary site, or may be individually generated within an ADSL data interface unit. Next, the process proceeds to step 910 where address pointer information is obtained. Again, this information may be internally generated in an ADSL interface unit, or received from a controller within a primary site or second site. Once all the necessary information has been generated or received, the process proceeds to step 912 where an ordered data stream is generated based on the carrier channel allocation information.

Figure 40:
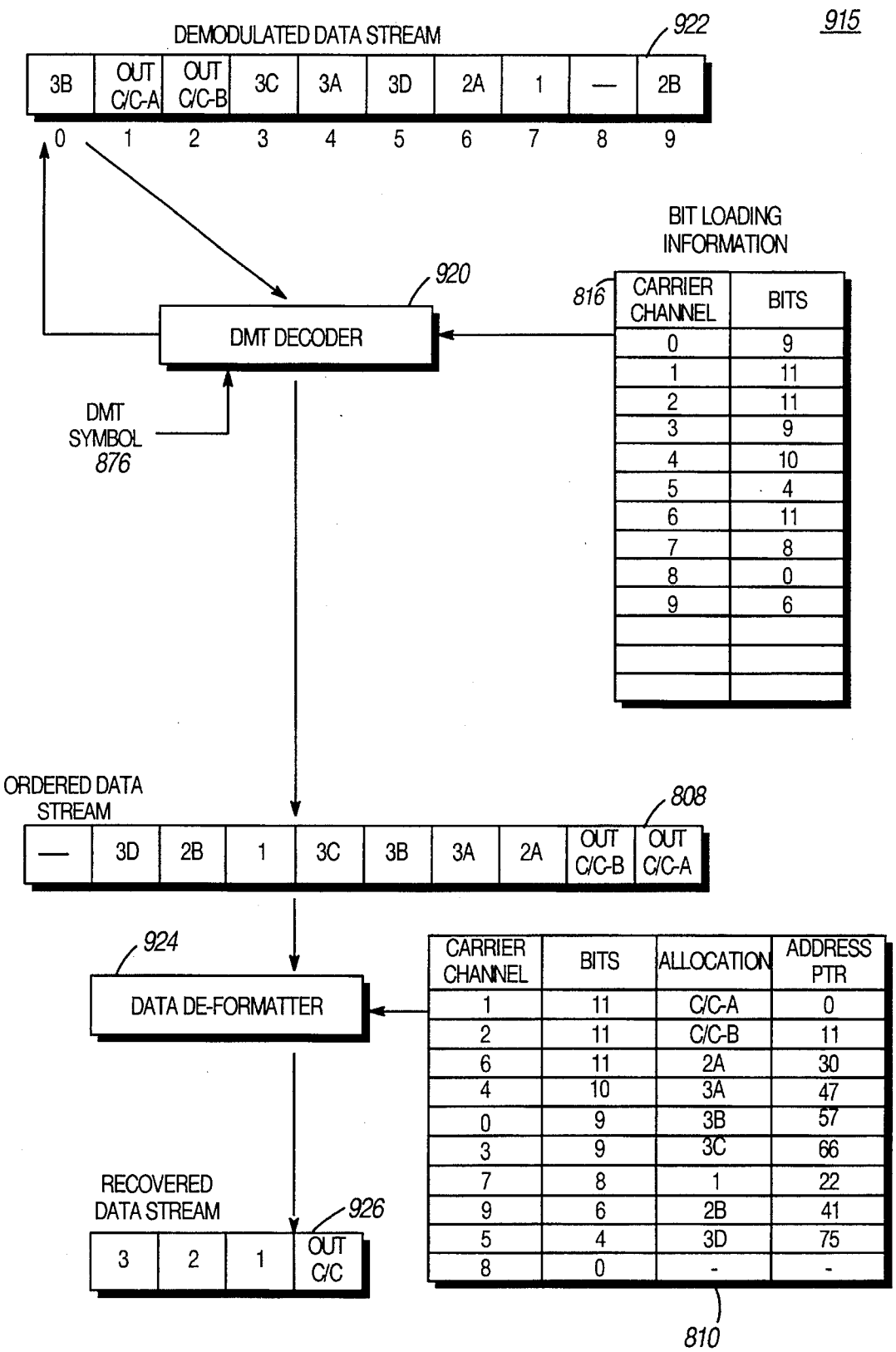
FIG. 40 illustrates a functional block diagram of a DMT receiver in accordance with the present invention.

FIG. 40 illustrates a functional block diagram of a DMT receiver 915. The DMT receiver 915 receives a time domain DMT symbol 876 via a DMT decoder 920. The DMT decoder 920 produces a demodulated data stream 922 and subsequently generates an ordered data stream 808 via bit loading information 816. The ordered data stream is then provided to a data deformatter 924. The data deformatter 924 converts the ordered data stream 808 into a recovered data stream 926 based on carrier channel allocation information 810.

The DMT decoder 920 produces the demodulated data stream 922 from the time domain DMT signal 876. This is a typical ADSL, or DMT, inverse function, thus will not be discussed in great detail. In addition, the DMT decoder 920, based on the bit loading information, subsequently converts the demodulated data stream 922 into the ordered data stream 808. In essence, the DMT decoder 920 is performing the inverse function of the DMT encoder 812 (of FIG. 34) to recapture the data supplied to the DMT encoder of the DMT transmitter (FIG. 34).

Similarly, the data deformatter 924 is performing an inverse function of the data formatter 806 of the DMT transmitter (FIG. 34). Thus, by using the carrier channel allocation information 810 on the ordered data stream 808, the recovered data stream 926 is obtained. Note that the recovered data stream 926 is identical to the data stream 807 inputted into the data formatter 806 of the DMT transmitter (FIG. 34).

Figure 41:
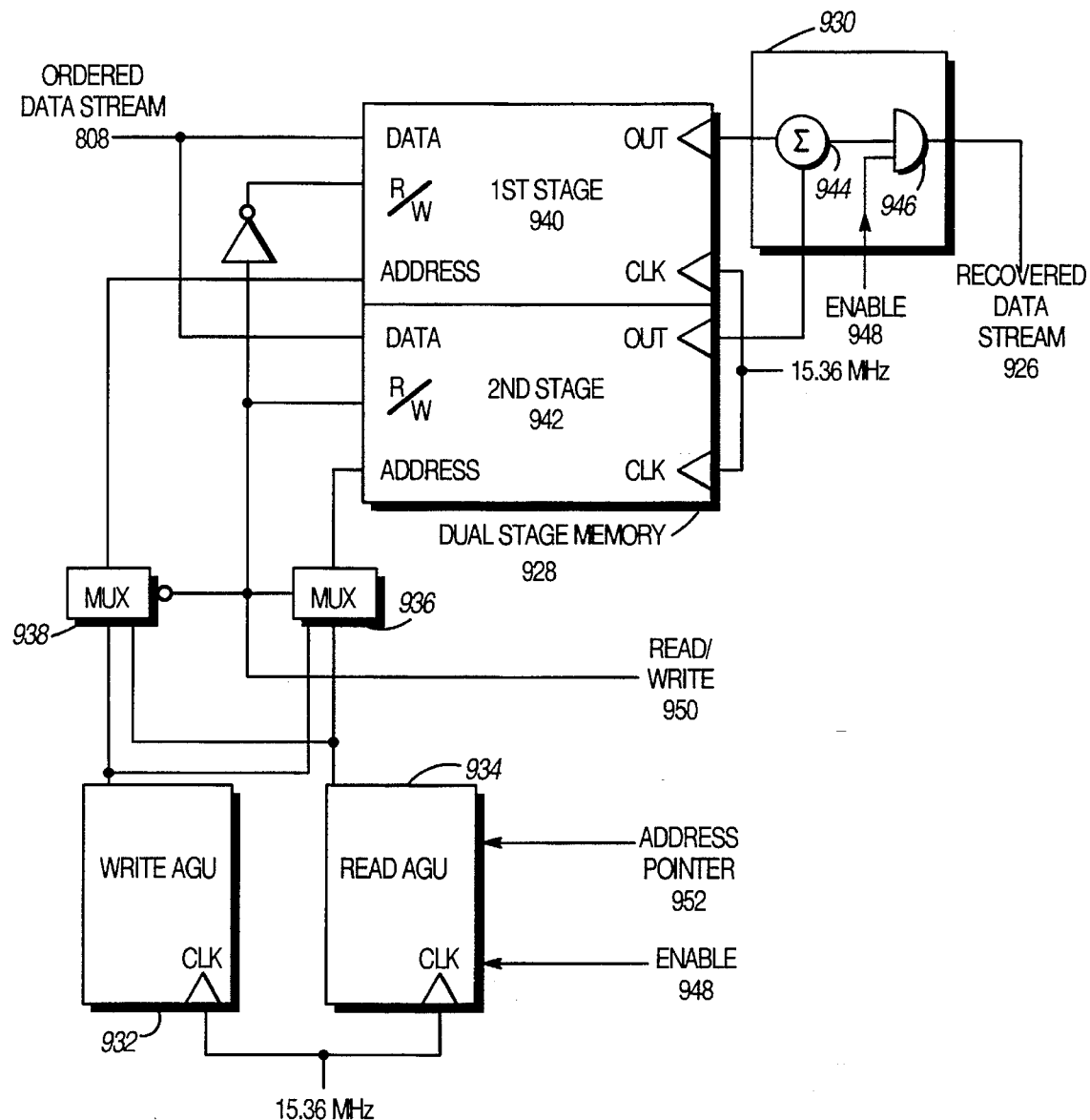
FIG. 41 illustrates a schematic block diagram of a data de-formatter of the DMT receiver in accordance with the present invention.

FIG. 41 illustrates a schematic block diagram of the data deformatter 924. The data deformatter 924 includes a dual stage memory 928, an output section 930, a write address generation unit 932, a read address generation unit 934, and two mutliplexers, 936 938. The dual stage memory 928 includes a first memory stage 940 and a second memory stage 942. The output section 930 includes an adder 944 and an AND gate 946.

In operation, the ordered data stream 808 is written into either the first stage 940 or the second stage 942 during a frame cycle. On the next frame cycle, the ordered data stream 808 is written into the other stage and read out of the previous stage. This is accomplished via the read-write signal 950 which may be supplied by a controller of a primary site or secondary site. During a first frame cycle, the read-write signal is a logic "1" such that the first stage 940 is in a write mode and the second stage 942 is in the read mode. The read-write signal 950 is also applied to MUX 936 and MUX 938 which controls the MUXes to provide the appropriate addresses to the first and second stages 940,942. For example, when the read-write signal is logic "1", MUX 938 provides the write addresses to the first stage and MUX 936 provides the read addresses to the second stage. On the next frame cycle, the read-write signal is a logic "0" such that the first and second stages switch modes, and MUX 938 and MUX 936 provide the appropriate addresses.

When in a write mode, the write AGU 932 provides the addressing information to the particular stage of the dual stage memory 928. During the read stage, the read AGU 934 provides the address information to the appropriate stage of the dual stage memory 928. Note that the dual stage memory 928 may be a manchester encoder. The write address generation unit 932 may employ a circular buffer addressing scheme such that the data of the ordered data stream is stored in a serial fashion. The read AGU 934 may employ a unique addressing scheme that utilizes the address pointer information 952 to read out data blocks such that the recovered data stream 926 may be reconstructed. Note that adder 944 may be a summing node, or just a direct coupling into the AND gate.

Figure 42:
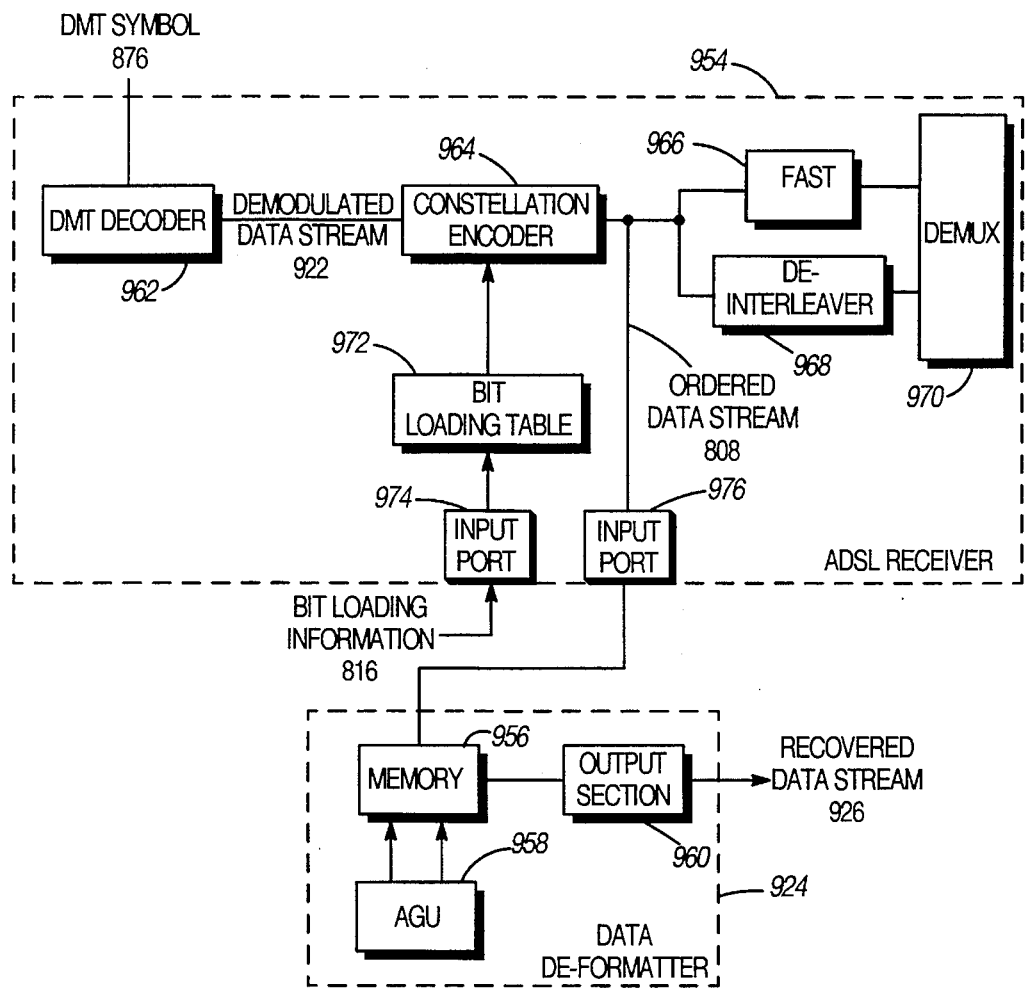
FIG. 42 illustrates a schematic block diagram of an ADSL receiver coupled to a data de-formatter in accordance with the present invention.

FIG. 42 illustrates a schematic block diagram of an alternate DMT receiver. As shown, the DMT receiver includes an ADSL receiver 954 and a data deformatter 924. The ADSL receiver 954 includes a DMT decoder 962, a constellation decoder 964, a fast path 966, a de-interleave path 968, and a DEMUX 970. In addition, the ADSL receiver 954 includes a first input port 974, which allows bit loading information 816 to be directly written into a bit loading table 972. Further, the ADSL receiver includes an output port 976, which allows the output of the constellation decoder 964 to be directly outputted to the data deformatter 924.

In general, the ADSL receiver 954 receives a time domain DMT symbol 876 via the DMT decoder 962. The DMT decoder 962 converts the DMT symbol 876 into a demodulated data stream 922. The constellation decoder 964 converts this data stream 922 into an ordered data stream 808. The ordered data stream is outputted via the output port 976 to the data deformatter 924. The data deformatter, which includes memory 956, an AGU 958, and an output section

960, produces the recovered data stream 926. This may be accomplished by storing the ordered data stream under a first addressing scheme during a first frame cycle, and then reading the stored data out under a second addressing scheme to produce the recovered data stream 926. Note that the data deformatter 924 is performing the inverse function of the data formatter 806 (of FIGS. 34–39) to recover the data that was supplied to the data formatter.

Figure 43:
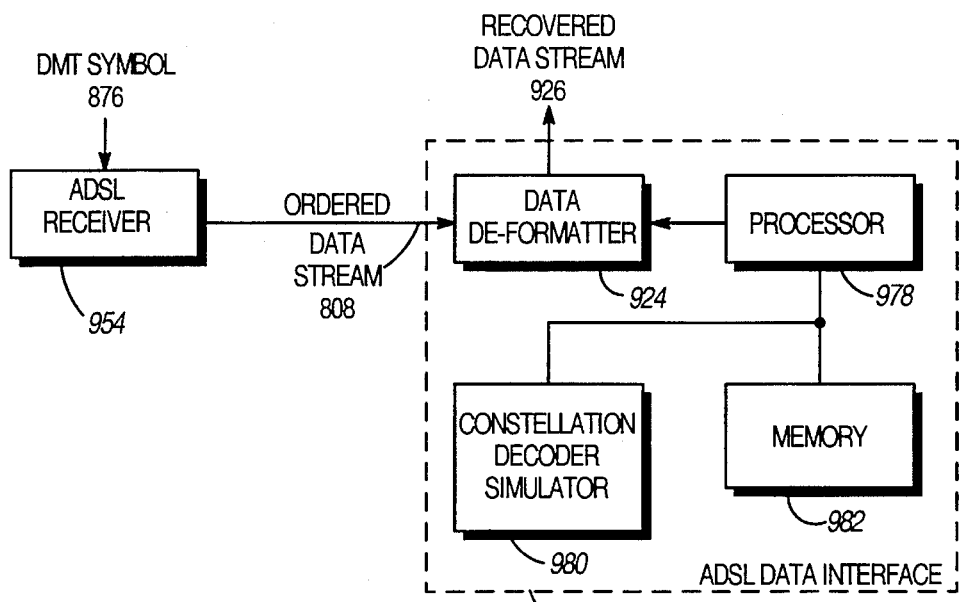
FIG. 43 illustrates a schematic block diagram of an ADSL data interface coupled to an ADSL receiver in accordance with the present invention.

FIG. 43 illustrates an ADSL receiver 954 coupled to an ADSL data interface 981. The ADSL data interface 981 includes the data deformatter 924, a processor 978, memory 982, and a constellation decoder simulator 980. The processor 978 provides the control signals to the data deformatter such that the data deformatter 924 can convert the ordered data stream 808 into the recovered data stream 926. In particular, the processor 978 generates the address pointer information, the enable signal, and the rewrite signal. Recall that the read-write signal is toggled for every frame cycle. Such that for a first frame cycle, one stage of memory within the data deformatter is writing information while the second stage is reading and in the next frame cycle the first stage is reading data while the second stage is writing data.

The constellation decoder simulator 980 simulates the manner in which the constellation decoder and the ADSL receiver extract data from the DMT symbol 876 that it receives. As mentioned, data will be extracted in the opposite manner in which it was encoded. Thus, the first data out will be the data contained within the carrier channels having the largest bit loading. Thus, the constellation decoder simulator 980 simulates that process such that appropriate information can be provided to the data deformatter to accurately recover the data stream. Note that the constellation decoder simulator 980 may be incorporated in the processor 978. In essence, the processor 978 performs the functions to generate the carrier channel allocation data base, the address pointer information, call type to bit loading requirement information, and bit loading information.

Figure 44:
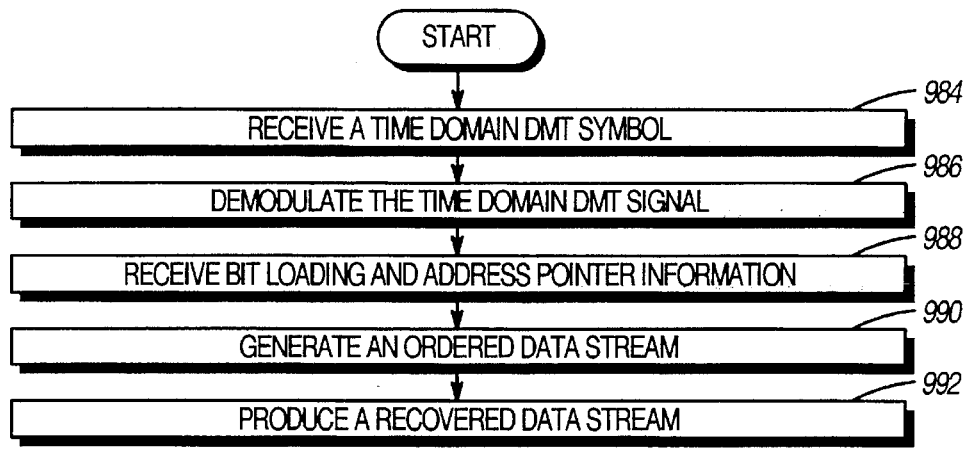
FIG. 44 illustrates a logic diagram that may be used to implement a DMT receiver in accordance with the present invention.

FIG. 44 illustrates a logic diagram that may be used to implement a DMT receiver. At step 984, a time domain DMT symbol is received. At step 986, the time domain DMT symbol is demodulated to produce a demodulated data stream. At step 988, bit loading information and address pointer information is received. This information may be received from a controller of a primary site or a secondary site, or maybe internally generated within an ADSL interface unit.

Having obtained the appropriate information, the process proceeds to step 990 where an ordered data stream is generated from the demodulated data stream. As previously mentioned, this is performed by a constellation decoder with an ADSL receiver. Having generated the demodulated data stream, the process proceeds to step 992 where a recovered data stream is produced from the ordered data stream based on the bit loading information and address pointer information. This may be accomplished by writing the ordered data stream into memory in a serial fashion and reading it out in a fragmented fashion based on the bit loading information and address pointer information.

Figure 45:
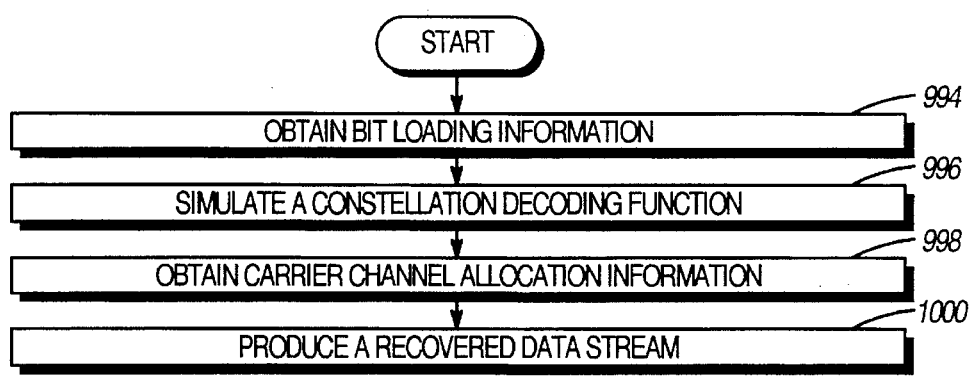
FIG. 45 illustrates an alternative logic diagram that may be used to implement a DMT receiver in accordance with the present invention.

FIG. 45 illustrates an alternative logic diagram that may be used to simulate a DMT receiver. At step 994, bit loading information is obtained. Bit loading information may be obtained by receiving it from a controller of a primary site or a secondary site. Alternatively, the bit loading information may be obtained by querying a plurality of secondary sites to obtain site bit loading information and generating a call bit loading table from the appropriate site bit loading tables.

At step 996, a constellation decoder function of an ADSL receiver is simulated to produce a simulated decoded order of carrier channels. This simulated function may be performed based on the manner in which data is read from the carrier channels. Typically, this will be the inverse function of the ADSL constellation encoder such that the carrier channels having the largest bit loading will be encoded first and subsequently read first.

Having produced the simulated decoded order of carrier channels, which may be contained in an ordered bit loading table, carrier channel allocation information is obtained, which is depicted at step 998. The carrier channel allocation information may be received from a controller of a primary site or secondary site, or may be generated by a processor of an ADSL data interface unit.

Having obtained the appropriate information, the process proceeds to step 1000 where a recovered data stream is produced from the ordered data stream based on the carrier channel allocation information.

Figure 46:
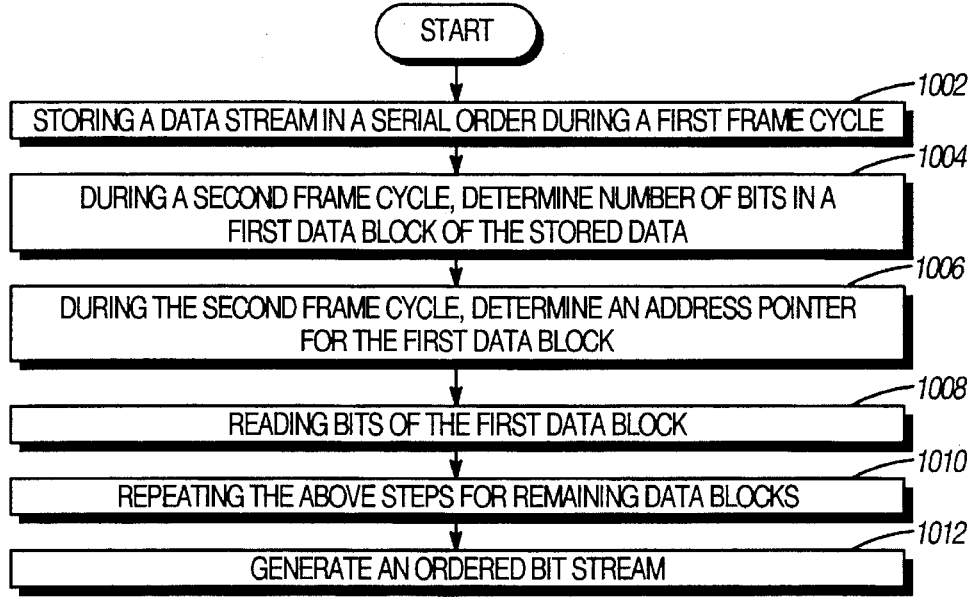
FIG. 46 illustrates a logic diagram that may be used to generate addresses for the data formatter and/or the data de-formatter in accordance with the present invention.

FIG. 46 illustrates a logic diagram that may be used to generate an address pointer for either the DMT receiver or the DMT transmitter. At step 1002, a data stream is stored in a serial order during a first frame cycle. Next, at step 1004, during a second frame cycle, the process determines a number of bits for a first data block of the stored data. For example, if the data stored contains three data entries, wherein each of the data entries include three data blocks, step 1004 is directed towards the first data block of the first data entry. Next, the process proceeds to step 1006 wherein during the second frame cycle, the process determines an address pointer for the first data block. The address pointer for the first data block will typically be the first, or initial, address within the memory storing the data.

Next, the process proceeds to step 1008 and reads the bits of the first data block during a number of clock cycles, wherein the number of clock cycles corresponds to the number of bits within the first block. For example, assume that the first data block contains 11 bits, thus, the first 11 clock cycles of the second frame cycle will be dedicated to reading the 11 bits of data from the first data block.

At step 1010, the above steps are repeated for the remaining data blocks of each of the data entries. Thus, assume that the second data block of the first data entry also contains 11 bits and has an address pointer of 11. Thus, during the twelfth through twenty-second clock cycle of the second frame cycle, the data will be read from the second data block. Having read all of the data in this manner, the ordered bit stream is generated as shown in step 1012.

Figure 47:
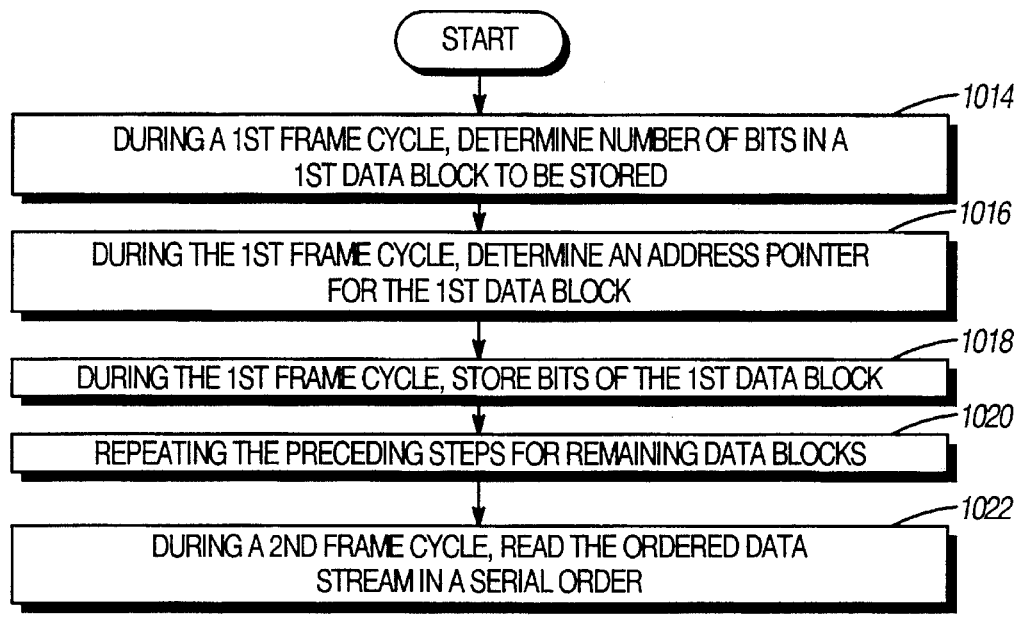
FIG. 47 illustrates an alternative logic diagram that may be used to generate addresses for the data formatter and/or the data de-formatter in accordance with the present invention.

FIG. 47 illustrates a logic diagram that may be used to generate address pointer information as utilized by both the DMT receiver and the DMT transmitter. At step 1014, a number of bits contained within a first data block of a data entry, which is to be stored, is determined during a first frame cycle. For example, if the data to be stored is a data stream which has three data entries wherein the first data entry has three data blocks, step 1014 is determining the number of bits in the first data block of the first data entry.

Having done this, the process proceeds to step 1016 where an address pointer is determined for the first data block during the first frame cycle. Note that the first frame cycle is the time that corresponds to when one frame of information is being transmitted. In an ADSL system, this equates to 250 microseconds. The address pointer for the first data block typically will be the first address within the receiver or transmitter memory section.

The process proceeds to step 1018 where the process stores the bits of the first data block during a number of clock cycles, wherein the number of clock cycles equate to the number of bits of the first data block. This occurs during the first framing cycle. For example, assume that the first data block contains 11 bits. Thus, the first 11 clock cycles of the first frame cycle will be dedicated to storing the data of the first data block.

In step 1020, the preceding steps, 1014–1018, are repeated for the remaining data blocks of the data to be stored. Thus, the second data block of the first data entry will have an address pointer determined for it, then the second data block is stored in memory during the number of clock cycles equal to the number of bits in the second data entry. Once all the data is stored, the process proceeds to step 1022 wherein, during a second frame cycle, the data is read out in a serial order to produce the recapture data stream. Thus, this particular logic diagram stores the data in the recovered data stream manner based on the address pointer information and bit loading information and then reads it out in a serial, or a circular buffer, manner.

Figure 48:
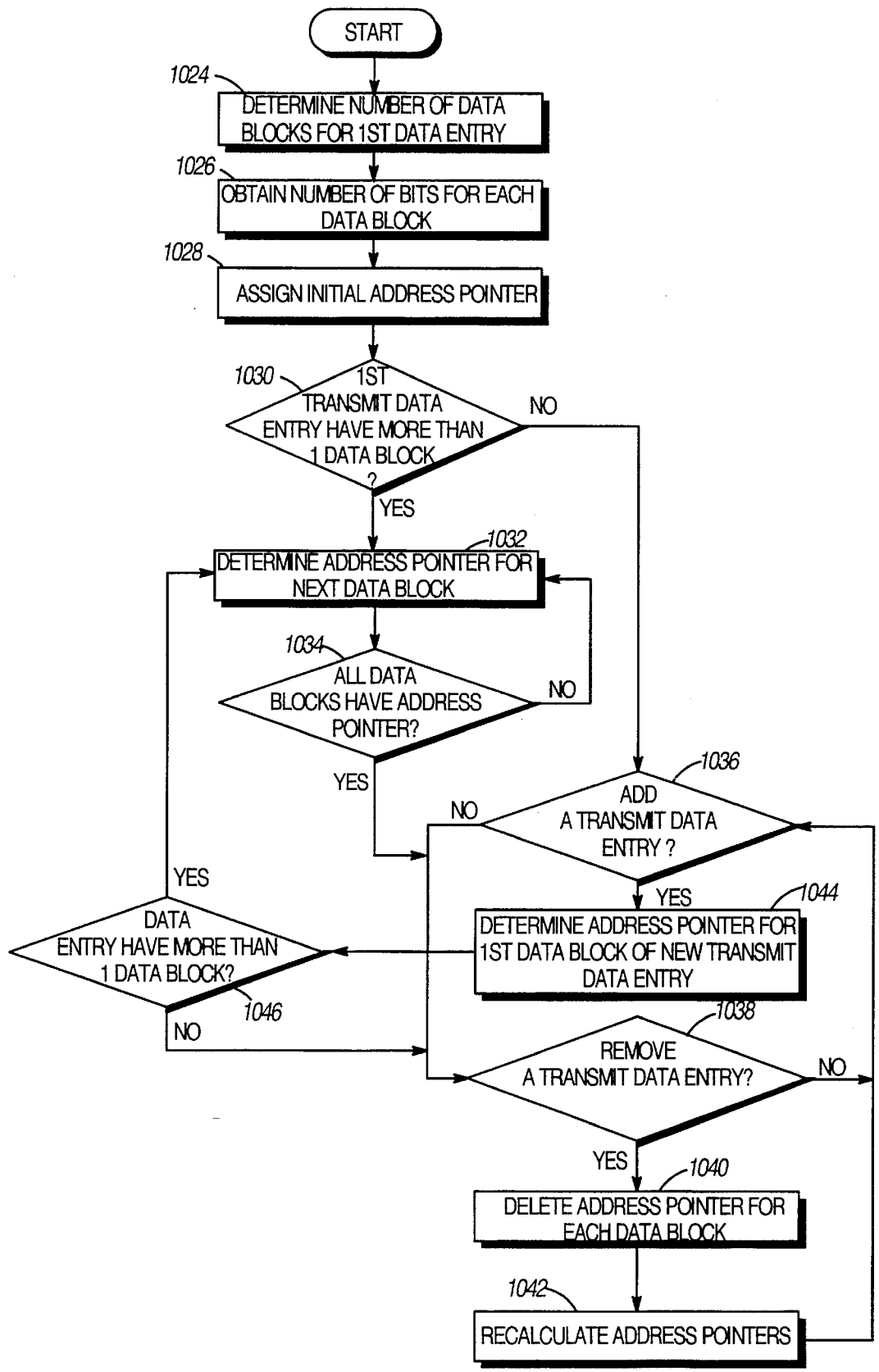
FIG. 48 illustrates a logic diagram that may be used to generate address pointer information for the data formatter and/or the data de-formatter in accordance with the present invention.

FIG. 48 illustrates an alternative logic diagram for generating address pointer information for use by a DMT receiver or a DMT transmitter. At step 1024, a number of data blocks for a first transmit data entry is determined from the carrier channel allocation data base. Next, the process moves to step 1026, wherein the number of bits for each data block for the first transmit data entry is obtained. Note that a transmit data entry may be a call, such as the transmission of video data, audio data, a data file, a one-way RF communication, or a two-way RF communication.

Having obtained this information, the process proceeds to step 1028, wherein for a first data block of the first transmit data entry, an address pointer is assigned to be the initial address of the write section of the dual stage memory, or Manchester encoder. If the dual stage memory is used exclusively for the data formatter or data deformatter, the initial address of the write section will typically be the first address of the write section. Note that during a first frame cycle, the first stage of the dual stage memory is the write section and during a second frame cycle, the second stage is the write section.

Having assigned an address pointer to the first data block of the first transmit data entry, the process proceeds to step 1030, where a determination is made as to whether the first transmit data entry has more than one data block. If yes, the process proceeds to step 1032, where an address pointer for the next data block of the first data entry is determined by adding the number of bits for the previous data block to the address pointer of the previous data block. For example, if the first data block had an address pointer of zero and contained 11 bits, the address pointer for the second data block would be 11 (number of bits of the preceding data block) plus zero (address pointer of the preceding data block) which equals an address pointer for the second data block of 11.

Having determined the next address pointer, the process proceeds to step 1034 where a determination is made as to whether all of the data blocks of the transmit data entry has been assigned an address pointer. If not, the process reverts back to 1032 wherein the address pointer for the next data block is generated by adding the number of bits for the previous data block to the address pointer of the previous data block. This process continues until all of the data blocks for the transmit data entry have an address pointer. Once this occurs, the process proceeds to step 1038.

If the inquiry into whether the first transmit data entry has more than one data block produces a negative response, the process proceeds to step 1036. At step 1036, a decision is made as to whether another transmit data entry exists or whether one has recently been added. If either of these inquiries are answered positively, the process proceeds to step 1044. At step 1044, an address pointer for a first data block of the new transmit data entry is calculated by adding the address pointer of the last data block to the number of bits of the last data block of the immediately proceeding transmit data entry. Having done this, the process proceeds to step 1046 where a determination is made as to whether the new transmit data entry has more than one data block. If the inquiry produces a negative response, the process continues at step 1038. If, however, the inquiry produces a positive response, the process reverts to step 1032 wherein the remaining data blocks of the transmit data entry are assigned address pointers.

When the inquiry to step 1036 is negative, the process proceeds to step 1038 where the process determines whether a transmit data entry has been removed. If not, the process waits for either a new transmit data entry to be added or one to be removed.

Upon detecting the removal of a transmit data entry, the process proceeds to step 1040 where the address pointer for each data block of the deleted transmit entry is deleted from the carrier channel allocation database. When this is completed, the process proceeds to step 1042 wherein, for each transmit data entry subsequent to the deleted transmit data entry, the address pointers for the data blocks of the subsequent transmit data entries are recalculated.

The address pointers for data blocks of transmit data entries that occur subsequent in the data stream to the deleted transmit data entry need to be recalculated because the data blocks will not be stored in a similar place as they were prior to the deletion. The recalculation process will proceed identical to step 1030 as if the removed or deleted transmit data entry had never occurred for each of the subsequent transmit data entries.

Figure 49:
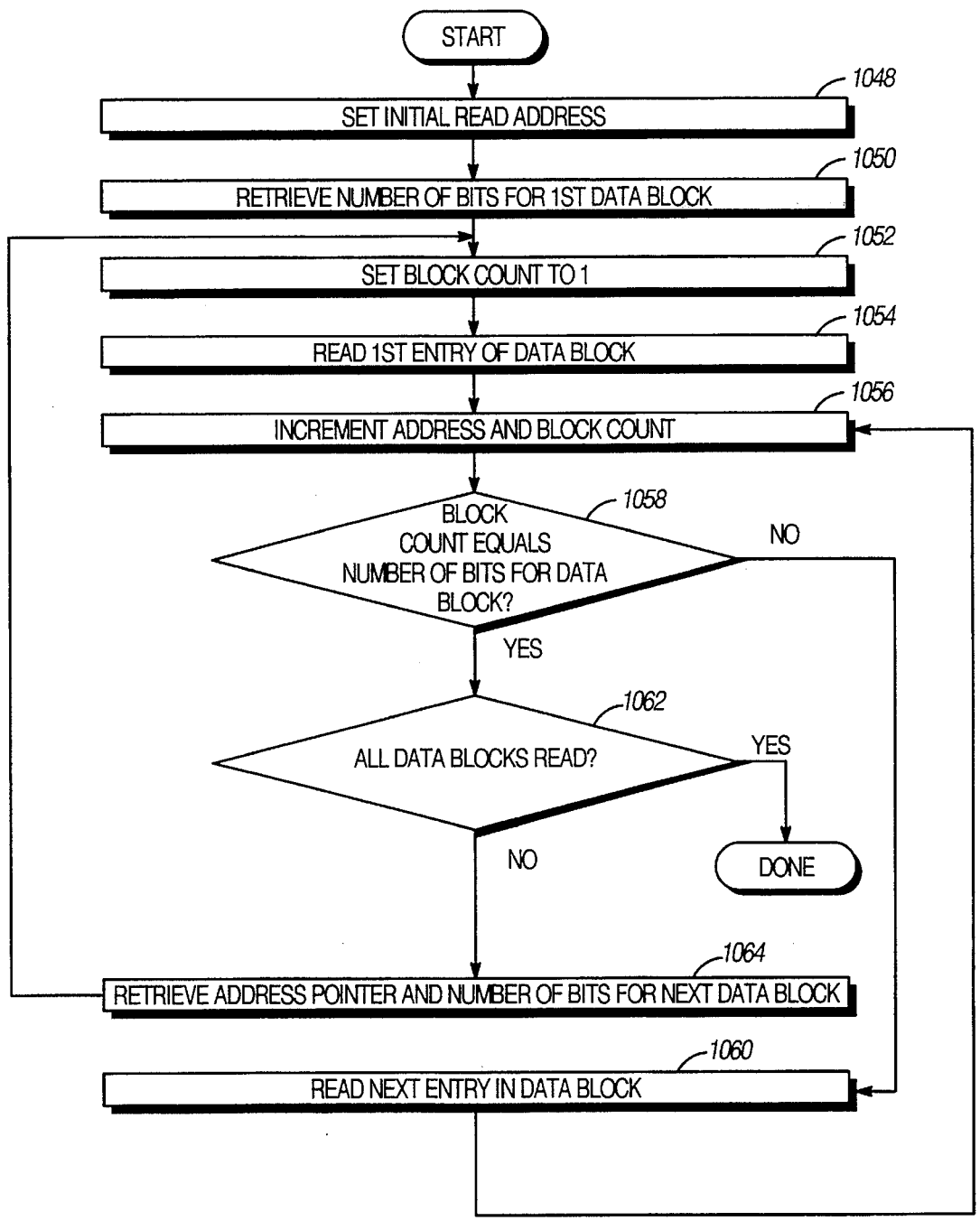
FIG. 49 illustrates another alternative logic diagram that may be used to generate addresses for the data formatter and/or the data de-formatter in accordance with the present invention.

FIG. 49 illustrates a logic diagram that may be used to read the data from the memory in the DMT transmitter or used to store the data in a DMT receiver. At step 1048, the process begins by setting an initial read address equal to the initial address in the Manchester encoder, or dual stage memory, upon receipt of an enable signal. Having done this, the process proceeds to step 1050 wherein a number of bits for a first data block is retrieved from the carrier channel allocation table or database. Next, the process proceeds to step 1052 wherein a block count is set to one.

At 1054, at a clock cycle, a first entry of the first data block is read. In other words, the first bit, or first byte, of the first data block is read. This occurs on a clock cycle by clock cycle basis. Having read the data, the process proceeds to step 1056 wherein the address and the block count are incremented by one.

At step 1058, a determination is made as to whether the newly incremented block count equals the number of bits for the data block being read. If not, the process proceeds to step 1060 wherein, at a subsequent clock cycle, the next entry, or bit, in the data block is read. Having done this, the address and block count are incremented by one and a subsequent determination is made at step 1058.

When the block count equals the number of bits of the data block, the process proceeds to step 1062 where a determination is made as to whether all of the data blocks have been read. If all the data blocks have been read, the process is complete for this frame cycle. If not, the process proceeds to step 1064 by retrieving the address pointer and number of bits for the next data block. Having retrieved this information, the process reverts to step 1052 and follows the logic flow as previously described.

Figure 50:
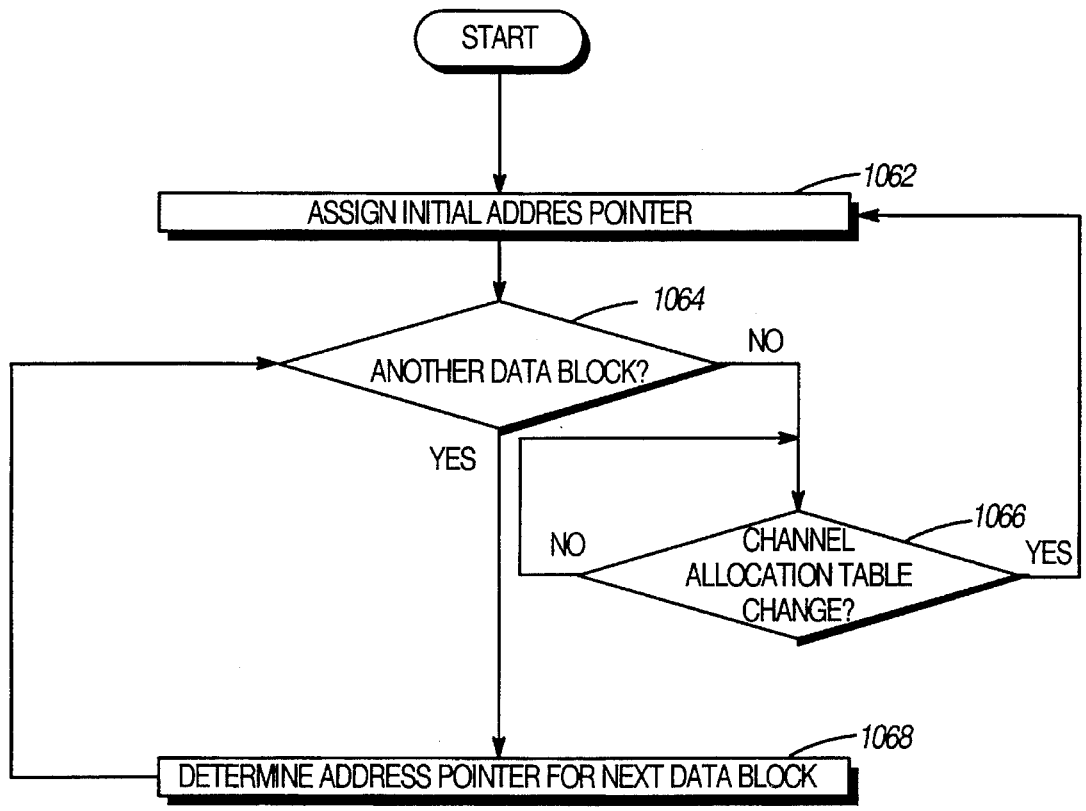
FIG. 50 illustrates an alternative logic diagram that may be used to generate address pointer information for the data formatter and/or the data de-formatter in accordance with the present invention.

FIG. 50 illustrates a logic diagram which may be utilized by the DMT receiver to generate an address pointer. At step 1062, for a first data block allocated to the first carrier channel allocation entry of the carrier channel allocation table, or database, an address pointer is assigned to be the initial address of the write section of the Manchester encoder, or dual stage memory. As mentioned with the previous figure, the write section is the first stage of the dual stage memory during the first frame cycle and the second stage during the second frame cycle. Next, the process proceeds to step 1064 where a determination is made as to whether there is another carrier channel allocation entry in the carrier channel allocation table. If not, the process proceeds to step 1066 where a determination is made as to whether a change occurs in the carrier channel allocation table. If not, the process waits at step 1066 for a change in the carrier channel allocation table to occur.

Once the carrier channel allocation table has changed, the process reverts back to step 1062 wherein all of the carrier channel allocation entries receive a new address pointer, starting with the first carrier channel allocation entry, which corresponds to the first data block, in the carrier channel allocation table.

If the answer to step 1064 is yes, the process proceeds to step 1068 where an address pointer is determined for the next data block, or next carrier channel allocation entry, by adding the number of bits for the previous data block to the address pointer of the previous data block. Thus, if the previous data block had 10 bits and its address pointer of the previous data block was 20, the address pointer for the new data block, or carrier channel allocation entry, would be 30. Having made this calculation, the process reverts back to 1064.

Figure 51:
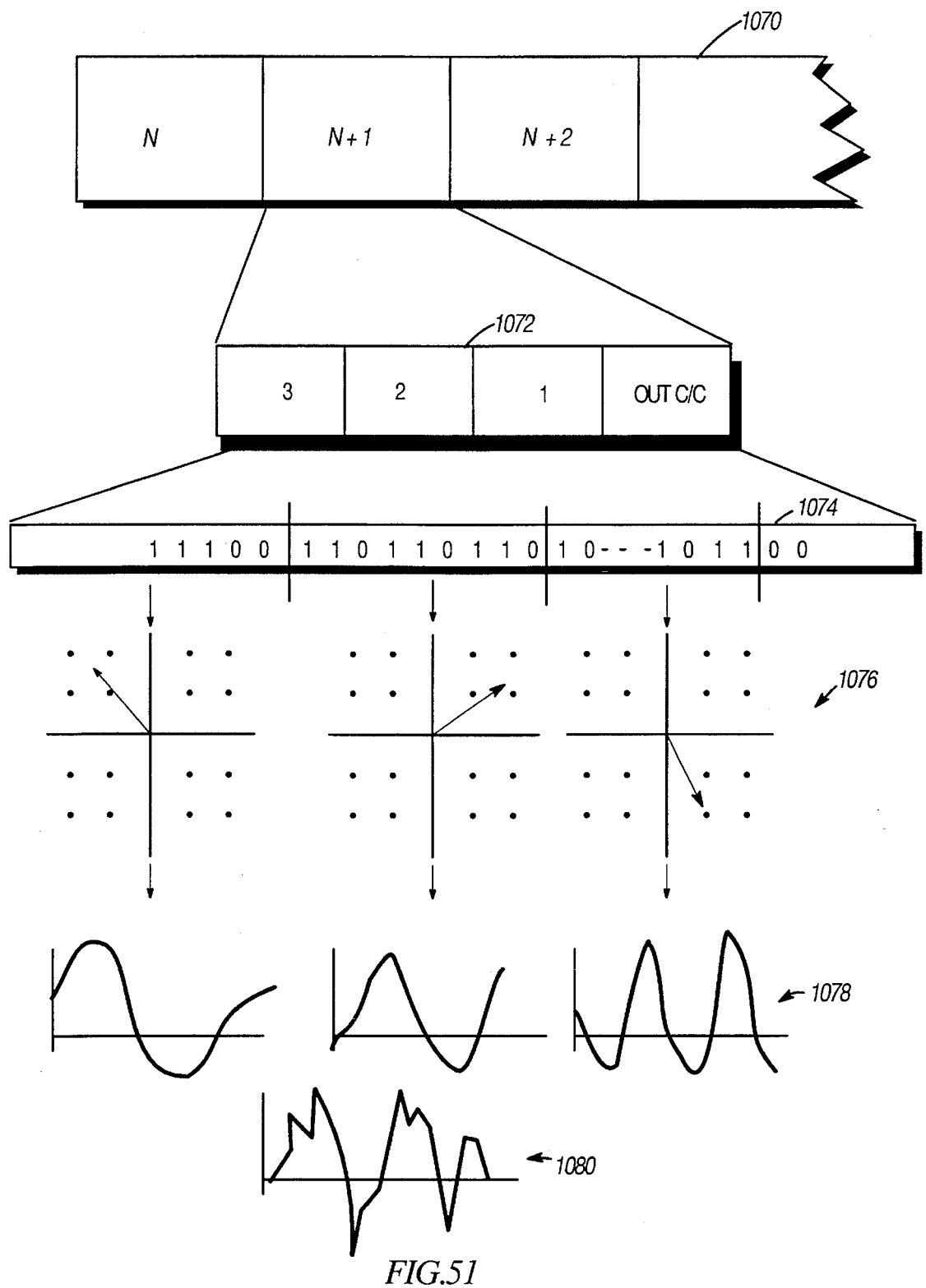
FIG. 51 illustrates an example of a DMT symbol formation in accordance with the present invention.

FIGS. 51–61 illustrate examples of the operation of the present invention. FIG. 51 illustrates a data stream 1070, which includes a plurality of frames. Frame (n+1) 1072 is shown in greater detail to include a plurality of data entries. As shown, the first data entry contains outbound control channel information, a second data entry includes a first data call, a third data entry includes a second data call, and a fourth data entry includes a third data call. The actual information contained within the frame 1072 is a data stream as depicted in 1074.

As previously described, when a data entry cannot be supported by a single carrier channel, the data entry is broken down into data blocks, wherein a data block is allocated to a particular carrier channel. As shown, the partitioning of the data entry into data blocks equates data blocks of the third data call to particular carrier channels. As is known in the ADSL art, a carrier channel can be represented as a vector 1076, wherein the magnitude and phase of the vector is based on the data which the carrier channel is carrying and the bit loading of the carrier channel. The bit loading of a carrier channel indicates the number of constellation points, i.e., the number of magnitude and phase combinations for the vector. For example, if the bit loading of a carrier channel is 2, the number of constellation points is 4 ($2^2$) which can be equated to a binary numbering system. Thus one constellation point equates to the binary number 00, a second point to binary number 01, etc. From this, one skilled in the art will readily appreciate how the bit loading of a carrier channel equates to the number of bits the carrier channel can support, or carry.

FIG. 51 further illustrates three carrier channels shown as a vector 1076, each representing a particular data block of the third data call. Thus, the data block on the far left of the data entry equates to the carrier channel vector on the far left. The second data block equates to the second carrier channel vector and the third data block equates to the third carrier channel vector. Each of these carrier channel vectors may be used to produce a particular quadrature amplitude modulated (QAM) signal 1078 at a given frequency. As previously mentioned, the ADSL system incorporates 256 carrier channels, beginning at 25 kilohertz up to 1.1 MHz at increments of 4 kilohertz.

The final illustration of FIG. 51 is a time domain DMT symbol 1080. As mentioned, the ADSL transmitter includes a DMT modulator. The DMT modulator takes the digital representations of the constellation encoding 1076, or the vector representations of the carrier channels, and produces the time domain DMT symbol 1080. In essence, the time domain DMT signal is the summation of the carrier channels 1078 to produce the resultant DMT symbol. Note that the DMT symbol 1080 is depicted for one frame. Thus, for each frame, a new DMT symbol is generated in a like fashion.

Figure 52:
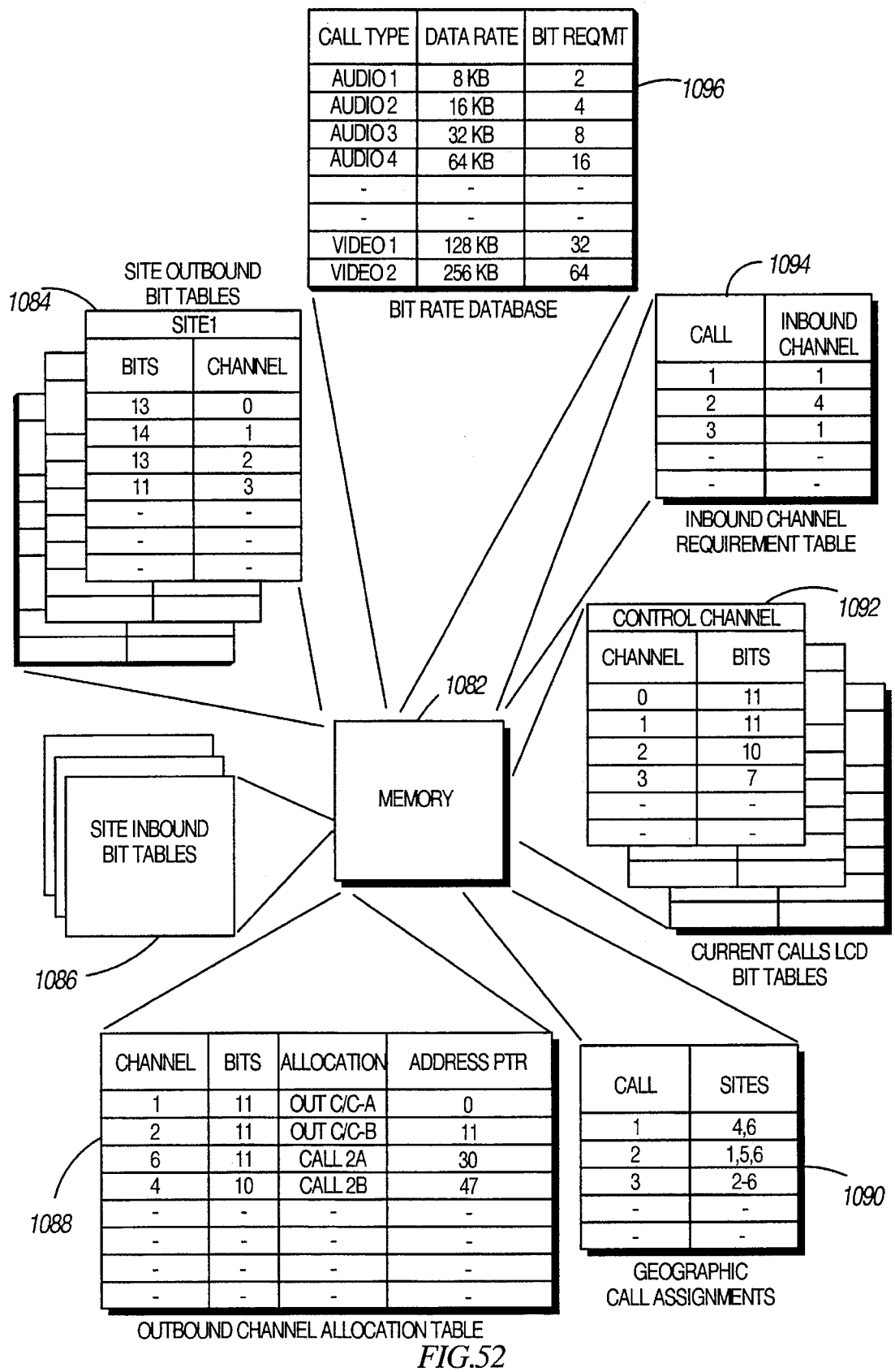
FIG. 52 illustrates database information stored in memory in accordance with the present invention.

FIG. 52 illustrates memory 1082, which may be incorporated in the controller's memory of the primary site, in the controller's memory of the secondary site, or in an ADSL data interface unit. The memory, as shown, stores a plurality of site outbound bit loading tables 1084, wherein each of the site outbound bit loading tables contains a channel field and a corresponding bit loading field. Thus, as shown, carrier channel zero has a bit loading of 13 bits, carrier channel 1 has a bit loading of 14 bits, etc. The memory further stores a plurality of site inbound bit loading tables 1086. The site inbound bit loading tables are based on an inbound transmission path wherein the site outbound bit loading tables 1084 are based on an outbound transmission path.

The memory 1082 further stores a bit rate data base 1096. The bit rate data base includes a call type field, a data rate field, and a bit requirement field. For example, the first entry is an audio type 1, which has a bit rate requirement of 8 Kbps. For the ADSL system, this translates to a 2 bit per frame requirement. Recall that the frame rate of the ADSL system is 4 KHz, thus the bits per frame requirement is the result of the bit rate requirement divided by the 4 KHz rate.

The memory 1082 further stores an inbound carrier channel requirement table 1094. This table indicates for each call the number of inbound channels in use. Although not shown, the memory also includes an outbound carrier channel requirement table which stores the number of outbound carrier channels used for a particular call. In addition, this information is used to generate the carrier channel allocation database.

Memory 1082 further stores the current call lowest common denominator bit loading tables 1092. For example, one current call bit table is an outbound control channel bit loading table which is shown to have carrier channel zero having 11 bits, carrier channel one having 11 bits, carrier channel two having 10 bits, etc. The creation of a call bit loading table was previously described to be a compilation of a set of site outbound bit loading tables for the outbound transmission path and a compilation of a set of site inbound bit loading tables for an inbound transmission path.

The next portion of memory 1082 includes a geographical call assignment database 1090. This call assignment database includes, for each call, the sites that are supporting the call. Recall that a site is supporting a call when a targeted subscriber is affiliated with the site.

The memory 1082 also stores an outbound carrier channel allocation table 1088 and an inbound carrier channel allocation table (not shown). The inbound and outbound channel allocation tables contain the same fields, i.e. a carrier channel field, a bit loading field, an allocation field, and an address pointer field. The outbound carrier channel allocation table 1088 shows that the first carrier channel has 11 bits, is allocated to the first data block of outbound control, and has an address pointer of zero. The second carrier channel has 11 bits, is allocated to the second data block of the outbound control channel, and has an address pointer of 11. The data for the remaining carrier channels has similar type data. From these tables, the controller that has access to them can perform any of the functions previously described.

To further illustrate the operation of the present invention, refer to FIG. 53 which illustrates, for a 10 carrier channel system that includes six sites, a plurality of site bit loading tables. The site bit loading tables are generated by transmitting a training signal to the respective site over a particular transmission path, i.e., the inbound path or the outbound path, and determining a spectral response of the transmission path based on the training signal. Thus, the site bit loading for site 1, 1098, has the 10 carrier channels and their corresponding bit loading. For example, carrier channel zero has a bit loading of 10 bits, carrier channel 1 has a bit loading of 11 bits, etc. The site bit loading tables for sites 2–6 1100–1108 are shown to include a variety of bit loadings for the corresponding carrier channels.

Figure 54:
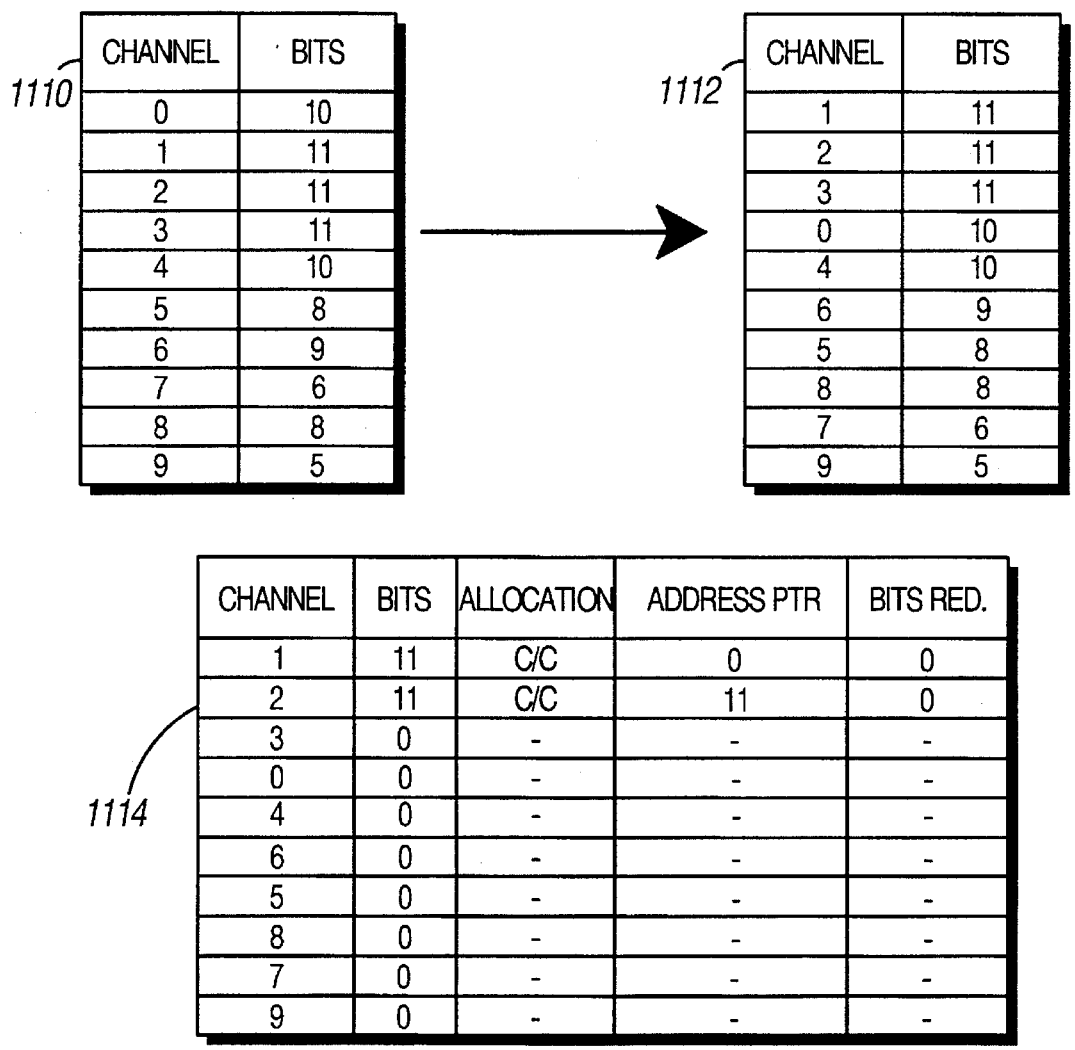

From the plurality of site bit loading tables shown in FIG. 53, a control channel bit loading table 1110, as shown in FIG. 54, may be generated. The generation of this table requires both FIG. 53 and FIG. 54 to be reviewed simultaneously. To create a control channel bit loading table, each of the site bit loading tables needs to be compared simultaneously on a carrier channel by carrier channel basis. For carrier channel zero, the bit loading in each of the site bit loading tables 1098–1108 is compared to identify the lowest bit loading. Reviewing, for carrier channel zero, the bit loading in site 1 is 10 bits, in site 2 it's 11, in site 3 it's 12, in site 4 it's 11, in site 5 it's 15, in site 6 it's 15. Thus, the lowest bit loading for carrier channel zero appears in the site bit loading table 1098 for site 1. This value is stored in the control channel LCD bit table or control channel bit loading table 1110 for carrier channel zero. A similar comparison is done for the remaining channels.

Having generated the LCD bit loading table, the table is ordered based on the constellation encoding function used within the D MT transmitter. The exemplary constellation encoding function depicted is a largest bit loading carrier channel to smallest bit loading carrier channel. Thus, the ordered bit loading table 1112 has the carrier channels arranged by their bit loading. The first entry in the ordered bit loading table is carrier channel 1, which has 11 bits, then carrier channel 2, which also has 11 bits, then carrier channel 3, which also has 11 bits, and so on. The ordered bit loading table is achieved by scanning the LCD bit table 1110 from a top-down fashion. Thus, the first largest bit loading is the first entry in the bit loading table. The ordered bit loading continues by scanning the bit loading table and even if it finds a bit loading that matches a carrier channel, it would be a subsequent entry in the ordered bit loading table. For example, as shown, carrier channels 1, 2 and 3 all have a bit loading of 11 bits. But, from the scan, carrier channel 1 is detected first followed by carrier channel 2, then carrier channel 3. The remaining order of the carrier channels is followed in a similar manner.

Having created the ordered bit loading table 1112, the bit requirements for the control channel is determined. For this example, it was determined that 22 bits per frame were required. Thus, utilizing the channel allocation procedures described herein, the ordered bit loading table is scanned from a top-down approach. The first inquiry is whether the required number of bits exceeds the maximum bit loading of the first entry in the ordered bit table. In this case, the number of required bits is 22, which exceeds the 11 bits of carrier channel 1. Thus, in this case, the first carrier channel is allocated to a first portion, or first data block of the data entry designated as the outbound control channel. Next, a remaining number of bits is calculated by subtracting the bit loading for carrier channel one from the number of required bits. Thus, for this example, that equation is 22–11, which yields 11 remaining bits.

The 11 remaining bits are then used to scan the ordered bit loading table, less the first carrier channel which has already been allocated. Thus, the scanning determines that the remaining number of required bits does not exceed the maximum bit loading of a carrier channel within the ordered bit loading table. Having made this decision, the process determines whether a match occurs between a bit loading of a particular carrier channel and the remaining number of required bits. As shown, carrier channel 2 has a bit loading of 11 bits which matches the remaining number of required bits, which is the first match found in a top-down scan. Therefore, carrier channel 2 is allocated to the second data block of the data entry designated outbound control channel.

Having made these allocations, address pointers are determined based on the manner in which the data will be stored within the write section of the dual stage memory. Because the outbound control channel is the first data entry, the first data block of the outbound control channel will have an address pointer of zero. The second data block of the outbound control channel will have its address pointer at 11. This is calculated by adding the address pointer of the first data block to the number of bits in the first data block. In this case, the address pointer is zero plus 11 (the number of bits) thus providing the address pointer of 11.

Having determined this information, the carrier channel allocation table 1114 is generated showing the carrier channels in the ordered bit loading fashion. The table includes the number of corresponding bits, the allocation to the particular data block, address pointer information, and bit reduction information. The bit reduction information will be discussed below.

Figure 55:
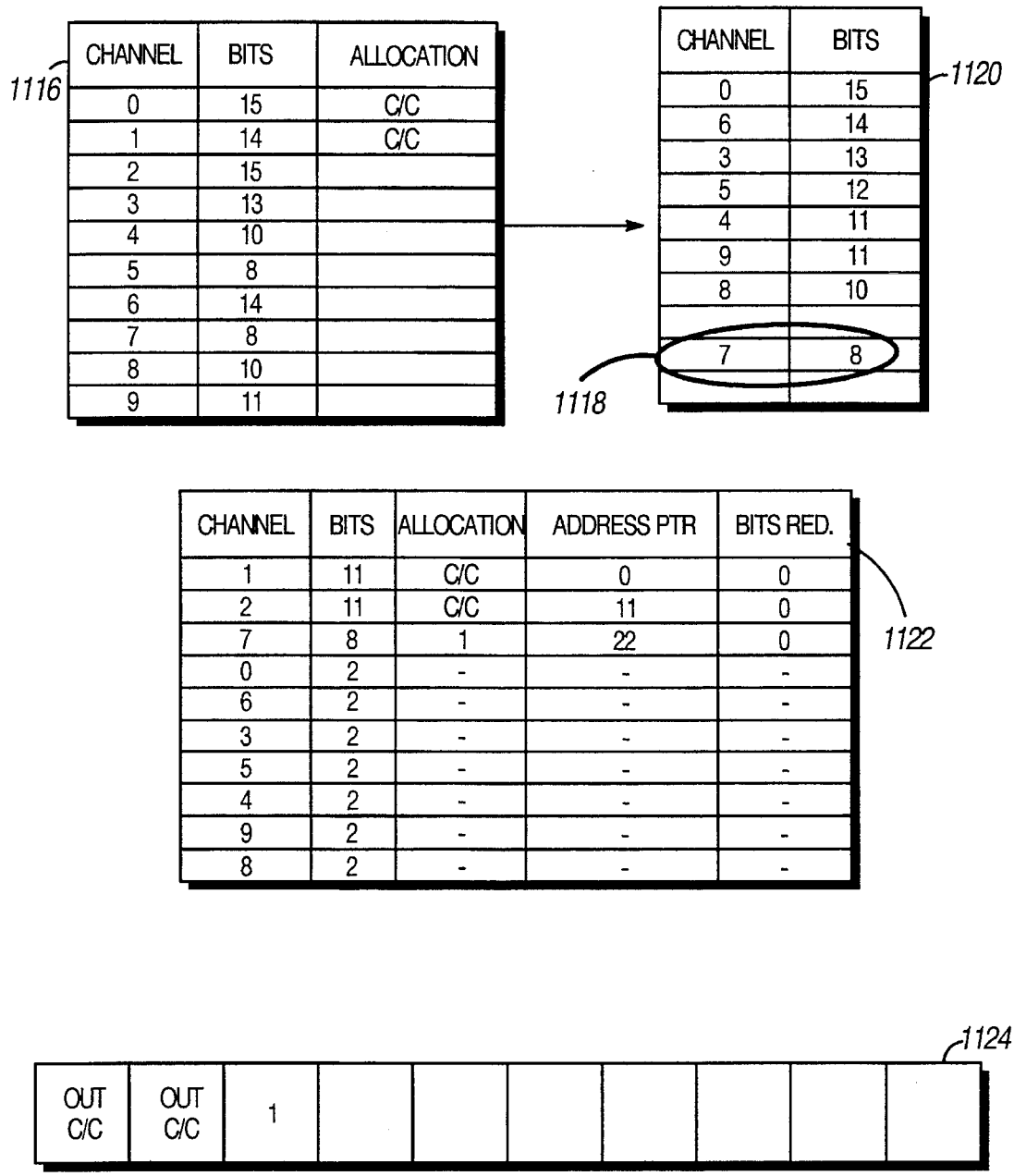

FIG. 55 illustrates an example of when a first data call is added to the data being transmitted. For this call, assume that 8 bits are required and only sites 5 and 6 are supporting this particular call. Given this information, an LCD call bit loading table 1116 is generated from the site bit loading tables 1006 and 1008. As shown in FIG. 53, the bit loading for channel zero in site 5 is 15 and the bit loading for channel zero in site 6 is 15. Thus, the lowest bit loading between these two sites is 15, which is the value entered into the table 1116. The bit loading for carrier channel 1 of site 5 is 15 bits and the bit loading for carrier channel 1 of site 6 is 14 bits. Fourteen, being the lesser of the two values, is entered into the bit loading table 1116 and the process continues for each of the carrier channels in sites 5 and 6 to create a completed LCD bit loading table 1116. In addition to generating the table, allocation information is added as an addendum to the call table, indicating that carrier channels one and two are already allocated to the outbound control channel. Thus, when generating the ordered bit table of available carrier channels, carrier channel 1 and 2 are omitted from table 1120.

Having generated the order bit loading table 1120, the carrier channel allocation process first determines whether the bit requirements is greater than the maximum number of bits available in a given carrier channel. In this case, the bit requirements are 8 bits, while the maximum bit loading for a carrier channel is 15 bits. Thus, the answer to this inquiry is negative such that the next step is to find a carrier channel that has a bit loading which matches the bit requirements. In this case, the match occurs 1118 at carrier channel 7, which has a bit loading of 8 bits.

Having identified carrier channel 7 as the appropriate carrier channel, the carrier channel allocation table 1122 is updated to include the allocation of carrier channel 7 to data call 1. The updated carrier channel allocation table 1122 indicates that carrier channel 7 has 8 bits, is allocated to call 1, has an address pointer of 22, and has zero bit reductions. The address pointer is generated by realizing that the data block for call 1 will follow the second data block of the outbound control channel in the data stream being transmitted to the data formatter. Thus, the address pointer for call 1 is determined by adding the address pointer for the second data block of the outbound control channel, which is 11, to the number of bits for that data block, which is also 11. Thus producing the address pointer 22. Note that the remaining carrier channels have been reduced to 2 bits and have not been allocated. Thus they will be filled with null information. Note that as an alternative, the remaining bits that are not allocated to a call may be assigned a bit loading of zero bits, thus no information will be transmitted other than the information corresponding to a data entry.

Figure 56:
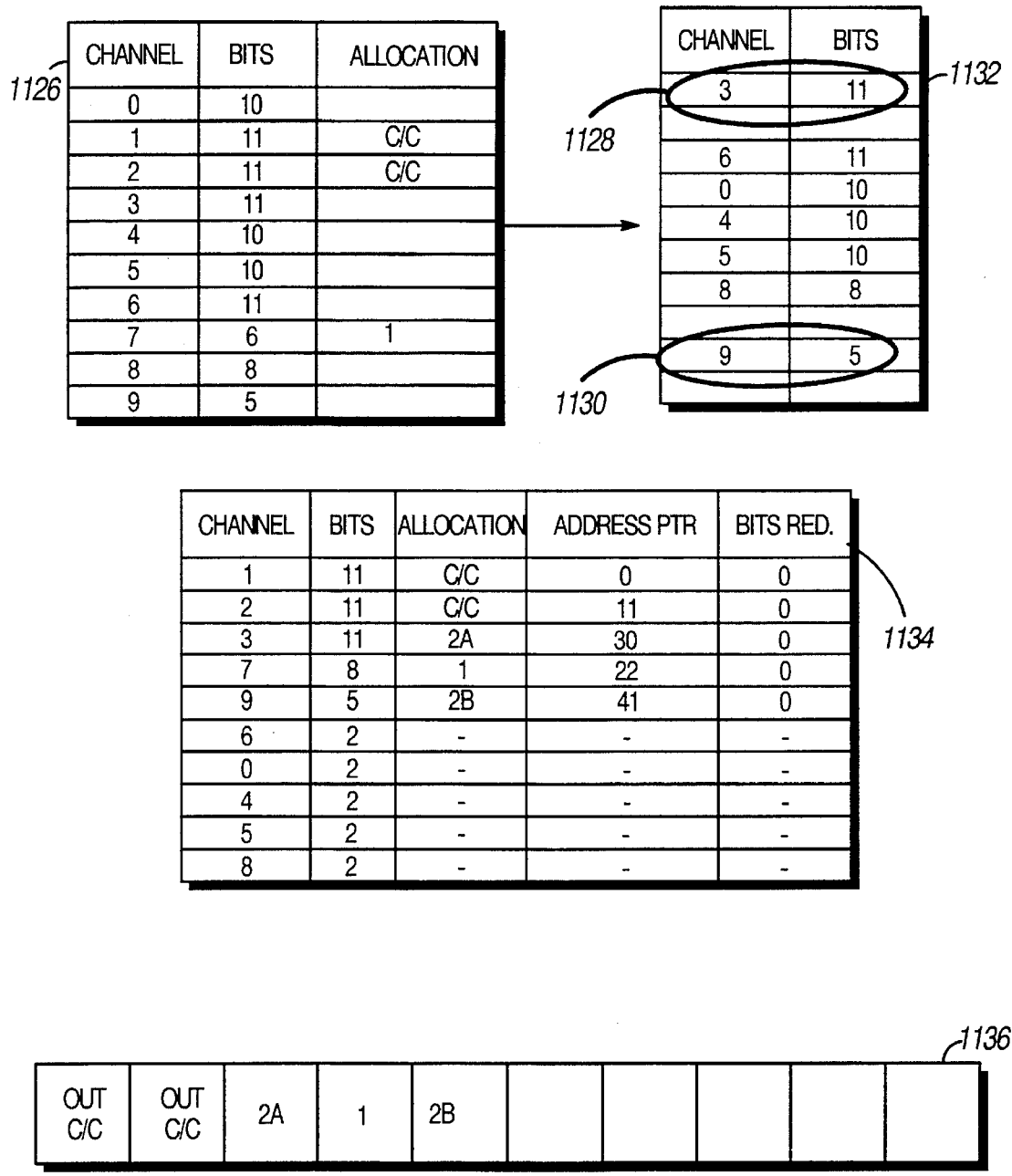

FIG. 56 illustrates when a second data call is added to the system while the first call is still active. Assume that the bit requirement for the second data call is 16 bits and that the sites 1, 2 and 3 are supporting the second data call. Given this information, an LCD bit loading table for call 2 is generated 1126. In addition, the carrier channels that have already been allocated to a particular call are flagged, such that, when the ordered bit loading table 1132 is created, it is created using only available carrier channels.

To allocate carrier channels to the second data call, the process first determines whether the bit requirements exceed the maximum bit loading of the first carrier channel entry in the ordered bit loading table 1132. In this case, the bit requirements are 16 while the maximum bit loading for a carrier channel is 11. Thus, the first carrier channel will be allocated to the call which is carrier channel 3, and a remaining number of bits is determined. In this case remaining number of bits is 16 minus 11 which equals 5. Having done this, the process looks for a remainder match 1130 which is found in carrier channel 9. Having made the carrier channel allocations as described in 1128 and 1130, the carrier channel allocation table 1134 is updated to include the allocations for data call two.

FIG. 56 also illustrates a formatted data stream 1136 or an ordered data stream 1136. The ordered data stream 1136 is based upon the carrier channel bit loading table wherein the first entry in the table is the first data block of the formatted data stream followed by the second data block and so on. Note that the address pointer information for call 2A and call 2B are also included in the carrier channel allocation table 1134. The address pointer for call 2A is determined by adding the address pointer of the previous data block, in this case call 1, to the number of bits in the previous data block. In this case, the previous address was 22 and the number of bits in the previous block is 8. Thus, the address pointer for call 2A is 30. The address pointer for call 2B is calculated in a similar manner.

Figure 57:
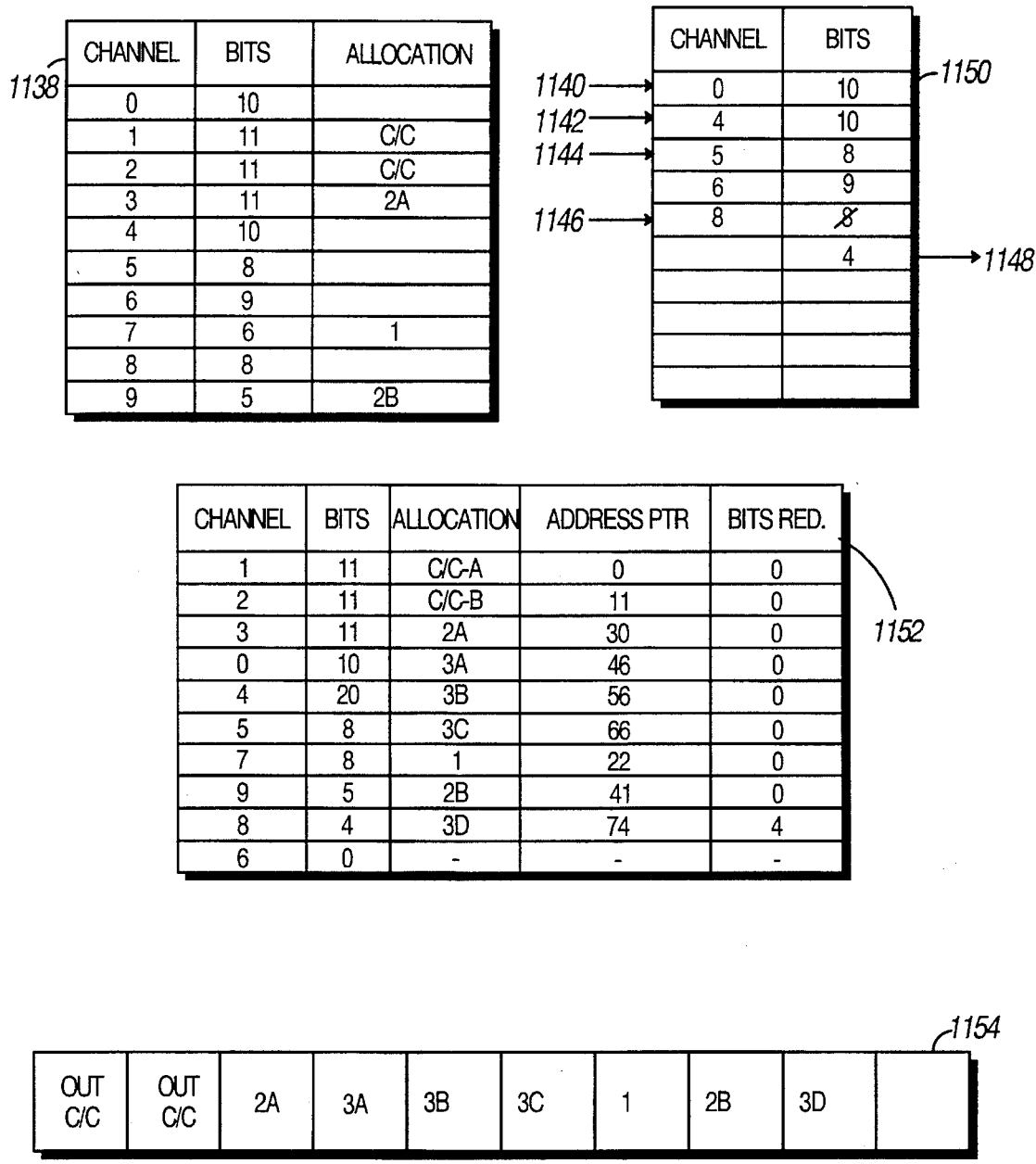

FIG. 57 illustrates the situation when a third call is added to the system with calls 1 and 2 still being active. In this case, it is assumed that the bit requirements for call 3 is 32 bits and sites 1–5 are involved in the call. An LCD bit loading table and in-use table for call 3 is generated 1138. The LCD bit loading portion is based upon the site bit loading tables 1098–1106. Once the bit loading table is generated for this particular call, an ordered bit loading table of available carrier channels 1150 is generated. From the ordered bit loading table 1150, carrier channels are allocated based upon the bit requirements. At 1140, the first available carrier channel is allocated to the call. Having allocated carrier channel zero to this call, a remaining bit value is calculated. For this case, the remaining bit value is 32 minus 10 which equals 22. At 1142, due to the remaining number of required bits being greater than the maximum bit loading of a carrier channel, the next available carrier channel is allocated to the call. In this case, carrier channel 4, which has a bit loading of 10, is allocated to data call 3.

Having made two data block allocations to call 3 a remaining number of bits is again calculated. In this case, the remaining number of bits is 22 minus 10 which equals 12. Again, the remaining number of bits exceeds the maximum bit loading of the remaining channels in the ordered bit loading table 1150 thus, at 1144, the next available channel is allocated. In this case, carrier channel 5, which has a bit loading of 8, is allocated the third data block of call 3.

Given the three data block allocations, a remaining number of required bits is subsequently determined. The previous number of required bits was 12, subtracting the bit loading of carrier channel 5, which is 8 bits, leaves a remainder of 4 bits. At this stage, remaining carrier channels have bit loading in excess of the remainder number of bits. Thus, the process looks for an exact match, which does not occur in this case. Without an exact match, the process then looks for a closest match. In this case, at 1146, an overflow assignment is created by allocating carrier channel 8, which has a bit loading of 8 bits, to the data call. In this case however, only 4 bits are required. Thus, the bit loading for carrier channel 8 is reduced to 4 bits. This is shown as 1148. Thus, by allocating 4 data blocks to data call 3, the bit requirements of the call can be met. Having made these carrier channel allocations, the carrier channel allocation bit loading table 1152 is updated to reflect the changes in the call assignments and the address pointer information. The ordered data stream or formatted data stream is depicted as 1154.

FIG. 58 illustrates call 2 ending while call 1 and call 3 are still active. Given these parameters, the carrier channel allocation table and address pointer information are updated in the carrier channel allocation table 1156. To update the allocation field, the allocation of carrier channels to call 2A and B are simply deleted. The updating of the address pointer information, however, is a little more difficult. To update address pointer information, the address pointers for call 3 need to be recalculated. With the deletion of call 2, the first data block to be received after the data block for call 1 will be data block 3A. Thus, the address pointer for 3A will be 30. Address pointers for the remaining data blocks of calls 3 will be calculated as previously described by adding the address pointer of the previous data block to the number of bits of the previous data block.

Memory 1158 depicts how the data entries and their corresponding data blocks will be stored in the write section of the dual stage memory. Thus, the first data block will be stored at address 0, the second data block at address 11, and so on.

FIG. 59 illustrates the process of updating the site bit loading tables. Recall that the site bit loading information is updated on a periodic basis within the ADSL system or DMT system. This is required because the transfer function of the transmission paths regularly change due to weather variations. A comparison of the updated bit loading table for site 11160 and the site bit loading table 1098 in FIG. 53 shows that carrier channel 0 has increased its bit loading capabilities from 10 bits to 12 bits, carrier channel 1 has increased its bit loading capabilities from 11 bits to 12 bits, etc. A similar comparison may be made for sites 2, 3, 4, 5, and 6. Given the updated site bit loading table, the call bit loading tables for current calls must be updated to determine whether the current carrier channel allocations provide sufficient bandwidth for the types of calls being supported.

Figure 60:
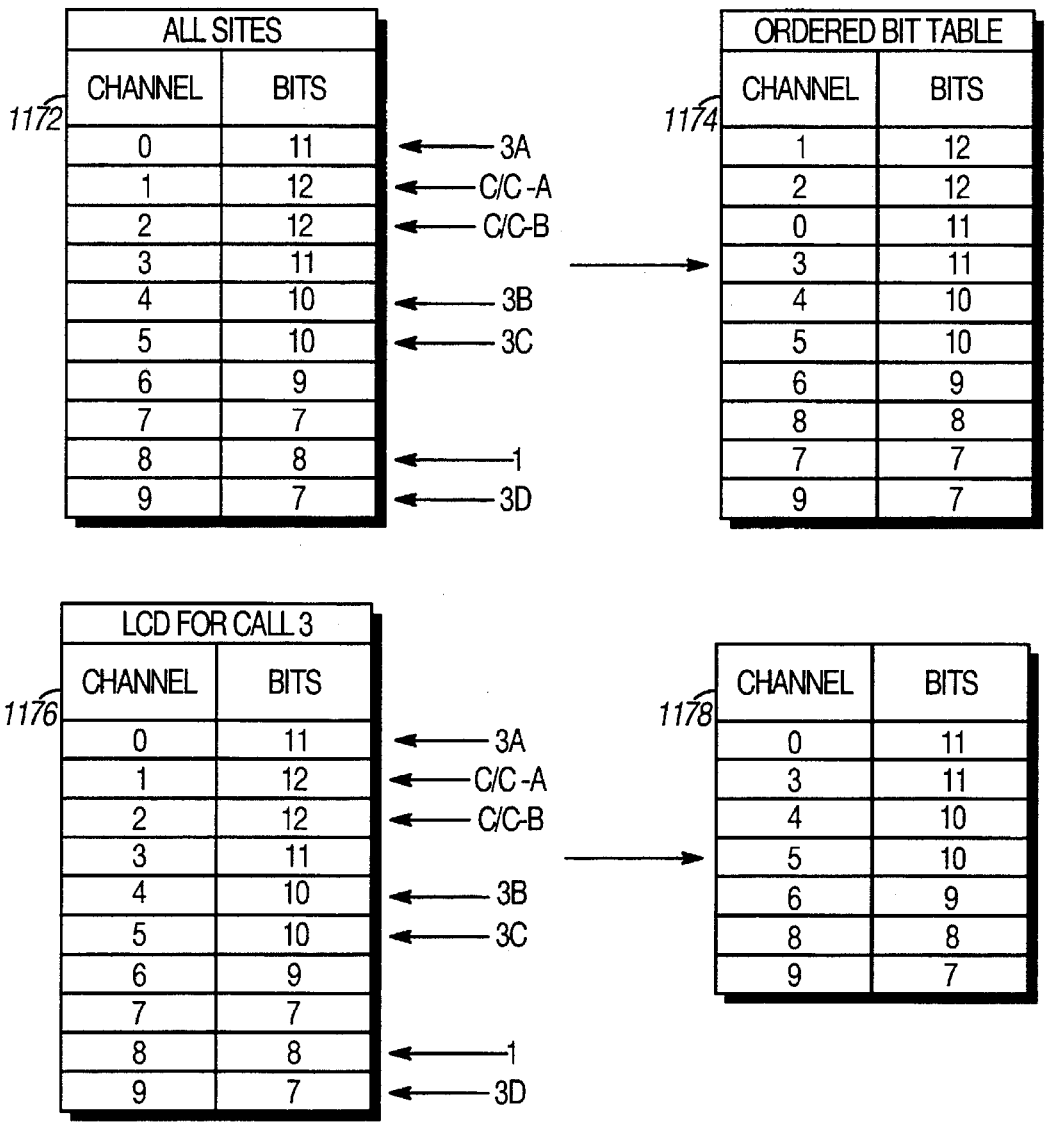

FIG. 60 illustrates an updated control channel bit loading table. As shown, the new control channel bit loading table 1172 indicates the bit loading capabilities for each channel. Note that carrier channels 1 and 2 now have 12 bit capacity, respectively. In the previous carrier channel allocation they each had 11 bits. Thus, carrier channels 1 and 2 will still provide the required bandwidth requirements for the control channel. Thus, even though the bit loading capabilities have increase, the bit loading table for these will be reduced by one bit such that carrier channel 1 and carrier channel 2 remain at 11 bits each. This will be reflected in the carrier channel allocation table and each carrier channel will have a bit reduction of 1 bit.

FIG. 60 also illustrates the updated call bit loading table for call 3. Having generated this table the ordered bit loading table 1178 is generated and a determination is made as to whether the previously allocated channels provide a sufficient number of bits. As shown, the bits for the allocated carrier channels equals 39 which exceeds the 32 bit requirement. Thus, the updated bit loading for these carrier channels will provide adequate bandwidth and will be reduced to the previous values to maintain performance as achieved prior to the update.

FIG. 61 illustrates the updated call bit loading table 1180 for call 1. The figure also illustrates the updated ordered bit loading table 1182 for call 1. Note that the bit loading for carrier channel 7 has been reduced to seven bits. The seven bits is less than the required eight bits; thus, carrier channel 7 can no longer support call 1. Given this, the available channels in the ordered bit loading table are scanned to determine if another carrier channel can support the call. In this case, carrier channel 6 which has a bit loading of nine bits has the closest match. Therefore, carrier channel 6 is allocated to call 1 and the information is updated in the carrier channel allocation table 1184. Note that the bit reduction is also updated in the table.

The present invention provides a communication system infrastructure that utilizes DMT technology and twisted pairs as the interconnection medium. With such an apparatus and method, communication system infrastructure may be placed in areas where it was not achievable before. Typically, communication infrastructure required high data rate transmission infrastructure connections such as T1 links or microwave links. These high data rate transmission path requirements are eliminated by the present invention, thereby expanding the usefulness and areas in which communication systems may be established.

We claim:

1. A method for obtaining communication system infrastructure information for a wireless communication system, the method comprising the steps of:

a) transmitting, by a primary site, a first training signal simultaneously to a plurality of secondary sites via an outbound wireline communication path;

b) upon receiving the training signal, determining, by each of the plurality of secondary sites, an outbound bit table based on a spectral response of the outbound wireline communication path;

c) requesting, by the primary site, the outbound bit table from one of the plurality of secondary sites;

d) upon receipt of the outbound bit table, storing, by the primary site, the outbound bit table of the one of the plurality of secondary sites;

e) requesting, by the primary site, a second training signal from the one of the plurality of secondary sites;

f) transmitting, by the one of the plurality of secondary sites, the second training signal to the primary site via an inbound wireline communication path;

g) upon receiving the second training signal, determining, by the primary site, an inbound bit table for the one of the plurality of secondary sites based on a spectral response of the inbound wireline communication path;

h) storing, by the primary site, the inbound bit table for the one of the plurality of secondary sites, and i) repeating steps (c) through (h) for remaining sites of the plurality of secondary sites to produce a data base of outbound bit tables and inbound bit tables.

2. The method of claim 1 further comprises:

at periodic intervals, transmitting, by the primary site, the first training signal to the plurality of secondary sites;

upon receiving the training signal, generating, by each of the plurality of secondary sites, a new outbound bit table;

comparing, by each of the plurality of secondary sites, the new outbound bit table with the outbound bit table; and generating, by each of the plurality of secondary sites, a change message when the new outbound bit table does not match the outbound bit table.

3. The method of claim 2 further comprises:

requesting, by the primary site, the change message from the plurality of secondary sites in a sequential order; and when the change message is received for a given secondary site of the plurality of secondary sites, updating the outbound bit table for the given secondary site based on the change message.

4. The method of claim 1, wherein step (b) further comprises generating the outbound bit table by affiliating a bit loading to each outbound carrier channel of a plurality of outbound carrier channels.

5. The method of claim 4 further comprises establishing an outbound control channel based on the outbound bit tables of the data base.

6. The method of claim 5, wherein the establishing the outbound control channel further comprises:

comparing, on an outbound carrier channel by outbound carrier channel basis, the outbound bit tables of the data base to obtain a minimum bit loading for each outbound carrier channel;

generating an outbound control channel bit loading table based on the minimum bit loading for each outbound carrier channel; and selecting at least one of the plurality of outbound carrier channels as the outbound control channel from the outbound control channel bit loading table and outbound control channel bandwidth requirements.

7. The method of claim 6 further comprises:

transmitting, by the primary site, identity of the at least one of the plurality of outbound carrier channels to the plurality of secondary sites as the outbound control channel.

8. The method of claim 6 further comprises:

at periodic intervals, transmitting, by the primary site, the training signal to the plurality of secondary sites;

upon receiving the training signal, generating, by each of the plurality of secondary sites, a new outbound bit table;

comparing, by each of the plurality of secondary sites, the new outbound bit table with the outbound bit table; and generating, by each of the plurality of secondary sites, a change message when the new outbound bit table does not match the outbound bit table.

9. The method of claim 8 further comprises:

requesting, by the primary site, the change message from the plurality of secondary sites in a sequential order; and when the change message is received for a given secondary site of the plurality of secondary sites, updating the outbound bit table for the given secondary site.

10. The method of claim 9 further comprises:

updating the outbound control channel bit loading table when at least one of the plurality of secondary sites transmitted the change message; and when the outbound control channel bit loading table has been updated, redefining the control channel when the outbound control channel bandwidth requirements can not be met.

11. The method of claim 1, wherein step (g) further comprises generating each of the inbound bit tables by affiliating a bit loading to each inbound carrier channel of a plurality of inbound carrier channels.

12. The method of claim 11 further comprises establishing an inbound control channel based on the inbound bit tables of the data base.

13. The method of claim 12, wherein the establishing the inbound control channel further comprises:

comparing, on an inbound carrier channel by inbound carrier channel basis, the inbound bit tables of the data base to obtain a minimum bit loading for each inbound carrier channel;

generating an inbound control channel bit loading table based on the minimum bit loading for the each inbound carrier channel of a plurality of inbound carrier channels;

selecting at least one of the plurality of inbound carrier channels as the inbound control channel from the inbound control channel bit loading table and inbound control channel bandwidth requirements; and transmitting identity of the at least one of the plurality of inbound carrier channels as the inbound control channel.

14. The method of claim 13 further comprises enabling, by the primary site, the plurality of secondary sites to access the inbound control channel in a time division multiplexed manner.

15. The method of claim 12, wherein the establishing the inbound control channel further comprises:

i. for the one of the plurality of secondary sites, determining, by the primary site, at least one inbound carrier channel;

ii. for the one of the plurality of secondary sites, affiliating, by the primary site, the at least one inbound carrier channel as the inbound control channel for the one of the plurality of secondary sites; and iii. repeating steps (i) and (ii), by the primary site, for the remaining sites of the plurality of secondary sites.

16. The method of claim 12, wherein the establishing the inbound control channel further comprises:

1) segregating the plurality of secondary sites into sets of sites;

2) for a first set of the sets of sites, comparing, on an inbound carrier channel by inbound carrier channel basis, the inbound bit tables of the data base to obtain a minimum bit loading for each inbound carrier channel of a plurality of inbound carrier channels;

3) for the first set, generating a first set inbound bit loading table based on the minimum bit loading for each of the inbound carrier channels;

4) for the first set, selecting at least one of the plurality of inbound carrier channels as a first set inbound control channel from the first set inbound bit loading table and inbound control channel bandwidth requirements; and 5) repeating steps (2) through (4) for remaining sets of the sets of sites.

17. The method of claim 16 further comprises:

enabling, by the primary site, sites in the first set to access to the first set inbound control channel in a time division multiplexed manner; and enabling, by the primary site, sites in each of the remaining sets to access a respective set inbound control channel in the time division multiplexed manner.

18. The method of claim 1 further comprises:

at periodic intervals, requesting, by the primary site, the second training signal from the one of the plurality of secondary sites;

upon receiving the second training signal, generating, by the primary site, a new inbound bit table for the one of the plurality of secondary sites;

comparing, by the primary site, the new inbound bit table with the inbound bit table;

updating, by the primary site, the inbound bit table when the new inbound bit table does not match the inbound bit table; and repeating, by the primary site, the above steps for the remaining sites of the plurality of secondary sites to update the data base of the inbound bit tables.

19. The method of claim 18 further comprises:

updating the inbound control channel bit loading table when at least one of the inbound bit tables has changed; and when the inbound control channel bit loading table has been updated, redefining the control channel when the outbound control channel band width requirements can not be met.

20. A method for obtaining communication system infrastructure information, the method comprising the steps of:

a) transmitting, by a primary site, a first training signal simultaneously to a plurality of secondary sites via a first wireline communication path;

b) upon receiving the training signal, determining, by each of the plurality of secondary sites, an outbound bit table based on a spectral response of the first wireline communication path;

c) requesting, by the primary site, the outbound bit table from one of the plurality of secondary sites;

d) upon receipt of the outbound bit table, storing, by the primary site, the outbound bit table of the one of the plurality of secondary sites; and e) repeating steps (c) through (d) for remaining sites of the plurality of secondary sites to produce a data base of outbound bit tables.

21. The method of claim 20 further comprises:

at periodic intervals, transmitting, by the primary site, the first training signal to the plurality of secondary sites;

upon receiving the training signal, generating, by each of the plurality of secondary sites, a new outbound bit table;

comparing, by each of the plurality of secondary sites, the new outbound bit table with the outbound bit table; and generating, by each of the plurality of secondary sites, a change message when the new outbound bit table does not match the outbound bit table.

22. The method of claim 21 further comprises:

requesting, by the primary site, the change message from the plurality of secondary sites in a sequential order; and when the change message is received for a given secondary site of the plurality of secondary sites, updating the outbound bit table for the given secondary site based on the change message.

23. The method of claim 20, wherein step (b) further comprises generating the outbound bit table by affiliating a bit loading to each outbound carrier channel of a plurality of outbound carrier channels.

24. The method of claim 23 further comprises establishing an outbound control channel based on the outbound bit tables of the data base.

25. The method of claim 24, wherein the establishing the outbound control channel further comprises:

comparing, on an outbound carrier channel by outbound carrier channel basis, the outbound bit tables of the data base to obtain a minimum bit loading for each outbound carrier channel;

generating an outbound control channel bit loading table based on the minimum bit loading for each outbound carrier channel; and selecting at least one of the plurality of outbound carrier channels as the outbound control channel from the outbound control channel bit loading table and outbound control channel bandwidth requirements.

26. The method of claim 25 further comprises:

transmitting, by the primary site, identity of the at least one of the plurality of outbound carrier channels to the plurality of secondary sites as the outbound control channel.

27. The method of claim 25 further comprises:

at periodic intervals, transmitting, by the primary site, the training signal to the plurality of secondary sites;

upon receiving the training signal, generating, by each of the plurality of secondary sites, a new outbound bit table;

comparing, by each of the plurality of secondary sites, the new outbound bit table with the outbound bit table; and generating, by each of the plurality of secondary sites, a change message when the new outbound bit table does not match the outbound bit table.

28. The method of claim 27 further comprises:

requesting, by the primary site, the change message from the plurality of secondary sites in a sequential order; and when the change message is received for a given secondary site of the plurality of secondary sites, updating the outbound bit table for the given secondary site.

29. The method of claim 28 further comprises:

updating the outbound control channel bit loading table when at least one of the plurality of secondary sites transmitted the change message; and when the outbound control channel bit loading table has been updated, redefining the control channel when the outbound control channel bandwidth requirements cannot be met.

30. A method for obtaining communication infrastructure information, the method comprising the steps of:

a) requesting, by a primary site, a second training signal from one of a plurality of secondary sites;

b) transmitting, by the one of the plurality of secondary sites, the second training signal to the primary site via a wireline communication path;

c) upon receiving the second training signal, generating, by the primary site, an inbound bit table for the one of the plurality of secondary sites by affiliating a bit loading with each inbound carrier channel of a plurality of inbound carrier channels of the wireline communication path;

d) storing, by the primary site, the inbound bit table for the one of the plurality of secondary sites, e) repeating steps (a) through (d) for remaining sites of the plurality of secondary sites to produce a data base of inbound bit tables; and f) establishing an inbound control channel based on the inbound bit tables of the data base.

31. The method of claim 30, wherein the establishing the inbound control channel further comprises:

comparing, on an inbound carrier channel by inbound carrier channel basis, the inbound bit tables of the data base to obtain a minimum bit loading for each inbound carrier channel of the plurality of inbound carrier channels;

generating an inbound control channel bit loading from the step of comparing;

selecting at least one of the plurality of inbound carrier channels as the inbound control channel from the inbound control channel bit loading table and inbound control channel band width requirements; and transmitting identity of the at least one of the plurality of inbound carrier channels as the inbound control channel.

32. The method of claim 31 further comprises enabling, by the primary site, the plurality of secondary sites to access the inbound control channel in a time division multiplexed manner.

33. The method of claim 30, wherein the establishing the inbound control channel further comprises:

1) for the one of the plurality of secondary sites, determining, by the primary site, at least one inbound carrier channel;

2) for the one of the plurality of secondary sites, affiliating, by the primary site, the at least one inbound carrier channel as the inbound control channel for the one of the plurality of secondary sites; and 3) repeating steps (1) and (2), by the primary site, for the remaining sites of the plurality of secondary sites.

34. The method of claim 30, wherein the establishing the inbound control channel further comprises:

1) segregating the plurality of secondary sites into sets of sites;

2) for a first set of the sets of sites, comparing, on an inbound carrier channel by inbound carrier channel basis, the inbound bit tables of the data base to obtain a minimum bit loading for each inbound carrier channel of the plurality of inbound carrier channels;

3) for the first set, generating a first set inbound bit loading table from the step of comparing;

4) for the first set, selecting at least one of the plurality of inbound carrier channels as a first set inbound control channel from the first set inbound bit loading table and inbound control channel bandwidth requirements; and 5) repeating steps (2) through (4) for remaining sets of the sets of sites.

35. The method of claim 34 further comprises:

enabling, by the primary site, sites in the first set to access to the first set inbound control channel in a time division multiplexed manner; and enabling, by the primary site, sites in each of the remaining sets to access a respective set inbound control channel in the time division multiplexed manner.

36. The method of claim 30 further comprises:

at periodic intervals, requesting, by the primary site, the second training signal from the one of the plurality of secondary sites;

upon receiving the second training signal, generating, by the primary site, a new inbound bit table for the one of the plurality of secondary sites;

comparing, by the primary site, the new inbound bit table with the inbound bit table;

updating, by the primary site, the inbound bit table when the new inbound bit table does not match the inbound bit table; and repeating, by the primary site, the above steps for the remaining sites of the plurality of secondary sites to update the data base of the inbound bit tables.

37. The method of claim 36 further comprises:

updating the inbound control channel bit loading table when at least one of the inbound bit tables has changed; and when the inbound control channel bit loading table has been updated, redefining the inbound control channel when the inbound control channel bandwidth requirements cannot be met.

38. A method for establishing a control channel, the method comprises the steps of:

generating a control channel bit loading table from a plurality of bit loading tables;

from the control channel bit loading table, selecting at least one carrier channel as the control channel; and transporting identity of the at least one carrier channel to sites affiliated with one of the plurality of bit loading tables.

39. An apparatus for establishing infrastructure control channels, the apparatus includes:

input for receiving outbound bit loading information from a plurality of sites;

memory for storing the outbound bit loading information; and a processor that is operably coupled to the input and the memory, wherein the processor transmits a first training signal simultaneously to the plurality of sites for generation of the outbound bit loading information, and wherein the processor requests a second training signal from the plurality of sites to produce inbound bit loading tables.

40. The apparatus of claim 39, wherein the memory comprises additional memory to store the inbound bit loading tables.

41. The apparatus of claim 40, wherein the processor comprises additional processing for allocating inbound carrier channels of a plurality of inbound carrier channels to an inbound control channel based on the inbound bit loading tables and bandwidth requirements of the inbound control channel and for allocating outbound carrier channels of a plurality of outbound carrier channels to an outbound control channel based on the outbound bit loading tables and bandwidth requirements of the outbound control channel.

42. A method for obtaining communication system infrastructure information for a wireless communication system, the method comprising the steps of:

a) transmitting, by a primary site, a first training signal to a plurality of secondary sites via a first twisted pair wireline communication path;

b) upon receiving the training signal, determining, by each of the plurality of secondary sites, an outbound bit table based on a spectral response of the first twisted pair wireline communication path;

c) requesting, by the primary site via the first twisted pair wireline communication path, the outbound bit table from one of the plurality of secondary sites;

d) upon receipt of the outbound bit table, storing, by the primary site, the outbound bit table of the one of the plurality of secondary sites;

e) requesting, by the primary site via the first twisted pair wireline communication path, a second training signal from the one of the plurality of secondary sites;

f) transmitting, by the one of the plurality of secondary sites, the second training signal to the primary site via a second twisted pair wireline communication path;

g) upon receiving the second training signal, determining, by the primary site, an inbound bit table for the one of the plurality of secondary sites based on a spectral response of the second twisted pair wireline communication path;

h) storing, by the primary site, the inbound bit table for the one of the plurality of secondary sites, and i) repeating steps (c) through (h) for remaining sites of the plurality of secondary sites to produce a data base of outbound bit tables and inbound bit tables.

43. An apparatus for establishing infrastructure control channels, the apparatus comprising:

input for receiving outbound bit loading information from a plurality of sites;

memory for storing the outbound bit loading information; and a processor that is operably coupled to the input and the memory, wherein the processor transmits a first training signal via a first twisted pair wireline transmission path to the plurality of sites for generation of the outbound bit loading information, wherein the processor receives a second training signal from each of the plurality of sites via a second twisted pair wireline transmission path, and wherein the processor produces inbound bit loading tables based on a spectral response of the second training signal.

* * * * *